US012423641B2

(12) United States Patent
Volkerink et al.

(10) Patent No.: US 12,423,641 B2
(45) Date of Patent: Sep. 23, 2025

(54) WIRELESS TRACKING DEVICE WITH INTEGRATED SMART LABEL DISPLAY

(71) Applicant: Trackonomy Systems, Inc., San Jose, CA (US)

(72) Inventors: Hendrik J. Volkerink, Palo Alto, CA (US); Ajay Khoche, West San Jose, CA (US)

( * ) Notice: Subject to any disclaimer, the term of this patent is extended or adjusted under 35 U.S.C. 154(b) by 0 days.

(21) Appl. No.: 17/805,218

(22) Filed: Jun. 2, 2022

(65) Prior Publication Data

US 2022/0300896 A1   Sep. 22, 2022

Related U.S. Application Data

(63) Continuation-in-part of application No. 17/086,696, filed on Nov. 2, 2020, now Pat. No. 12,141,763.

(60) Provisional application No. 63/248,680, filed on Sep. 27, 2021, provisional application No. 63/196,139, filed on Jun. 2, 2021, provisional application No. 62/929,102, filed on Nov. 1, 2019.

(51) Int. Cl.
*G06Q 10/0833* (2023.01)
*G06K 19/06* (2006.01)

(52) U.S. Cl.
CPC ... *G06Q 10/0833* (2013.01); *G06K 19/06028* (2013.01)

(58) Field of Classification Search
CPC .... G06Q 10/0833; G06Q 50/30; G06Q 50/40; G06Q 50/43; G06Q 50/47; G06K 19/06028; G06K 19/06037; G06K 19/0723
See application file for complete search history.

(56) References Cited

U.S. PATENT DOCUMENTS

| 10,438,162 | B2 | 10/2019 | Sharma et al. |
| 10,445,756 | B2 | 10/2019 | Gonen et al. |
| 11,115,732 | B2 | 9/2021 | Lucrecio et al. |

(Continued)

FOREIGN PATENT DOCUMENTS

| AU | 2018204317 A1 | 1/2019 |
| AU | 2018250358 A1 | 5/2019 |

(Continued)

OTHER PUBLICATIONS

Fernández-Caramés, T. M. and P. Fraga-Lamas, "A Review on Human-Centered IoT-Connected Smart Labels for the Industry 4.0," 2018, IEEE Access, vol. 6, pp. 25939-25957 (Year: 2018).*

(Continued)

*Primary Examiner* — Jeff Zimmerman
*Assistant Examiner* — Wayne S. Murray

(57) ABSTRACT

A tape node and associated methods update an integrated smart label display to redirect delivery of an associated asset. Information of the associated asset is displayed on the integrated smart label display and includes an original destination address and a barcode. When the tape node determines that the associated asset is to be redirected to an alternative destination, based on received instructions and/or at least one rule defining conditions for the associated asset, the tape node updates the displayed information to include an address of the alternative destination and updates the barcode of the associated asset on the integrated smart label display. The tape node may provide instructions for receiving a reward for recycling the tape node.

20 Claims, 36 Drawing Sheets

(56) References Cited

U.S. PATENT DOCUMENTS

| | | | |
|---|---|---|---|
| 2002/0056669 | A1 | 5/2002 | Pratt et al. |
| 2006/0033475 | A1 | 2/2006 | Moore |
| 2006/0080819 | A1 | 4/2006 | McAllister |
| 2006/0236761 | A1 | 10/2006 | Inoue et al. |
| 2007/0118549 | A1 | 5/2007 | Bornhoevd et al. |
| 2007/0262861 | A1 | 11/2007 | Anderson et al. |
| 2008/0040244 | A1* | 2/2008 | Ricciuti ............. G06Q 10/08 705/28 |
| 2009/0014528 | A1 | 1/2009 | Gelbman |
| 2009/0266722 | A1 | 10/2009 | Rogers et al. |
| 2010/0318553 | A1 | 12/2010 | Pirtle et al. |
| 2011/0068921 | A1* | 3/2011 | Shafer ............. G08B 13/2462 340/571 |
| 2012/0150754 | A1 | 6/2012 | Belady et al. |
| 2012/0210325 | A1 | 8/2012 | De Lind Van Wijngaarden et al. |
| 2012/0303498 | A1 | 11/2012 | Cova et al. |
| 2013/0314233 | A1 | 11/2013 | Stevens |
| 2015/0256008 | A1 | 9/2015 | Miller et al. |
| 2016/0063433 | A1* | 3/2016 | Glasgow ........... G06Q 10/0832 705/332 |
| 2016/0261122 | A1* | 9/2016 | Childress ............. H02J 7/0069 |
| 2016/0277884 | A1 | 9/2016 | Ehrman et al. |
| 2016/0328781 | A1* | 11/2016 | Patel-Zellinger ............................ G06Q 30/0635 |
| 2018/0052462 | A1 | 2/2018 | Arena |
| 2018/0113500 | A1 | 4/2018 | Loeffler et al. |
| 2019/0037362 | A1 | 1/2019 | Nogueira-Nine |
| 2019/0066047 | A1* | 2/2019 | O'Brien ............. G06Q 10/0838 |
| 2019/0113632 | A1 | 4/2019 | Lucrecio et al. |
| 2019/0222055 | A1 | 7/2019 | Khoche et al. |
| 2019/0303862 | A1* | 10/2019 | Bollinger ............. G06F 3/0482 |
| 2020/0092681 | A1 | 3/2020 | Shapiro et al. |
| 2020/0143322 | A1* | 5/2020 | Dearing ............. G06K 7/10861 |
| 2021/0133696 | A1 | 5/2021 | Volkerink et al. |

FOREIGN PATENT DOCUMENTS

| | | |
|---|---|---|
| CA | 3061878 A1 | 11/2018 |
| CA | 3008512 A1 | 12/2018 |

OTHER PUBLICATIONS

Envio, https://web.archive.org/web/20200922114250/https://www.envio.io/digital-shipping-label, accessed Dec. 7, 2022, 5 pages.

International Patent Application No. PCT/US2020/058493 International Search Report and Written Opinion dated Jan. 4, 2021, 10 pages.

International Patent Application No. PCT/US2021/062239 International Search Report and Written Opinion dated Mar. 29, 2022, 18 pages.

International Patent Application No. PCT/US2022/032024 International Search Report and Written Opinion dated Aug. 19, 2022, 15 pages.

* cited by examiner

WIRELESS TRACKING DEVICE WITH INTEGRATED SMART LABEL DISPLAY

RELATED APPLICATIONS

This application is a Continuation-In-Part of U.S. patent application Ser. No. 17/086,696, titled "Recycling Assets Incorporating Wireless Tags," filed Nov. 2, 2020, which claim priority to U.S. Patent Application No. 62/929,102, filed Nov. 1, 2019. This application claims priority to U.S. Patent Application Ser. No. 63/196,139, titled "Wireless Tracking Device with Integrated Smart Label Display," filed Jun. 2, 2021, and to U.S. Patent Application Ser. No. 63/248,680, titled "Recycling Wireless Devices Through Dynamic Mail Delivery," filed Sep. 27, 2021. Each of the afore mentioned applications is incorporated herein by reference in its entirety.

BACKGROUND

Labels or stickers are often used to display information on an asset, parcel, or other objects. However, at different times, the information displayed on a label or sticker may need to be changed or updated. For a large group of assets, it is often time consuming and difficult to replace a label or sticker on an individual asset in order to update the information displayed on the label or sticker.

Battery operated devices used in tracking and monitoring assets may run out of energy unexpectedly while in the field if not regularly maintained or charged, particularly when the devices are used for multiple shipments or multiple stage shipments. Operations of the devices, such as collecting and storing sensor data, communicating with other devices, and the like, are frequently reliant on batteries to function. As such, loss of battery life in the devices may result in damages to the tracking, handling, or delivery of assets.

SUMMARY

In one embodiment, a method updates an integrated smart label display of a tape node to redirect delivery of an associated asset. The method includes: displaying information of the associated asset on the integrated smart label display of the tape node, the information including an original destination address and a barcode; determining the associated asset is to be redirected to an alternative destination; and displaying updated information and an updated barcode of the associated asset on the integrated smart label display, the updated information including an address of the alternative destination.

In another embodiment, a wireless tracking device includes: a rechargeable battery, at least one sensor, a flexible circuit, integrated smart label display, a wireless transceiver, a processor and memory. The memory stores machine readable instructions that when executed by the processor cause the processor to display information of an asset associated with the wireless tracking device on the integrated smart label display.

In another embodiment, a method redirects an asset being transported to an original destination. The method includes determining that the asset is to be redirected and sending, to a tape node associated with the asset, a message including an address of an alternative destination causing the tape node to update an integrated smart label display to display the address of the alternative destination.

In another embodiment, a method recycles a wireless tag. The method includes determining that a power level of a battery of the wireless tag is below a threshold, and displaying, on the wireless tag, instructions to ship the wireless tracking tag to a recycling facility.

DETAILED DESCRIPTION OF THE EMBODIMENTS

Figure 1A:
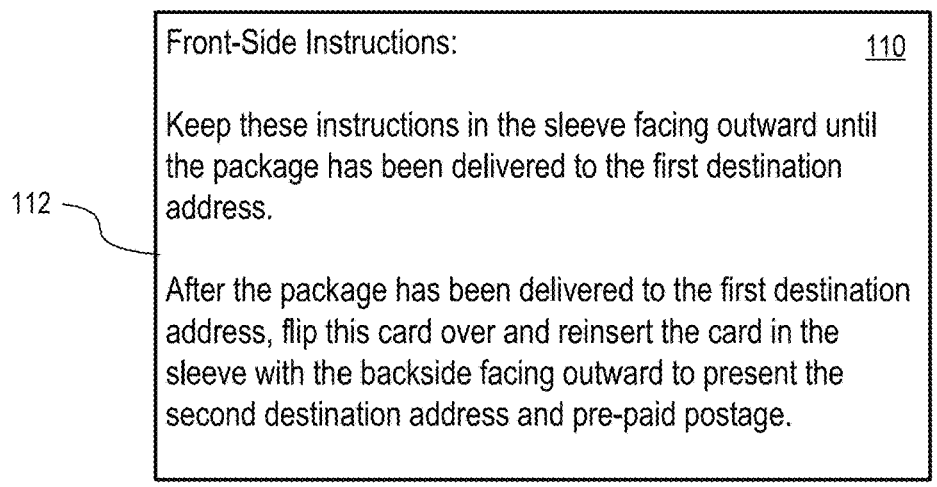
FIG. 1A-1C are schematic diagrams illustrating one example wireless tag having a form factor that is similar in size and/or in shape to the form factor of a business card or a postcard, in embodiments.

The present invention is not limited in any way to the illustrated embodiments. Instead, the illustrated embodiments described below are merely examples of the invention. Therefore, the structural and functional details disclosed herein are not to be construed as limiting the claims. The disclosure merely provides bases for the claims and representative examples that enable one skilled in the art to make and use the claimed inventions. Furthermore, the terms and phrases used herein are intended to provide a comprehensible description of the invention without being limiting.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements and are not drawn to scale.

In some contexts, the term "agent" may refer to a "node", and an "agent" or "node" may be adhesively applied to a surface and denoted as a "tape node" or "tape agent". These terms may be used interchangeably, depending on the context. Further, the "agent" or "node" may have two forms of hierarchy: one depending on the functionality of the "agent" or "node", such as the range of a wireless communication interface, and another depending on which "agent" or "node" may control another "agent" or "node". For example, an agent with a low-power wireless-communication interface may be referred to a "master agent".

In some embodiments, a low-power wireless communication interface may have a first wireless range and be operable to implement one or more protocols including Zigbee, near-field communication (NFC), Bluetooth Low Energy, Bluetooth Classic, Wi-Fi, and ultra-wideband. For example, the low-power wireless-communication interface may have a range of between 0 and 300 meters or farther, depending on the implemented protocol. The communication interface implementation, e.g., Zigbee or Bluetooth Low Energy, may be selected based upon the distance of communication between the low-power wireless-communication interface and the recipient, and/or a remaining battery level of the low-power wireless-communication interface.

An agent with a medium-power wireless communication-interface may be referred to as a "secondary agent". The medium-power wireless communication interface may have a second wireless range and be operable to implement one or more protocols including Zigbee, Bluetooth Low Energy interface, LoRa. For example, the medium-power wireless-communication interface may have a range of between 0 and 20 kilometers. The communication interface implementation, e.g., Zigbee, Bluetooth Low Energy, or LoRa, may be selected based upon the distance of communication between the medium-power wireless-communication interface and the recipient, and/or a remaining battery level of the medium-power wireless-communication interface.

An agent with a high-power wireless communication-interface may be referred to as a "tertiary agent". The high-power wireless communication interface may have a third wireless range and be operable to implement one or more protocols including Zigbee, Bluetooth Low Energy, LoRa, Global System for Mobile Communication, General Packet Radio Service, cellular, near-field communication, and radio-frequency identification. For example, the high-power wireless-communication interface may have a global range, where the high-power wireless-communication interface may communicate with any electronic device implementing a similar communication protocol. The communication interface protocol selected may depend on the distance of communication between the high-power wireless-communication interface and a recipient, and/or a remaining battery level of the high-power wireless-communication interface.

In some examples, a secondary agent may also include a low-power wireless-communication interface and a tertiary agent may also include low and medium-power wireless-communication interfaces, as discussed below with reference to FIGS. 8A-C and/or 13A-C. Further continuing the example, a "master agent", a "secondary agent", or a "tertiary agent" may refer to a "master tape node", a "secondary tape node", or a "tertiary tape node".

With regard to the second form of hierarchy, the "agent", "node", "tape agent", and "tape node", may be qualified as a parent, child, or master, depending on whether a specific "agent" or "node" controls another "agent" or "node". For example, a master-parent agent controls the master-child agent and a secondary or tertiary-parent agent controls a master-child agent. The default, without the qualifier of "parent" or "child" is that the master agent controls the secondary or tertiary agent Further, the "master tape node" may control a "secondary tape node" and a "tertiary tape node", regardless of whether the master tape node is a parent node.

Further, each of the "agents", "nodes", "tape nodes", and "tape agents" may be referred to as "intelligent nodes", "intelligent tape nodes", "intelligent tape agents", and/or "intelligent tape agents" or any variant thereof, depending on the context and, for ease, may be used interchangeably.

Further, each of the "agents", "nodes", "tape nodes", and "tape agents" may include flexible or non-flexible form factors unless otherwise specified. Thus, each of the "agents", "nodes", "tape nodes", and "tape agents" include flexible and non-flexible (rigid) form factors, or a combination thereof including flexible components and non-flexible components.

An adhesive tape platform includes a plurality of segments that may be separated from the adhesive product (e.g., by cutting, tearing, peeling, or the like) and adhesively attached to a variety of different surfaces to inconspicuously implement any of a wide variety of different wireless communications-based network communications and transducing (e.g., sensing, actuating, etc.) applications. In certain embodiments, each segment of an adhesive tape platform has an energy source, wireless communication functionality, transducing functionality (e.g., sensor and energy harvesting functionality), and processing functionality that enable the segment to perform one or more transducing functions and report the results to a remote server or other computer system directly or through a network (e.g., formed by tape nodes and/or other network components). The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and/or environment of, for example, an article, object, vehicle, or person, over time.

Systems and processes for fabricating flexible multifunction adhesive tape platforms in efficient and low-cost ways also are described in US Patent Application Publication No. US-2018-0165568-A1. For example, in addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that may provide local sensing, wireless transmitting, and positioning functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other logistics applications across heterogeneous environments.

As used herein, the term "or" refers an inclusive "or" rather than an exclusive "or." In addition, the articles "a" and "an" as used in the specification and claims mean "one or more" unless specified otherwise or clear from the context to refer the singular form.

The terms "module," "manager," "component", and "unit" refer to hardware, software, or firmware, or a combination thereof. The term "processor" or "computer" or the like includes one or more of: a microprocessor with one or more central processing unit (CPU) cores, a graphics processing unit (GPU), a digital signal processor (DSP), a field-programmable gate array (FPGA), a system-on-chip (SoC), a microcontroller unit (MCU), and an application-specific integrated circuit (ASIC), a memory controller, bus controller, and other components that manage data flow between said processor associated memory, and other components communicably coupled to the system bus. Thus, the terms "module," "manager," "component", and "unit" may include computer readable instructions that, when executed by a processor, implement the functionality discussed herein with respect to said "module," "manager," "component", and "unit".

The present invention is not limited in any way to the embodiments described herein. Instead, the embodiments described below are merely examples of the invention. Therefore, the structural and functional details disclosed herein are not to be construed as limiting the claims. The disclosure merely provides bases for the claims and representative examples that enable one skilled in the art to make and use the claimed inventions. Furthermore, the terms and phrases used herein are intended to provide a comprehensible description of the invention without being limiting.

As used herein, the term "or" refers an inclusive "or" rather than an exclusive "or." In addition, the articles "a" and "an" as used in the specification and claims mean "one or more" unless specified otherwise or clear from the context to refer the singular form.

The term "data object" refers to an addressable data file or a subset thereof. The term "metadata" include information about data objects or characteristics thereof. The terms "module," "manager," and "unit" refer to hardware, software, or firmware, or a combination thereof.

The terms "wireless tag," "wireless node," or "tape node" may be used interchangeably in certain contexts and refer to an adhesive tape platform or a segment thereof that is equipped with sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node or wireless node can function, for example, as an adhesive tape, label, sticker, decal, a card, a wireless tag, a tracking device, or the like, and as a wireless communications device. A "peripheral" tape node, also referred to as an outer node, leaf node, or terminal node, may in some cases refer to a node that does not have any child nodes. In some instances, a "wireless node" may refer to a node or wireless device of the wireless tracking system that is not an adhesive tape platform. For example, a wireless node, in some embodiments, may have a form factor that is not flexible or may not include an adhesive.

In certain contexts, the terms "wireless tracking system," "hierarchical communications network," "distributed agent operating system," and the like are used interchangeably herein to refer to a system or network of wireless nodes.

Transport of Assets With Wireless Tags

Embodiments described herein relate to shipping and recycling assets that incorporate wireless tags for tracking and monitoring the assets. Each shipment is carried out in two stages: a first stage in which an asset is shipped to a primary destination address by a first delivery service (e.g., US Postal Service, United Parcel Service, and Federal Express); and a second stage in which a wireless tag is shipped to a renovation or recycling facility by a second delivery service (e.g., US Postal Service, United Parcel Service, and Federal Express). The wireless tag also is shipped to a recycling facility for renovation or recycling by a delivery service in response to a determination that the charge storage component of a wireless tag falls below a charge level threshold.

FIG. 1A is a schematic diagram illustrating a front side 110 of one example wireless tag 112 having a form factor that is similar in size and/or in shape to the form factor of a business card or a postcard. For example, wireless tag 112 is one of square, rectangular, or regular in shape. Wireless tag 112 may have alternative form factors without departing from the scope hereof. In certain embodiments, form factors are irregular and/or specialized such as a luggage tag form factor wherein wireless tag 112 may be wound around a portion of an asset and adhered to itself. In another embodiment, wireless tag 112 has a specialized form factor that adheres to a particular asset or part thereof. For example, wireless tag 112 may have a form factor that attaches to a narrow or irregular portion of an asset. In another embodiment, wireless tag 112 has a form factor similar to adhesive tape, having one or more adhesive surfaces or adhesive portions of surfaces. In another embodiment, wireless tag 112 has a form factor that is small enough to fit into narrow or tight areas of an asset. In another embodiment, wireless tag 112 has a form factor that is large enough to be clearly visible on large assets and may use additional or different mechanisms to adhere or affix to the large assets.

In certain embodiments, wireless tag 112 has a form factor that is similar to a flexible adhesive tape platform having a flexible polymer layer encapsulating one or more electronic components (as discussed below with reference to FIG. 6) of wireless tag 112 to facilitate use of bending, torqueing, pressing, or other forces that may be applied to the flexible adhesive tape platform. For example, both the luggage tag form factor and the flexible form factor are bendable along at least one axis to adhere to itself, such as when secured around one of a wire, a cord, a lever, and a handle of an asset. The flexible adhesive tape platform may include one or more flexible film layers having reflective surfaces or reflective surface coatings and/or paper substrates. Example compositions for flexible film layers include polymer films, such as polyester, polyimide, polyethylene terephthalate (PET), and other plastics. The flexible adhesive tape platform may include one or more pressure-sensitive (e.g., silicon-based) adhesive layers and/or flexible epoxy layers. The flexible adhesive tape platform may have other compositions and layers such as one or more of insulating layers or materials, colored layers or materials, light-reflective layers or materials, light-absorbing layers or materials, and light-emitting coatings, layers, and/or materials. In some embodiments, one or more layers of the form factor are adhered together. For example, the form factor includes a first adhesive layer between a front side of the wireless tag and a rechargeable battery or other energy source, and further includes a second adhesive layer between the rechargeable battery or other energy source and the back side of the wireless tag.

In some embodiments, one or more layers or components of the form factor are rigid such that the adhesive tape platform is rigid at least along one axis. In certain embodiments, the form factor includes modules or portions that are mechanically or chemically affixed or adhered together and are removeable (e.g., a removeable battery module as discussed below with reference to FIGS. 18A-18C). Front side 110 of wireless tag 112 includes text instructing on orientation of wireless tag 112 with the front-side text instructions facing outward during the first shipment stage. In particular, the front-side instructions indicate that front side 110 of wireless tag 112 should face outward until the asset has been delivered to a first destination address. In some embodiments, the front side of wireless tag 112 additionally or alternatively includes pictograms depicting a series of steps for removing the asset from the sleeve and reinserting the asset into the sleeve such that the back side of the asset is visible through the sleeve, as discussed further in conjunction with FIG. 2. During the first shipment stage, wireless tag 112 performs tracking and sensing tasks, such as, monitoring the location and state of wireless tag 112 and its environment, and wirelessly reporting a status of wireless tag 112.

Figure 1B:
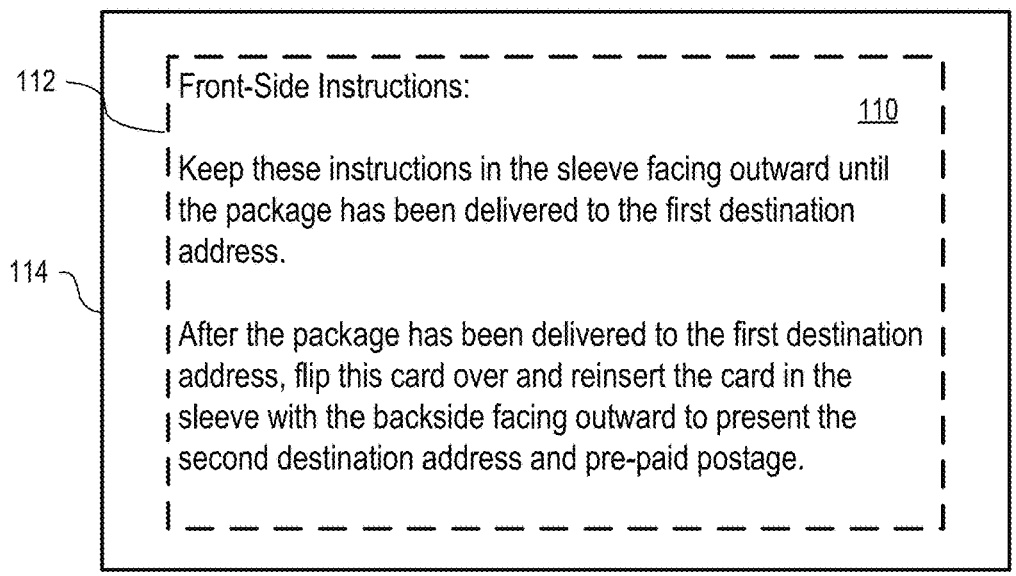

As shown in FIG. 1B, wireless tag 112 may be positioned in a sleeve 114 having a transparent front side, wherein a back side of sleeve 114 attaches to an asset. As shown in FIG. 1, instructions on the front side 110 of wireless tag 112 are thus visible through the transparent front side of sleeve 114. Sleeve 114 may be used to carry additional items relevant to the asset, such as one or more of a bill of lading, an invoice, and other information relevant to the asset.

Figure 1C:
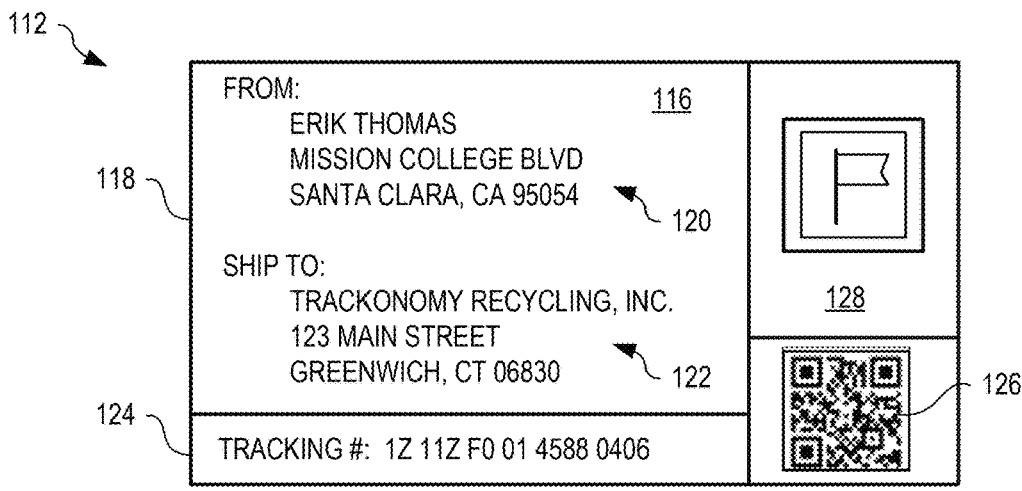

FIG. 1C shows one example of a back side 116 of wireless tag 112 of FIGS. 1A and 1B. Back side 116 includes an address section 118 for displaying a source address 120 and a destination (or shipping) address 122. Back side 116 also includes a tracking number section 124, a barcode section 126, and a postage section 128.

Figure 2:
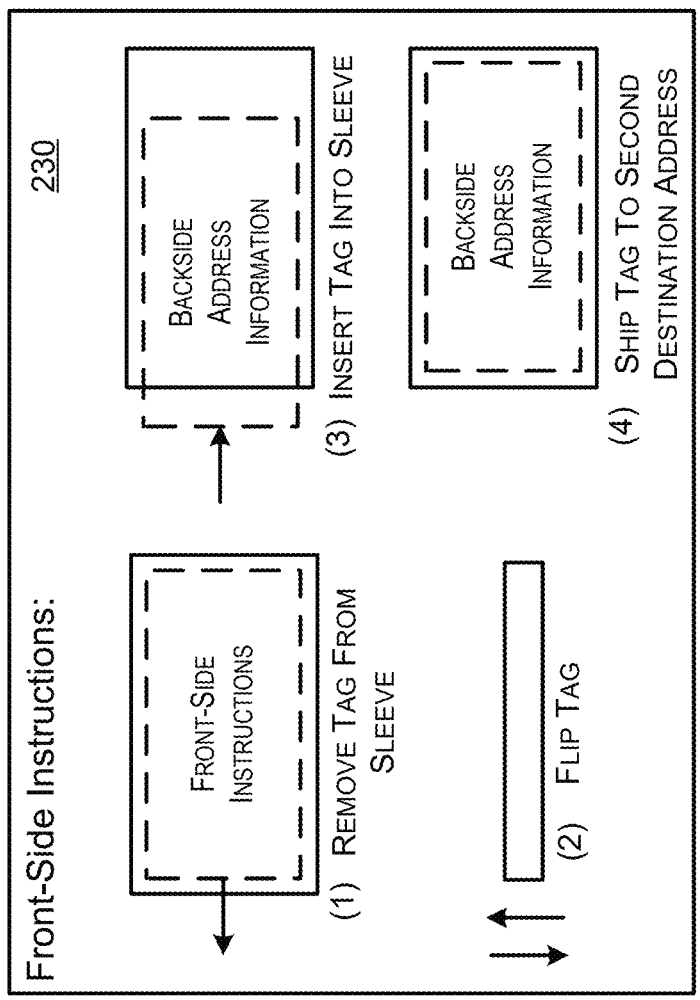
FIG. 2 is a schematic diagram illustrating alternative front side instructions of the wireless tag of FIGS. 1A-1C, in embodiments.

FIG. 2 is a schematic diagram illustrating alternative front side instructions 230 of wireless tag 112 that display pictogram instructions for configuring the orientation of wireless tag 112 during the transition between two shipment stages. For example, after an asset is shipped to a primary destination address by a first delivery service (e.g., US Postal Service, United Parcel Service, Federal Express, etc., where wireless tag 112 is not used to display the primary destination address), a second delivery stage involves: (1) removing wireless tag 112 from sleeve 114 (if present); (2) flipping wireless tag 112 over to reveal address information; (3) inserting wireless tag 112 into sleeve 114 such that backside 116 of wireless tag 112 faces out through the transparent front of sleeve 114; and (4) by a second delivery service (e.g., US Postal Service, United Parcel Service, Federal Express, etc.), shipping the wireless tag 112 to the second destination address, which may be a renovation or recycling facility.

Figure 3:
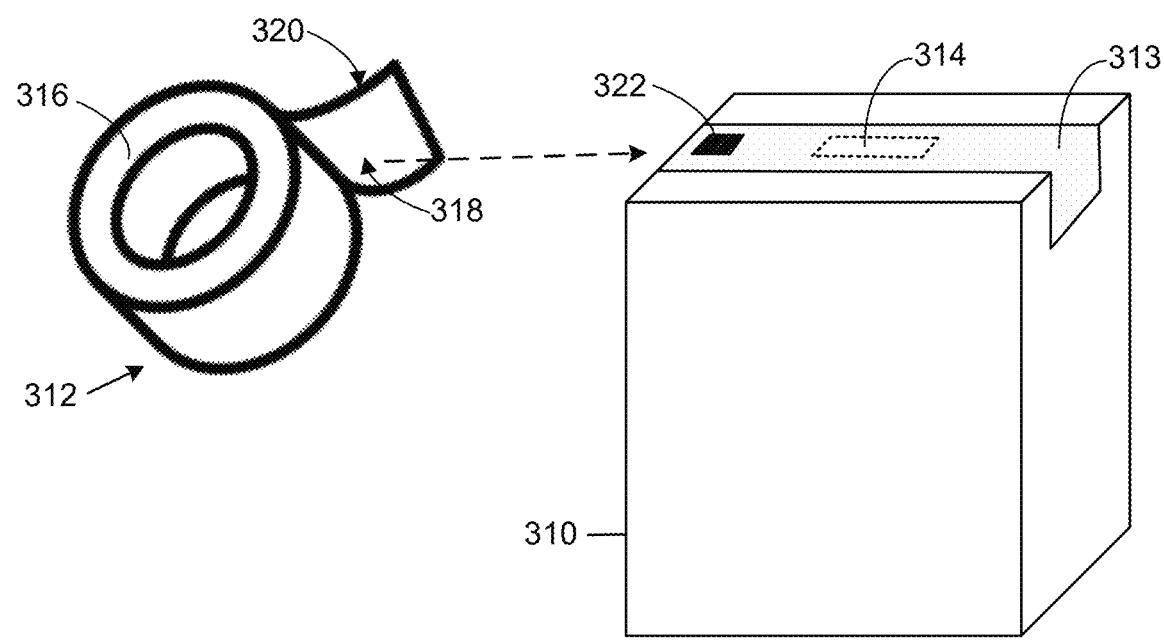
FIG. 3 is a schematic illustrating one example adhesive tape-agent platform used to seal a package for shipment, in embodiments.

FIG. 3 is a schematic illustrating one example adhesive tape-agent platform 312, including wireless transducing circuit 314, used to seal a package 310 for shipment. In this example, a segment 313 of the adhesive tape-agent platform 312 is dispensed from a roll 316 and affixed to the package 310. The adhesive tape-agent platform 312 includes an adhesive side 318 and a non-adhesive surface 320. The adhesive tape-agent platform 312 may be dispensed from the roll 316 in the same way as any conventional packing tape, shipping tape, or duct tape. For example, the adhesive tape-agent platform 312 may be dispensed from the roll 316 by hand, laid across the seam where the two top flaps of the package 310 meet, and cut to a suitable length either by hand or using a cutting instrument (e.g., scissors or an automated or manual tape dispenser). Examples of such tape agents include tape agents having non-adhesive surface 320 that carry one or more coatings or layers (e.g., colored, light reflective, light absorbing, and/or light emitting coatings or layers). Further, the segment 313 may include an identifier 322 (e.g., a QR code, RFID chip, etc.) that may be used to associate the segment 313 with the package 310, as discussed below.

Figure 4:
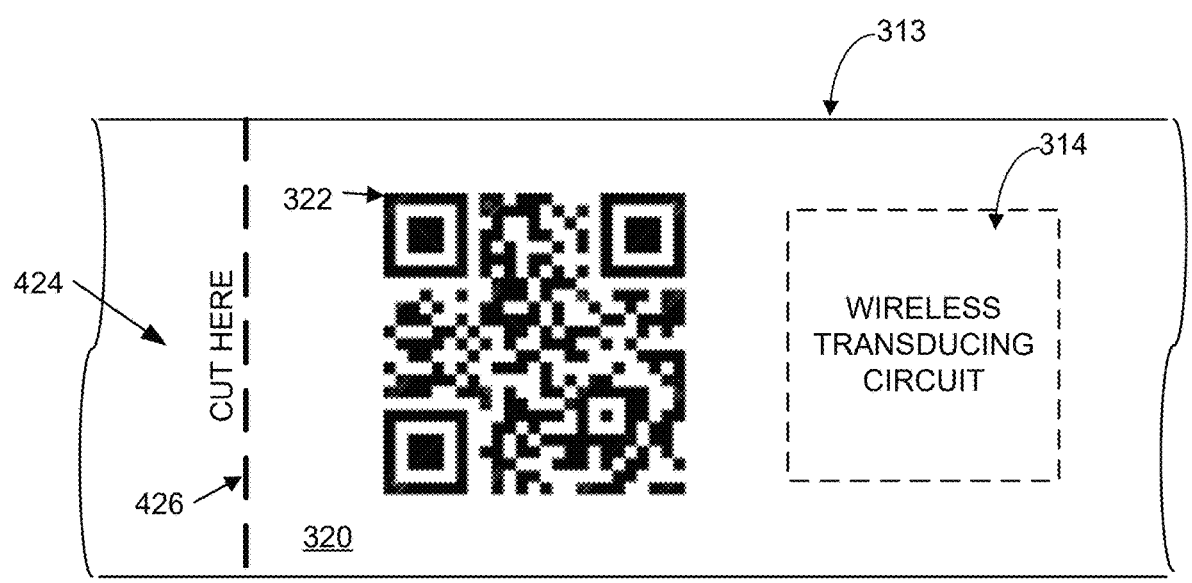
FIG. 4 is a schematic illustrating a non-adhesive surface of a segment of the adhesive tape agent platform of FIG. 3, in embodiments.

FIG. 4 is a schematic illustrating a non-adhesive surface 320 of the segment 313 of the adhesive tape agent platform 312 of FIG. 3 including writing or other markings that convey instructions, warnings, or other information to a person or machine (e.g., a bar code reader), or may simply be decorative and/or entertaining. For example, different types of adhesive tape-agent platforms may be marked with distinctive colorations to distinguish one type of adhesive tape agent platform from another. In the illustrated example of FIG. 4, the segment 313 of the adhesive tape agent platform 312 includes an identifier 322 (e.g., a two-dimensional bar code, such as a QR Code), written instructions 424 (e.g., "Cut Here"), and an associated cut line 426 that indicates where the user should cut the adhesive tape agent platform 312. The written instructions 424 and the cut line 426 typically are printed or otherwise marked on the top non-adhesive surface 320 of the adhesive tape agent platform 312 during manufacture. The identifier 322 (e.g., a two-dimensional bar code), on the other hand, may be marked on the non-adhesive surface 320 of the adhesive tape agent platform 312 during the manufacture of the adhesive tape agent platform 312 or, alternatively, may be marked on the non-adhesive surface 320 of the adhesive tape agent platform 312 as needed using, for example, a printer or other marking device.

To avoid damaging the functionality of the segments of the adhesive tape agent platform 312, the cut lines 426 may demarcate the boundaries between adjacent segments at locations that are free of any active components of the wireless transducing circuit 314. The spacing between the wireless transducing circuit 314 and the cut lines 426 may vary depending on the intended communication, transducing and/or adhesive taping application. In the example illustrated in FIG. 3, the length of the adhesive tape-agent platform 312 that is dispensed to seal the package 310 corresponds to a single segment of the adhesive tape-agent platform 312. In other examples, the length of the adhesive tape-agent platform 312 needed to seal a package or otherwise serve the adhesive function for which the adhesive tape-agent platform 312 is being applied may include multiple segments 313 of the adhesive tape-agent platform 312, one or more of which segments 313 may be activated upon cutting the length of the adhesive tape-agent platform 312 from the roll 316 and/or applying the segment 313 of the adhesive tape agent platform to the package 310.

In some examples, the wireless transducing circuits 314 embedded in one or more segments 313 of the adhesive tape-agent platform 312 are activated when the adhesive tape agent platform 312 is cut along the cut line 426. In these examples, the adhesive tape-agent platform 312 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the wireless transducing circuit 314 in one or more segments of the adhesive tape-agent platform 312 in response to being separated from the adhesive tape-agent platform 312 (e.g., along the cut line 426).

In some examples, each segment 313 of the adhesive tape agent platform 312 includes its own respective energy source. In some embodiments, the energy source is a battery of a type described above, an energy harvesting component or system that harvests energy from the environment, or both. In some of these examples, each energy source is configured to only supply power to the components in its respective adhesive tape platform segment regardless of the number of contiguous segments that are in a given length of the adhesive tape-agent platform 312. In other examples, when a given length of the adhesive tape agent platform 312 includes multiple segments 313, the energy sources in the respective segments 313 are configured to supply power to the wireless transducing circuit 314 in all of the segments 313 in the given length of the adhesive tape agent platform 312. In some of these examples, the energy sources are connected in parallel and concurrently activated to power the wireless transducing circuit 314 in all of the segments 313 at the same time. In other examples, the energy sources are connected in parallel and alternately activated to power the wireless transducing circuit 314 in respective ones of the segments 313 at different time periods, which may or may not overlap.

Figure 5:
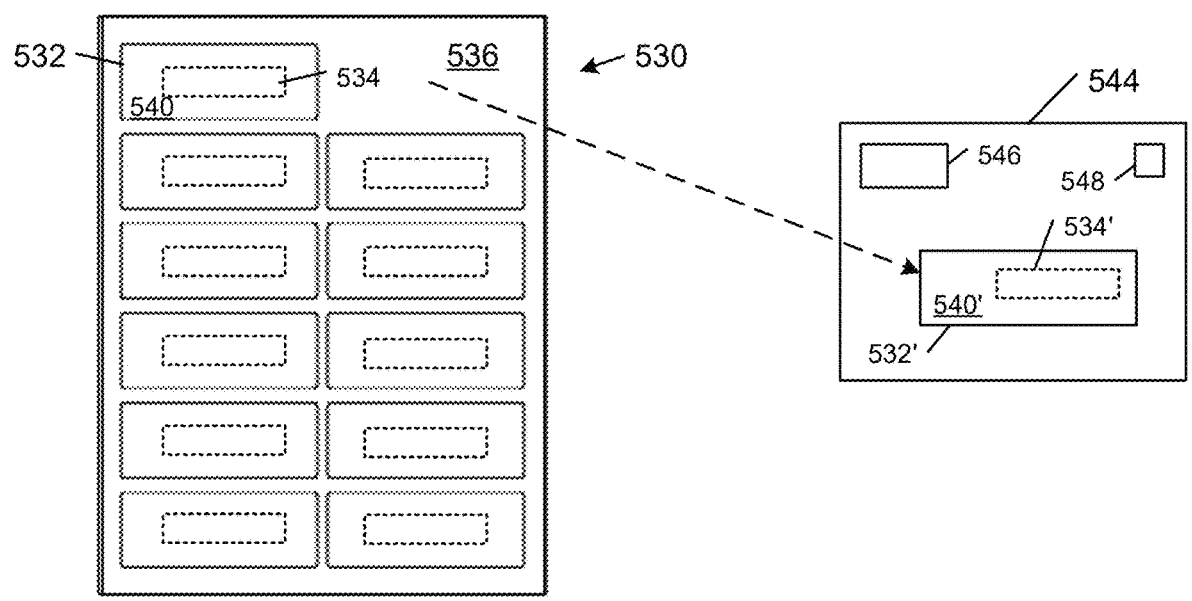
FIG. 5 shows one example adhesive tape platform that includes a set of adhesive tape platform segments on a backing sheet, in embodiments.

FIG. 5 shows an example adhesive tape platform 530 that includes a set of adhesive tape platform segments 532 each of which includes a respective set of embedded wireless transducing circuit components 534, and a backing sheet 536 with a release coating that prevents the adhesive segments 532 from adhering strongly to the backing sheet 536. Adhesive tape platform 530 may represent adhesive tape platform 312 of FIG. 3. Each adhesive tape platform segment 532 includes an adhesive side facing the backing sheet 536, and an opposing non-adhesive side 540. In this example, a particular segment 532 of the adhesive tape platform 530 has been removed from the backing sheet 536 and affixed to an envelope 544. Each segment 532 of the adhesive tape platform 530 can be removed from the backing sheet 536 in the same way that adhesive labels can be removed from a conventional sheet of adhesive labels (e.g., by manually peeling a segment 532 from the backing sheet 536). In general, the non-adhesive side 540 of the segment 532 may include any type of writing, markings, decorative designs, or other ornamentation. In the illustrated example, the non-adhesive side 540 of the segment 532 includes writing or other markings that correspond to a destination address for the envelope 544. The envelope 44 also includes a return address 546 and, optionally, a postage stamp or mark 548.

In some examples, segments of the adhesive tape platform 530 are deployed by a human operator. The human operator may be equipped with a mobile phone or other device that allows the operator to authenticate and initialize the adhesive tape platform 530. In addition, the operator can take a picture of a parcel including the adhesive tape platform and any barcodes associated with the parcel and, thereby, create a persistent record that links the adhesive tape platform 530 to the parcel. In addition, the human operator typically will send the picture to a network service and/or transmit the picture to the adhesive tape platform 530 for storage in a memory component of the adhesive tape platform 530.

In some examples, the wireless transducing circuit components 534 that are embedded in a segment 532 of the adhesive tape platform 530 are activated when the segment 532 is removed from the backing sheet 536. In some of these examples, each segment 532 includes an embedded capacitive sensing system that can sense a change in capacitance when the segment 532 is removed from the backing sheet 536. As explained in detail below, a segment 532 of the adhesive tape platform 530 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 534 in the segment 532 in response to the detection of a change in capacitance between the segment 532 and the backing sheet 536 as a result of removing the segment 532 from the backing sheet 536.

Figure 6:
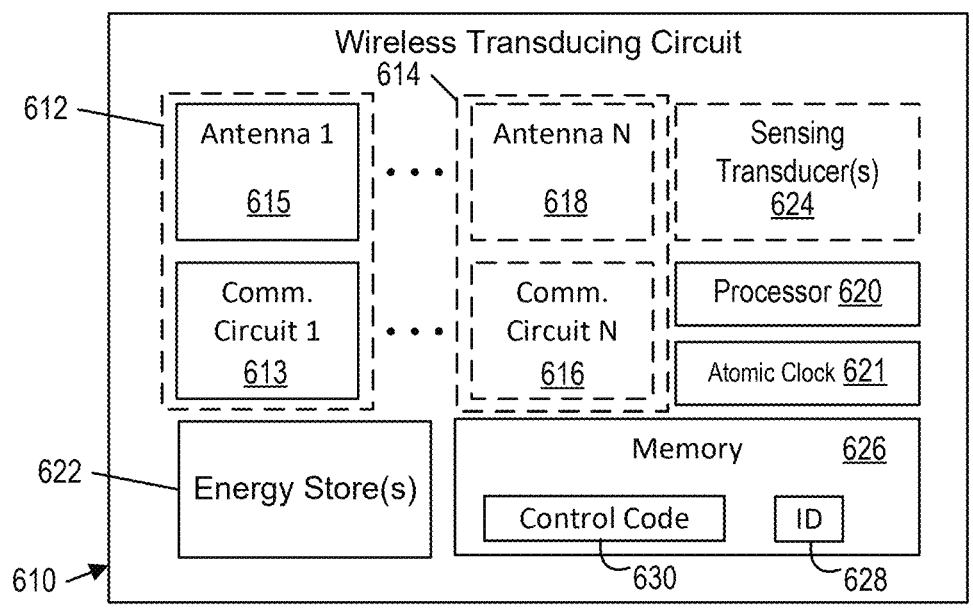
FIG. 6 is a block diagram illustrating components of an example wireless transducing circuit that includes one or more wireless communication modules, in embodiments.

FIG. 6 shows a block diagram of the components of an example wireless transducing circuit 610 (e.g., an agent) that includes one or more wireless communication modules 612, 614. Each wireless communication module 612, 614 includes a wireless communication circuit 613, 616, and an antenna 615, 618, respectively. Each wireless communication circuit 613, 616 may represent a receiver or transceiver integrated circuit that implements one or more of GSM/GPRS, Wi-Fi, LoRa, Bluetooth, Bluetooth Low Energy, Z-wave, and ZigBee. The wireless transducing circuit 610 also includes a processor 620 (e.g., a microcontroller or microprocessor), a solid-state atomic clock 621, at least one energy store 622 (e.g., non-rechargeable or rechargeable printed flexible battery, conventional single or multiple cell battery, and/or a super capacitor or charge pump), one or more sensing transducers 624 (e.g., sensors and/or actuators, and, optionally, one or more energy harvesting transducers). In some examples, the conventional single or multiple cell battery may be a watch style disk or button cell battery that is in an associated electrical connection apparatus (e.g., a metal clip) that electrically connects the electrodes of the battery to contact pads on the wireless transducing circuit 610.

Sensing transducers 624 may represent one or more of a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, a humidity sensor, a light emitting units (e.g., light emitting diodes and displays), electro-acoustic transducers (e.g., audio speakers), electric motors, and thermal radiators (e.g., an electrical resistor or a thermoelectric cooler).

Wireless transducing circuit 610 includes a memory 626 for storing data, such as profile data, state data, event data, sensor data, localization data, security data, and/or at least one unique identifier (ID) 628 associated with the wireless transducing circuit 610, such as one or more of a product ID, a type ID, and a media access control (MAC) ID. Memory 626 may also store control code 630 that includes machine-readable instructions that, when executed by the processor 620, cause processor 620 to perform one or more autonomous agent tasks. In certain embodiments, the memory 626 is incorporated into one or more of the processor 620 or sensing transducers 624. In other embodiments, memory 626 is integrated in the wireless transducing circuit 610 as shown in FIG. 6. The control code 630 may implement programmatic functions or program modules that control operation of the wireless transducing circuit 610, including implementation of an agent communication manager that manages the manner and timing of tape agent communications, a node-power manager that manages power consumption, and a tape agent connection manager that controls whether connections with other nodes are secure connections (e.g., connections secured by public key cryptography) or unsecure connections, and an agent storage manager that securely manages the local data storage on the wireless transducing circuit 610. In certain embodiments, a node connection manager ensures the level of security required by the end application and supports various encryption mechanisms. In some examples, a tape agent power manager and communication manager work together to optimize the battery consumption for data communication. In some examples, execution of the control code by the different types of nodes described herein may result in the performance of similar or different functions.

Figure 7:
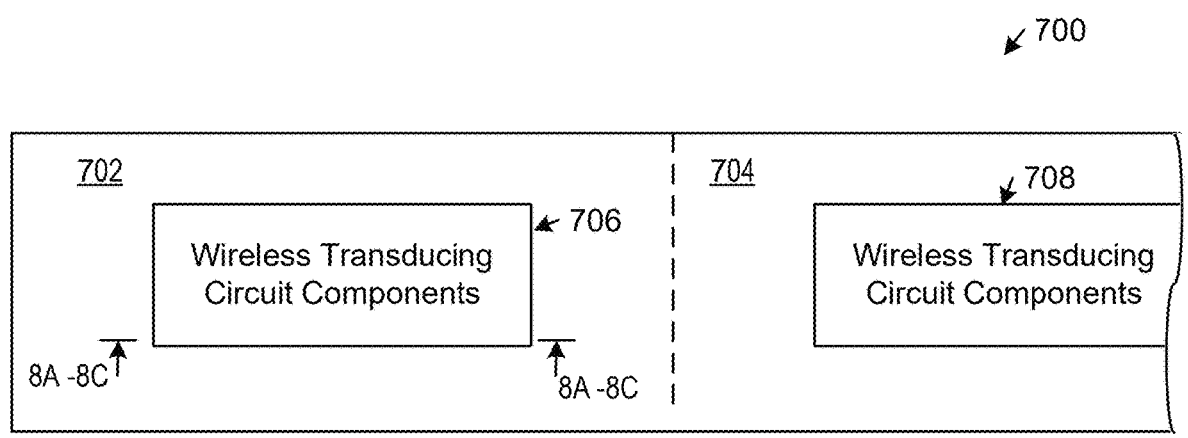
FIG. 7 is a top view of a portion of an example flexible adhesive tape platform illustrating a first segment and a portion of a second segment, in embodiments.

FIG. 7 is a top view of a portion of an example flexible adhesive tape platform 700 that shows a first segment 702 and a portion of a second segment 704. Each segment 702, 704 of the flexible adhesive tape platform 700 includes a respective set 706, 708 of the components of the wireless transducing circuit 610 of FIG. 6. The segments 702, 704 and their respective sets of components 706, 708 typically are identical and configured in the same way. In some other embodiments, however, the segments 702, 704 and/or their respective sets of components 706, 708 are different and/or configured in different ways. For example, in some examples, different sets of the segments of the flexible adhesive tape platform 700 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

An example method of fabricating the adhesive tape platform 700 according to a roll-to-roll fabrication process is described in connection with FIGS. 8A-8C and as shown in FIGS. 7A and 7B of U.S. patent application Ser. No. 15/842,861, filed Dec. 14, 2017, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

Figure 8A:
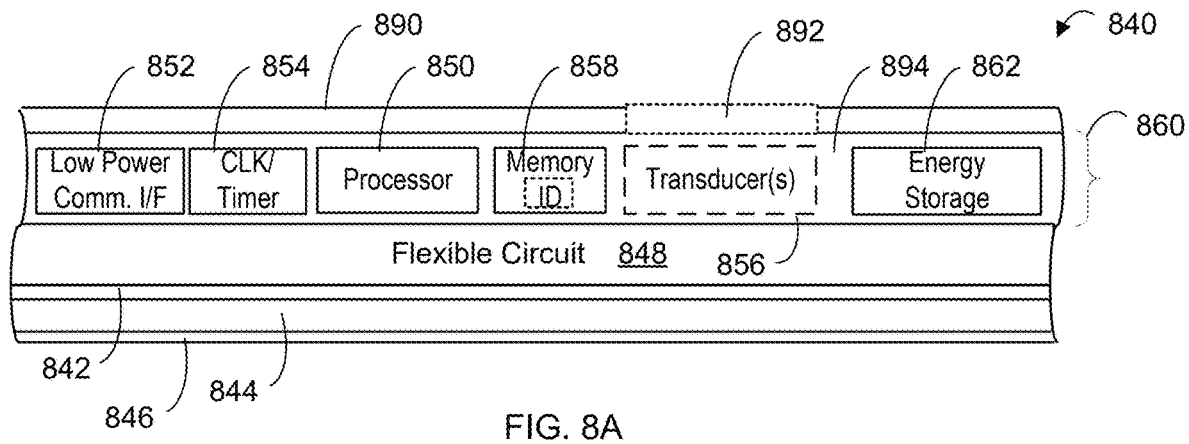
FIGS. 8A-C are schematic diagrams illustrating cross-sectional side views of portions of example segments of three types of flexible adhesive tape agent platforms, in embodiments.

FIG. 8A is a schematic illustrating a cross-sectional side view of a portion of an example segment 840 of a flexible adhesive tape agent platform (e.g., platform 700 of FIG. 7) that includes a respective set of the components of the wireless transducing circuit 610 corresponding to the first tape-agent type (e.g., white). The segment 840 includes an adhesive layer 842, an optional flexible substrate 844, and an optional adhesive layer 846 on the bottom surface of the flexible substrate 844. When the bottom adhesive layer 846 is present, a release liner (not shown) may be (weakly) adhered to the bottom surface of the adhesive layer 846. In certain embodiments where adhesive layer 846 is included, the adhesive layer 846 is an adhesive (e.g., an acrylic foam adhesive) with a high-bond strength that is sufficient to prevent removal of the segment 840 from a surface on which the adhesive layer 846 is adhered to without destroying the physical or mechanical integrity of the segment 840 and/or one or more of its constituent components.

In certain embodiments including the optional flexible substrate 844, the optional flexible substrate 844 is a pre-fabricated adhesive tape that includes the adhesive layers 842 and 846 and the optional release liner. In other embodiments including the optional flexible substrate 844, the adhesive layers 842, 846 are applied to the top and bottom surfaces of the flexible substrate 844 during the fabrication of the adhesive tape platform. The adhesive layer 842 may bond the flexible substrate 844 to a bottom surface of a flexible circuit 848, that includes one or more wiring layers (not shown) that connect the processor 850, a low-power wireless-communication interface 852 (e.g., a Zigbee, Bluetooth® Low Energy (BLE) interface, or other low power communication interface), a clock and/or a timer circuit 854, transducing and/or transducer(s) 856 (if present), the memory 858, and other components in a device layer 860 to each other and to the energy storage device 862 and, thereby, enable the transducing, tracking and other functionalities of the segment 840. The low-power wireless-communication interface 852 typically includes one or more of the antennas 615, 618 and one or more of the wireless communication circuits 613, 616 of FIG. 6. The segment 840 may further include a flexible cover 890, an interfacial region 892, and a flexible polymer layer 894.

Figure 8B:
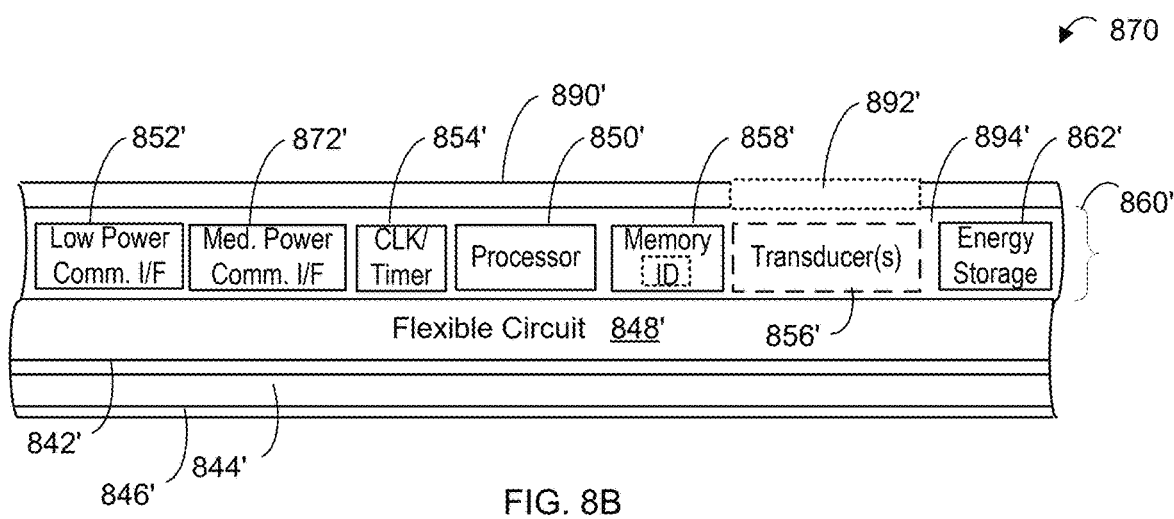

FIG. 8B shows a cross-sectional side-view of a portion of an example segment 870 of a flexible adhesive tape agent platform (e.g., platform 700 of FIG. 7) that includes a respective set of the components of the wireless transducing circuit 610 corresponding to a second tape-agent type (e.g., green). The segment 870 is similar to the segment 840 shown in FIG. 8A but further includes a medium-power communication-interface 872' (e.g., a LoRa interface) in addition to the low-power communications-interface 852. The medium-power communication-interface 872' has a longer communication range than the low-power communication-interface 852'. In certain embodiments, one or more other components of the segment 870 differ from the segment 840 in functionality or capacity (e.g., larger energy source). The segment 870 may include further components, as discussed above and below with reference to FIGS. 8A, and 8C.

Figure 8C:
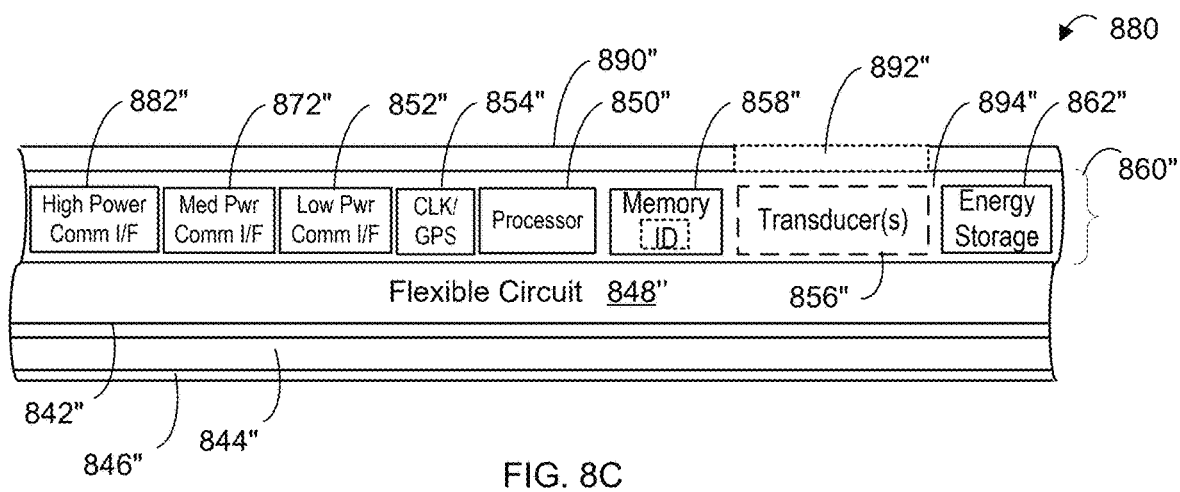

FIG. 8C shows a cross-sectional side view of a portion of an example segment 880 of the flexible adhesive tape-agent platform that includes a respective set of the components of the wireless transducing circuit 610 corresponding to the third tape-node type (e.g., black). The segment 880 is similar to the segment 870 of FIG. 8B, but further includes a high-power communications-interface 882" (e.g., a cellular interface; e.g., GSM/GPRS) in addition to a low-power communications-interface 852", and may include a medium-power communications-interface 872". The high-power communications-interface 882" has a range that provides global coverage to available infrastructure (e.g. the cellular network). In certain embodiments, one or more other components of the segment 880 differ from the segment 870 in functionality or capacity (e.g., larger energy source).

FIGS. 8A-8C show embodiments in which the flexible covers 890, 890', 890" of the respective segments 840, 870, and 880 include one or more interfacial regions 892, 892', 892" positioned over one or more of the transducers 856, 856', 856". In certain embodiments, one or more of the interfacial regions 892, 892', 892" have features, properties, compositions, dimensions, and/or characteristics that are designed to improve the operating performance of the platform for specific applications. In certain embodiments, the flexible adhesive tape platform includes multiple interfacial regions 892, 892', 892" over respective transducers 856, 856', 856", which may be the same or different depending on the target applications. Interfacial regions may represent one or more of an opening, an optically transparent window, and/or a membrane located in the interfacial regions 892, 892', 892" of the flexible covers 890, 890', 890" that is positioned over the one or more transducers and/or transducers 856, 856', 856". Additional details regarding the structure and operation of example interfacial regions 892, 892', 892" are described in U.S. Provisional Patent Application No. 62/680,716, filed Jun. 5, 2018, and U.S. Provisional Patent Application No. 62/670,712, filed May 11, 2018.

In certain embodiments, a planarizing polymer 894, 894', 894" encapsulates the respective device layers 860, 860', 860" and thereby reduces the risk of damage that may result from the intrusion of contaminants and/or liquids (e.g., water) into the device layer 860, 860', 860". The flexible polymer layers 894, 894', 894" may also planarize the device layers 860, 860', 860". This facilitates optional stacking of additional layers on the device layers 860, 860', 860" and also distributes forces generated in, on, or across the segments 840, 870, 880 so as to reduce potentially damaging asymmetric stresses that might be caused by the application of bending, torquing, pressing, or other forces that may be applied to the segments 840, 870, 880 during use. In the illustrated example, a flexible cover 890, 890', 890" is bonded to the planarizing polymer 894, 894', 894" by an adhesive layer (not shown).

The flexible cover 890, 890', 890" and the flexible substrate 844, 844', 844" may have the same or different compositions depending on the intended application. In some examples, one or both of the flexible cover 890, 890', 890" and the flexible substrate 844, 844', 844" include flexible film layers and/or paper substrates, where the film layers may have reflective surfaces or reflective surface coatings. Compositions for the flexible film layers may represent one or more of polymer films, such as polyester, polyimide, polyethylene terephthalate (PET), and other plastics. The optional adhesive layer on the bottom surface of the flexible cover 890, 890', 890" and the adhesive layers 842, 842', 842", 846, 846', 846" on the top and bottom surfaces of the flexible substrate 844, 844', 844" typically include a pressure-sensitive adhesive (e.g., a silicon-based adhesive). In some examples, the adhesive layers are applied to the flexible cover 890, 890', 890" and the flexible substrate 844, 844', 844" during manufacture of the adhesive tape-agent platform (e.g., during a roll-to-roll or sheet-to-sheet fabrication process). In other examples, the flexible cover 890, 890', 890" may be implemented by a prefabricated single-sided pressure-sensitive adhesive tape and the flexible substrate 844, 844', 844" may be implemented by a prefabricated double-sided pressure-sensitive adhesive tape; both kinds of tape may be readily incorporated into a roll-to-roll or sheet-to-sheet fabrication process. In some examples, the flexible substrate 844, 844', 844" is composed of a flexible epoxy (e.g., silicone).

In certain embodiments, the energy storage device 862, 862', 862" is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low-power wireless-communication interface 852, 852', 852" and/or the processor(s) 850, 850', 850" may be integrated on the flexible battery substrate. In some examples, one or more of such components also (e.g., the flexible antennas and the flexible interconnect circuits) may be printed on the flexible battery substrate.

In examples of manufacture, the flexible circuit 848, 848', 848" is formed on a flexible substrate by one or more of printing, etching, or laminating circuit patterns on the flexible substrate. In certain embodiments, the flexible circuit 848, 848', 848" is implemented by one or more of a single-sided flex circuit, a double access or back-bared flex circuit, a sculpted flex circuit, a double-sided flex circuit, a multi-layer flex circuit, a rigid flex circuit, and a polymer-thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example segments 840, 870, 880 shown in FIGS. 8A-8C, the flexible circuit 848, 848', 848" represents a single-access flex-circuit that interconnects the components of the adhesive tape platform on a single side of the flexible circuit 848, 848', 848". However, in other embodiments, the flexible circuit 848, 848', 848" represents a double access flex circuit that includes a front-side conductive pattern that interconnects the low-power communications interface 852, 852', 852", the timer circuit 854, 854', 854", the processor 850, 850', 850", the one or more sensor transducers 856, 856', 856" (if present), and the memory 858, 858', 858", and allows through-hole access (not shown) to a back-side conductive pattern that is connected to the flexible battery (not shown). In these embodiments, the front-side conductive pattern of the flexible circuit 848, 848', 848" connects the communications circuits 852, 852', 852", 872', 872", 882" (e.g., receivers, transmitters, and transceivers) to their respective antennas and to the processor 850, 850', 850" and also connects the processor 850, 850', 850" to the one or more sensors and the memory 858, 858', and 858". The backside conductive pattern connects the active electronics (e.g., the processor 850, 850', 850", the communications circuits 852, 852', 852", 872', 872", 882" and the transducers) on the front-side of the flexible circuit 848, 848', 848" to the electrodes of the energy storage device 862, 862', 862" via one or more through holes in the substrate of the flexible circuit 848, 848', 848".

The various units of the segments 840, 870, 880 shown in FIGS. 8A-8C may be arranged to accommodate different objects or structures (e.g., trash bins, fire extinguishers, etc.) and sensors may be added to, or subtracted from, the segments 840, 870, and 880, according to a particular task.

Figure 9A:
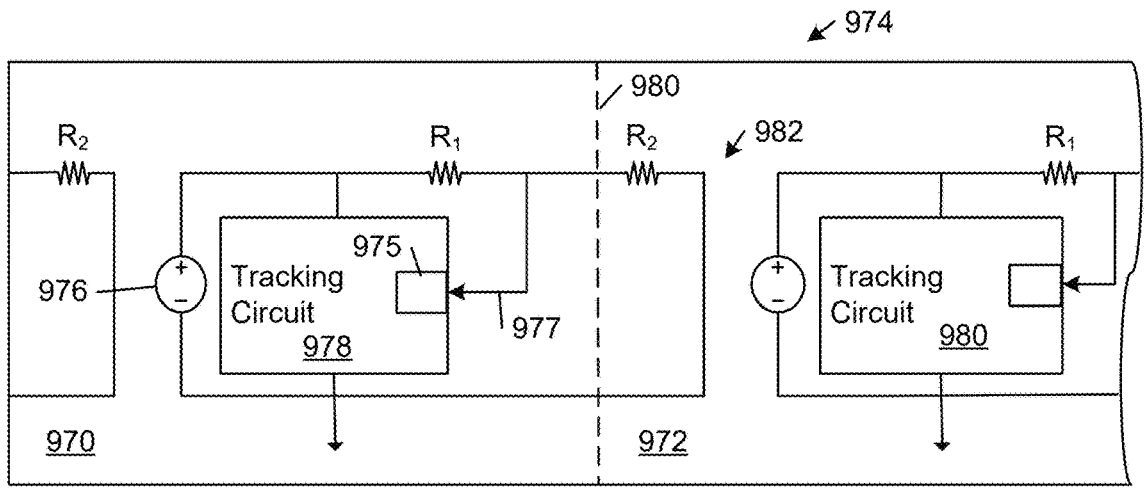
FIG. 9A is a schematic diagram illustrating an adhesive tracking product with a first example wake circuit that delivers power from an energy source to the tracking circuit in response to an event, in embodiments.

Referring to FIG. 9A, in some examples, each of one or more of the segments 970, 972 of a tracking adhesive product 974 includes a respective circuit 975 that delivers power from the respective energy source 976 to the respective tracking circuit 978 (e.g., a processor and one or more wireless communications circuits) in response to an event. In some of these examples, the wake circuit 975 is configured to transition from an off-state to an on-state when the voltage on the wake node 977 exceeds a threshold level, at which point the wake circuit transitions to an on-state to power-on the segment 970. In the illustrated example, this occurs when the user separates the segment from the tracking adhesive product 974, for example, by cutting across the tracking adhesive product 974 at a designated location (e.g., along a designated cut-line 980). In particular, in its initial, un-cut state, a minimal amount of current flows through the resistors R1 and R2. As a result, the voltage on the wake node 977 remains below the threshold turn-on level. After the user cuts across the tracking adhesive product 974 along the designated cut-line 980, the user creates an open circuit in the loop 982, which pulls the voltage of the wake node above the threshold level and turns on the wake circuit 975. As a result, the voltage across the energy source 976 will appear across the tracking circuit 978 and, thereby, turn on the segment 970. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of a tracking adhesive product includes a respective sensor and a respective wake circuit that delivers power from the respective energy source to the respective one or more components of the respective tracking circuit 978 in response to an output of the sensor. In some examples, the respective sensor is a strain sensor that produces a wake signal based on a change in strain in the respective segment. In some of these examples, the strain sensor is affixed to a tracking adhesive product and configured to detect the stretching of the tracking adhesive product segment as the segment is being peeled off a roll or a sheet of the tracking adhesive product. In some examples, the respective sensor is a capacitive sensor that produces a wake signal based on a change in capacitance in the respective segment. In some of these examples, the capacitive sensor is affixed to a tracking adhesive product and configured to detect the separation of the tracking adhesive product segment from a roll or a sheet of the tracking adhesive product. In some examples, the respective sensor is a flex sensor that produces a wake signal based on a change in curvature in the respective segment. In some of these examples, the flex sensor is affixed to a tracking adhesive product and configured to detect bending of the tracking adhesive product segment as the segment is being peeled off a roll or a sheet of the tracking adhesive product. In some examples, the respective sensor is a near field communications sensor that produces a wake signal based on a change in inductance in the respective segment.

Figure 9B:
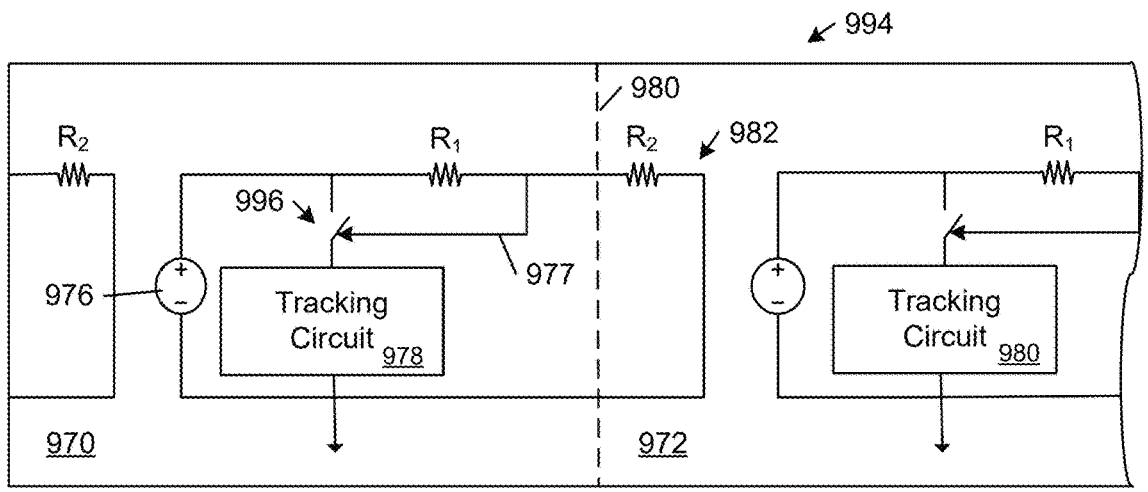
FIG. 9B is a schematic diagram illustrating an adhesive tracking product with a second example wake circuit that delivers power from an energy source to the tracking circuit in response to an event.

FIG. 9B shows another example of a tracking adhesive product 994 that delivers power from the respective energy source 976 to the respective tracking circuit 978 (e.g., a processor and one or more wireless communications circuits) in response to an event. This example is similar in structure and operation as the tracking adhesive product 994 shown in FIG. 9A, except that the wake circuit 975 is replaced by a switch 996 that is configured to transition from an open state to a closed state when the voltage on the switch node 977 exceeds a threshold level. In the initial state of the tracking adhesive product 994, the voltage on the switch node is below the threshold level as a result of the low current level flowing through the resistors R1 and R2. After the user cuts across the tracking adhesive product 994 along the designated cut-line 980, the user creates an open circuit in the loop 982, which pulls up the voltage on the switch node above the threshold level to close the switch 996 and turn on the tracking circuit 978.

A wireless sensing system includes a plurality of wireless nodes configured to detect tampering in assets. Tampering may include, but is not limited to, opening assets such as boxes, containers, storage, or doors, moving the asset without authorization, moving the asset to an unintended location, moving the asset in an unintended way, damaging the asset, shaking the asset in an unintended way, orienting an asset in a way that it is not meant to be oriented. In many cases, these actions may compromise the integrity or safety of assets. Wireless nodes associated with the asset are configured to detect a tampering event. In an embodiment, a tampering event is associated with an action, a time, and a location. In an embodiment, the wireless nodes communicate the tampering event to the wireless sensing system. The wireless sensing system is configured to provide a notification or alert to a user of the wireless sensing system. In some embodiments, a wireless node may directly transmit the notification or alert to the user. In other embodiments, a wireless node may include a display that indicates whether or not a tampering event has occurred (e.g., the display may be an indicator light or LED).

Alerts may be transmitted to server/cloud, other wireless nodes, a client device, or some combination thereof. For example, in an embodiment, a wireless node of the wireless sensing system captures sensor data, detects a tampering event, and transmits an alarm to a user of the wireless sensing system (e.g., without communicating with a server or cloud of the wireless sensing system). In another embodiment, a wireless node of the wireless sensing system captures sensor data and transmits the sensor data to a gateway, parent node (e.g., black tape), or client device. The gateway, parent node, or client device detects a tampering event based on the received sensor data and transmits an alarm to a user of the wireless sensing system. In another embodiment, the wireless node of the wireless sensing system captures sensor data, detects a tampering event, and transmits information describing the tampering event to a server or cloud of the wireless sensing system. The server or cloud of the wireless sensing system transmits an alarm to a user of the wireless sensing system.

Figure 9C:
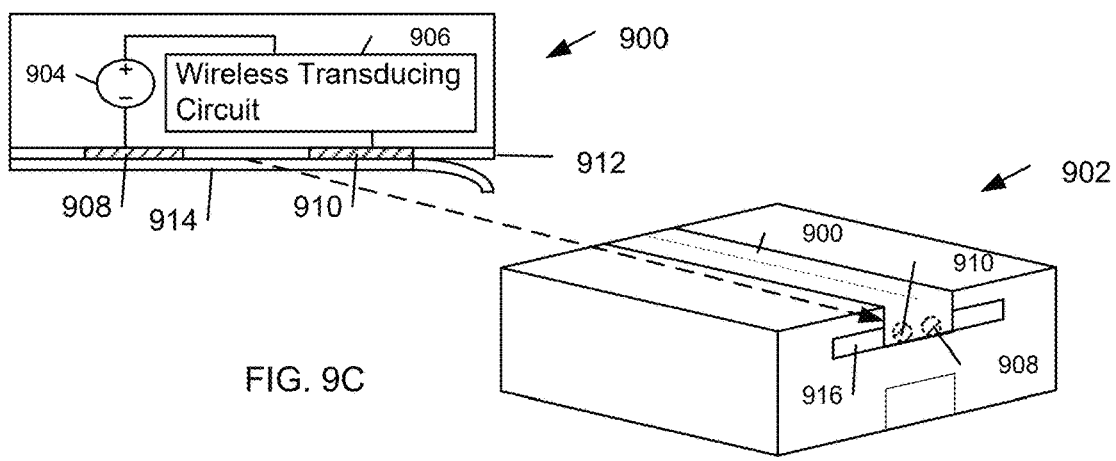
FIG. 9C is a diagrammatic cross-sectional front view of an example adhesive tape platform and a perspective view of an example asset, in embodiments.

FIG. 9C shows a diagrammatic cross-sectional front view of an example adhesive tape platform 900 and a perspective view of an example asset 902. Instead of activating the adhesive tape platform in response to separating a segment of the adhesive tape platform from a roll or a sheet of the adhesive tape platform, this example is configured to supply power from the energy source 904 to turn on the wireless transducing circuit 906 in response to establishing an electrical connection between two power terminals 908, 910 that are integrated into the adhesive tape platform. In particular, each segment of the adhesive tape platform 900 includes a respective set of embedded tracking components, an adhesive layer 912, and an optional backing sheet 914 with a release coating that prevents the segments from adhering strongly to the backing sheet 914. In some examples, the power terminals 908, 910 are composed of an electrically conductive material (e.g., a metal, such as copper) that may be printed or otherwise patterned and/or deposited on the backside of the adhesive tape platform 900. In operation, the adhesive tape platform can be activated by removing the backing sheet 914 and applying the exposed adhesive layer 912 to a surface that includes an electrically conductive region 916. In the illustrated embodiment, the electrically conductive region 916 is disposed on a portion of the asset 902. When the adhesive backside of the adhesive tape platform 900 is adhered to the asset with the exposed terminals 908, 910 aligned and in contact with the electrically conductive region 916 on the asset 902, an electrical connection is created through the electrically conductive region 916 between the exposed terminals 908, 910 that completes the circuit and turns on the wireless transducing circuit 906. In particular embodiments, the power terminals 908, 910 are electrically connected to any respective nodes of the wireless transducing circuit 906 that would result in the activation of the tracking circuit 906 in response to the creation of an electrical connection between the power terminals 908, 910.

In some examples, after a tape node is turned on, it will communicate with the network service to confirm that the user/operator who is associated with the tape node is an authorized user who has authenticated himself or herself to the network service. In these examples, if the tape node cannot confirm that the user/operator is an authorized user, the tape node will turn itself off.

Figure 10:
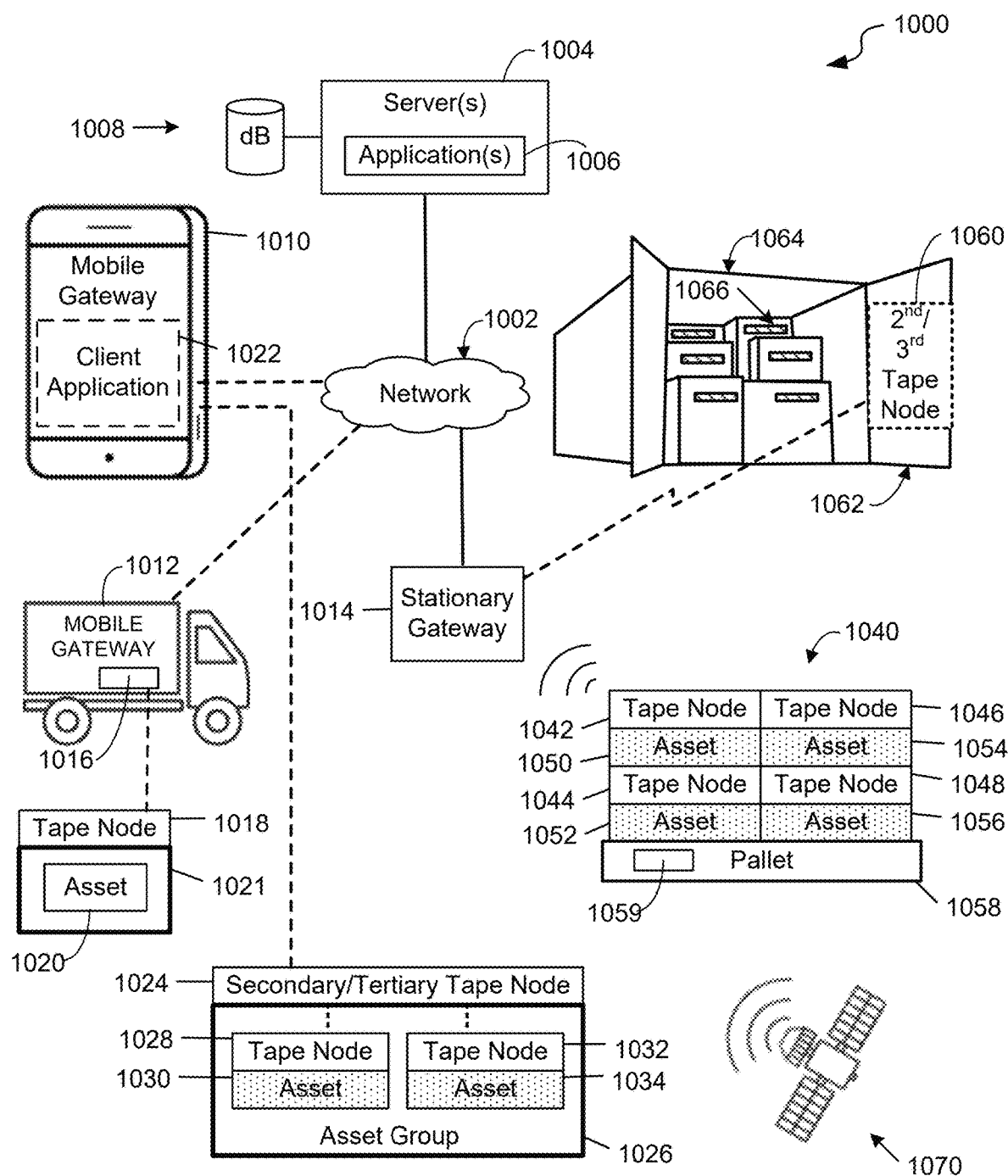
FIG. 10 is a schematic illustrating an example network communications environment that includes a network supporting communications between servers, mobile gateways, a stationary gateway, and various types of tape nodes associated with various assets, in embodiments.

FIG. 10 shows an example network communications environment 1000 that includes a network 1002 that supports communications between one or more servers 1004 executing one or more applications of a network service 1008, mobile gateways 1010 (a smart device mobile gateway), 1012 (a vehicle mobile gateway), a stationary gateway 1014, and various types of tape nodes that are associated with various assets (e.g., parcels, equipment, tools, persons, and other things). Hereinafter "tape nodes" may be used interchangeably with the "agents", as described above, with reference to FIGS. 1-9; the "agents" are in the form of a "tape node" attached to different objects, e.g., an asset, storage container, vehicle, equipment, etc.; the master agent may be referred to as a master tape node, a secondary agent may be referred to as a secondary tape node; and a tertiary agent may be referred to as a tertiary tape node. Network communications environment 1000 may also be called a wireless tracking system 1000.

In some examples, the network 1002 (e.g., a wireless network) includes one or more network communication systems and technologies, including any one or more of wide area networks, local area networks, public networks (e.g., the internet), private networks (e.g., intranets and extranets), wired networks, and wireless networks. For example, the network 1002 includes communications infrastructure equipment, such as a geolocation satellite system 1070 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and Zig-Bee communication systems.

In some examples, the one or more network service applications leverage the above-mentioned communications technologies to create a hierarchical wireless network of tape nodes improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link uses the infrastructure security mechanisms. In the case of communications among tapes nodes, the communication is secured through a custom security mechanism. In certain cases, tape nodes may also be configured to support block chain to protect the transmitted and stored data.

A network of tape nodes may be configured by the network service to create hierarchical communications network. The hierarchy may be defined in terms of one or more factors, including functionality (e.g., wireless transmission range or power), role (e.g., master-tape node vs. peripheral-tape node), or cost (e.g., a tape node equipped with a cellular transceiver vs. a peripheral tape node equipped with a Bluetooth LE transceiver). As described above with reference to the agents, tape nodes may be assigned to different levels of a hierarchical network according to one or more of the above-mentioned factors. For example, the hierarchy may be defined in terms of communication range or power, where tape nodes with higher-power or longer-communication range transceivers are arranged at a higher level of the hierarchy than tape nodes with lower-power or lower-range power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure may be formulated as an optimization problem with battery capacity of nodes, power consumption in various modes of operation, desired latency, external environment, etc. and may be solved using modern optimization methods e.g. neural networks, artificial intelligence, and other machine learning computing systems that take expected and historical data to create an optimal solution and may create algorithms for modifying the system's behavior adaptively in the field.

The tape nodes may be deployed by automated equipment or manually. In this process, a tape node typically is separated from a roll or sheet and adhered to a parcel (e.g., asset 1020) or other stationary (e.g., stationary gateway 1014) or mobile object (e.g., a, such as a delivery truck, such as mobile gateway 1012) or stationary object (e.g., a structural element of a building). This process activates the tape node (e.g., the tape node 1018) and causes the tape node 1018 to communicate with the one or more servers 1004 of the network service 1008. In this process, the tape node 1018 may communicate through one or more other tape nodes (e.g., the tape nodes 1042, 1044, 1046, 1048) in the communication hierarchy. In this process, the one or more servers 1004 executes the network service application 1006 to programmatically configure tape nodes 1018, 1024, 1028, 1032, 1042, 1044, 1046, 1048, that are deployed in the network communications environment 1000. In some examples, there are multiple classes or types of tape nodes (e.g., a master agent, a secondary agent, or tertiary agent), where each tape node class has a different respective set of functionalities and/or capacities, as described herein with respect to the "agents" in FIGS. 1-9. For example, the master agents have a lower-power wireless communication interface (e.g., the low-power wireless-communication interface 852, with reference to FIG. 8A-C), in comparison to the secondary and tertiary agents.

In some examples, the one or more servers 1004 communicate over the network 1002 with one or more gateways 1010, 1012, 1014 that are configured to send, transmit, forward, or relay messages to the network 1002 in response to transmissions from the tape nodes 1018, 1024, 1028, 1032, 1042, 1044, 1046, 1048 that are associated with respective assets and within communication range. Example gateways include mobile gateways 1010, 1012 and a stationary gateway 1014. In some examples, the mobile gateways 1010, 1012, and the stationary gateway 1014 are able to communicate with the network 1002 and with designated sets or groups of tape nodes.

In some examples, the mobile gateway 1012 is a vehicle (e.g., a delivery truck or other mobile hub) that includes a wireless communications unit 1016 that is configured by the network service 1008 to communicate with a designated network of tape nodes, including tape node 1018 (e.g., a master tape node) in the form of a label that is adhered to a parcel 1021 (e.g., an envelope) that contains an asset 1020, and is further configured to communicate with the network service 1008 over the network 1002. In some examples, the tape node 1018 includes a lower-power wireless-communications interface of the type used in, e.g., segment 840 (shown in FIG. 8A), and the wireless communications unit 1016 may be implemented by a secondary or tertiary tape node (e.g., one of segment 870 or segment 880, respectively shown in FIGS. 8B and 8C) that includes a lower-power communications interfaces for communicating with tape nodes within range of the mobile gateway 1012 and a higher-power communications-interface for communicating with the network 1002. In this way, the tape node 1018 and wireless communications unit 1016 create a hierarchical wireless network of tape nodes for transmitting, forwarding, bridging, relaying, or otherwise communicating wireless messages to, between, or on behalf of the tape node 1018 in a power-efficient and cost-effective way.

In some examples, a mobile gateway 1010 is a mobile phone that is operated by a human operator and executes a client application 1022 that is configured by a network service to communicate with a designated set of tape nodes, including a secondary or tertiary tape node 1024 that is adhered to a parcel 1026 (e.g., a box), and is further configured to communicate with a server 1004 over the network 1002. In the illustrated example, the parcel 1026 contains a first parcel labeled or sealed by a master tape node 1028 and containing a first asset 1030, and a second parcel labeled or sealed by a master tape node 1032 and containing a second asset 1034. The secondary or tertiary tape node 1024 communicates with each of the master tape nodes 1028, 1032 and also communicates with the mobile gateway 1010. In some examples, each of the master tape nodes 1028, 1032 includes a lower-power wireless-communications interface of the type used in, e.g., segment 840 (shown in FIG. 8A), and the secondary/tertiary tape node 1024 is implemented by a tape node (e.g., segment 870 or segment 880, shown in FIGS. 8B and 8C) that includes a low-power communications interface for communicating with the master tape nodes 1028, 1032 contained within the parcel 1026, and a higher-power communications interface for communicating with the mobile gateway 1010. The secondary or tertiary tape node 1024 is operable to relay wireless communications between the master tape nodes 1028, 1032 contained within the parcel 1026 and the mobile gateway 1010, and the mobile gateway 1010 is operable to relay wireless communications between the secondary or tertiary tape node 1024 and the server 1004 over the network 1002. In this way, the master tape nodes 1028 and 1032 and the secondary or tertiary tape node 1024 create a wireless network of nodes for transmitting, forwarding, relaying, or otherwise communicating wireless messages to, between, or on behalf of the master tape nodes 1028, 1032, the secondary or tertiary tape node 1024, and the network service (not shown) in a power-efficient and cost-effective way.

In some embodiments, the client application 1022 is installed on a mobile device (e.g., smartphone) that may also operate as mobile gateway 1010. The client application 1022 may cause the mobile device to function as a mobile gateway 1010. For example, the client application 1022 runs in the background to allow the mobile device to bridge communications between tape nodes that are communicating on one protocol to other tape nodes that are communicating on another protocol. For example, a tape node transmits data to the mobile device through Bluetooth, and the mobile device (running the client application 1022) relays that data to the server 1004 via cellular (2G, 3G, 4G, 5G) or Wi-Fi. Further, the client application 1022 may cause the mobile device to establish a connection with, and receive pings (e.g., alerts to nearby assets that an environmental profile threshold has been exceeded), from the tape nodes or from the server 1004. The tape nodes or server may request services (e.g., to display alert messages within a graphical user interface of the mobile device, relay messages to nearby tape nodes or mobile or stationary gateways, delegate tasks to the mobile device, such as determining the location of the tape node, etc.) from the mobile device. For example, the mobile device running the client application 1022 may share location data with the tape node, allowing the tape node to pinpoint its location.

In some examples, the stationary gateway 1014 is implemented by a server 1004 executing a network service application 1006 that is configured by the network service 1008 to communicate with a designated set 1040 of master tape nodes 1042, 1044, 1046, 1048 that are adhered to respective parcels containing respective assets 1050, 1052, 1054, 1056 on a pallet 1058. In other examples, the stationary gateway 1014 is implemented by a secondary or tertiary tape node 1060 (e.g., segments 870 or 880, respectively shown in FIGS. 8B and 8C) that is adhered to, for example, a wall, column or other infrastructure component of the physical premise's environment 1000, and includes a low-power communications interface for communicating with nodes within range of the stationary gateway 1014 and a higher-power communications interface for communicating with the network 1002.

In one embodiment, each of the master tape nodes 1042-1048 is a master tape node and is configured by the network service 1008 to communicate individually with the stationary gateway 1014, which relays communications from the master tape nodes 1042-1048 to the network service 1008 through the stationary gateway 1014 and over the network 1002. In another embodiment, one of the master tape nodes 1042-1048 at a time is configured to transmit, forward, relay, or otherwise communicate wireless messages to, between, or on behalf of the other master nodes on the pallet 1058. In this embodiment, the master tape node may be determined by the master tape nodes 1042-1048 or designated by the network service 1008. In some examples, the master tape nodes 1042-1048 with the longest range or highest remaining power level is determined to be the master tape node. In some examples, when the power level of the current master tape node drops below a certain level (e.g., a fixed power threshold level or a threshold level relative to the power levels of one or more of the other master tape nodes), another one of the master tape nodes assumes the role of the master tape node. In some examples, a master tape node 1059 is adhered to the pallet 1058 and is configured to perform the role of a master node for the other master tape nodes 1042-1048. In these ways, the master tape nodes 1042-1048, 1059 are configurable to create different wireless networks of nodes for transmitting, forwarding, relaying, bridging, or otherwise communicating wireless messages with the network service 408 through the stationary gateway 1014 and over the network 1002 in a power-efficient and cost-effective way.

In the illustrated example, the stationary gateway 1014 also is configured by the network service 1008 to communicate with a designated network of tape nodes, including the secondary or tertiary tape node 1060 that is adhered to the inside of a door 1062 of a shipping container 1064, and is further configured to communicate with the network service 1008 over the network 1002. In the illustrated example, the shipping container 1064 contains a number of parcels labeled or sealed by respective master tape nodes 1066 and containing respective assets. The secondary or tertiary tape node 1060 communicates with each of the master tape nodes 1066 within the shipping container 1064 and communicates with the stationary gateway 1014. In some examples, each of the master tape nodes 1066 includes a low-power wireless communications-interface (e.g., the low-power wireless-communication interface 852, 852', 852", with reference to FIGS. 8A-8C), and the secondary or tertiary tape node 1060 includes a low-power wireless-communications interface (low-power wireless-communication interfaces 852', 852", with reference to FIGS. 8B-8C) for communicating with the master tape nodes 1066 contained within the shipping container 1064, and a higher-power wireless-communications interface (e.g., medium-power wireless-communication interface 872', medium-power wireless-communication interface 872'', high-power wireless-communication interface 882'', with reference to FIGS. 8B-8C) for communicating with the stationary gateway 1014. In some examples, either a secondary or tertiary tape node, or both, may be used, depending on whether a high-power wireless-communication interface is necessary for sufficient communication.

In some examples, when the doors of the shipping container 1064 are closed, the secondary or tertiary tape node 1060 is operable to communicate wirelessly with the master tape nodes 1066 contained within the shipping container 1064. In some embodiments, both a secondary and a tertiary node are attached to the shipping container 1064. Whether a secondary and a tertiary node are used may depend on the range requirements of the wireless-communications interface. For example, if out at sea a node will be required to transmit and receive signals from a server located outside the range of a medium-power wireless-communications interface, a tertiary node will be used because the tertiary node includes a high-power wireless-communications interface.

In an example, the secondary or tertiary tape node 1060 is configured to collect sensor data from master tape nodes 1066 and, in some embodiments, process the collected data to generate, for example, statistics from the collected data. When the doors of the shipping container 1064 are open, the secondary or tertiary tape node 1060 is programmed to detect the door opening (e.g., using a photodetector or an accelerometer component of the secondary or tertiary tape node 1060) and, in addition to reporting the door opening event to the network service 1008, the secondary or tertiary tape node 1060 is further programmed to transmit the collected data and/or the processed data in one or more wireless messages to the stationary gateway 1014. The stationary gateway 1014, in turn, is operable to transmit the wireless messages received from the secondary or tertiary tape node 1060 to the network service 1008 over the network 1002. Alternatively, in some examples, the stationary gateway 1014 also is operable to perform operations on the data received from the secondary or tertiary tape node 1060 with the same type of data produced by the secondary or tertiary tape node 1060 based on sensor data collected from the master tape nodes 1042-1048. In this way, the secondary or tertiary tape node 1060 and master tape node 1066 create a wireless network of nodes for transmitting, forwarding, relaying, or otherwise communicating wireless messages to, between, or on behalf of the master tape node 1066, the secondary or tertiary tape nodes 1060, and the network service 1008 in a power-efficient and cost-effective way.

In an example of the embodiment shown in FIG. 10, there are three types of backward compatible tape nodes: a short-range master tape node (e.g., segment 840), a medium-range secondary tape node (e.g., segment 870), and a long-range tertiary tape node (e.g. segment 880), as respectively shown in FIGS. 8A-8C (here, "tape node" is used interchangeably with "agent", as described with reference to FIGS. 1-9). The short-range master tape nodes typically are adhered directly to parcels containing assets. In the illustrated example, the master tape nodes 1018, 1028, 1032, 1042-1048, 1066 are short-range tape nodes. The short-range tape nodes typically communicate with a low-power wireless-communication protocol (e.g., Bluetooth LE, Zigbee, or Z-wave). The segments 870 are typically adhered to objects (e.g., a parcel 1026 and a shipping container 1064) that are associated with multiple parcels that are separated from the medium-range tape nodes by a barrier or a long distance. In the illustrated example, the secondary and/or tertiary tape nodes 1024 and 1060 are medium-range tape nodes. The medium-range tape nodes typically communicate with low and medium-power wireless-communication protocols (e.g., Bluetooth, LoRa, or Wi-Fi). The segments 880 typically are adhered to mobile or stationary infrastructure of the network communications environment 1000.

In the illustrated example, the mobile gateway 1012 and the stationary gateway 1014 are implemented by, e.g., segment 880. The segments 880 typically communicate with other nodes using a high-power wireless-communication protocol (e.g., a cellular data communication protocol). In some examples, the wireless communications unit 416 (a secondary or tertiary tape node) is adhered to a mobile gateway 1012 (e.g., a truck). In these examples, the wireless communications unit 1016 may be moved to different locations in the network communications environment 1000 to assist in connecting other tape nodes to the wireless communications unit 1016. In some examples, the stationary gateway 1014 is a tape node that may be attached to a stationary structure (e.g., a wall) in the network communications environment 1000 with a known geographic location (e.g., GPS coordinates). In these examples, other tape nodes in the environment may determine their geographic location by querying the stationary gateway 1014.

In some examples, in order to conserve power, the tape nodes typically communicate according to a schedule promulgated by the network service 1008. The schedule usually dictates all aspects of the communication, including the times when particular tape nodes should communicate, the mode of communication, and the contents of the communication. In one example, the server (not shown) transmits programmatic Global Scheduling Description Language (GSDL) code to the master tape node and each of the secondary and tertiary tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server 1004, either directly or indirectly through a gateway tape node (e.g., the long-range tape node, such as wireless communication unit 1016, adhered to the mobile gateway 1012, or a long-range tape node, such as stationary gateway 1014, that is adhered to an infrastructure component of the network communications environment 1000). In other examples, the master tape node processes the information contained in the received data packets and transmits the processed information to the server 1004.

Figure 11:
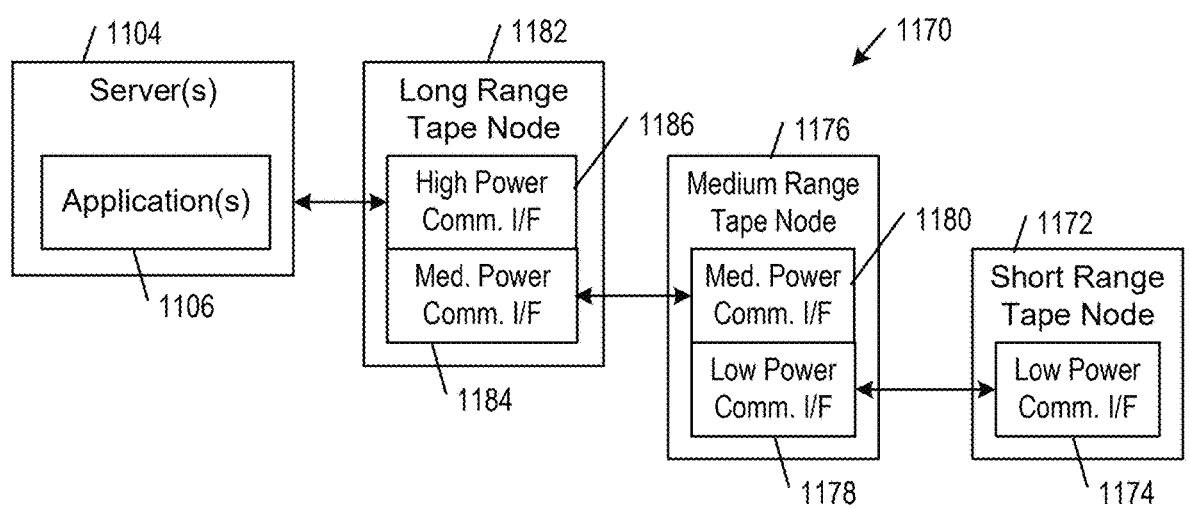
FIG. 11 is a schematic illustrating one example hierarchical wireless communications network of tape nodes, in embodiments.

FIG. 11 is a schematic illustrating one example hierarchical wireless communications network of tape nodes 1170. In this example, the short-range tape node 1172 and the medium range tape node 1176 communicate with one another over their respective low power wireless communication interfaces 1174, 1178. The medium range tape node 1176 and the long-range tape node 1182 communicate with one another over their respective medium power wireless communication interfaces 1180, 1184. The long-range tape node 1182 and the one or more network service servers 1104 (e.g., server(s) 1004, FIG. 10) running application(s) 1106 (e.g., application(s) 1006) communicate with one another over the high-power communication interface 1186. In some examples, the low power communication interfaces 1174,

1178 establish wireless communications with one another in accordance with the Bluetooth LE protocol, the medium power communication interfaces 1180, 1184 establish wireless communications with one another in accordance with the LoRa communications protocol, and the high-power communication interface 1186 establishes wireless communications with the one or more network service servers 1104 in accordance with a cellular communications protocol.

In some examples, the different types of tape nodes are deployed at different levels in the communications hierarchy according to their respective communications ranges, with the long-range tape nodes generally at the top of the hierarchy, the medium range tape nodes generally in the middle of the hierarchy, and the short-range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, one or more network service servers 1104 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more packages containing respective assets. In order to conserve power, the tape nodes typically communicate according to a schedule promulgated by the one or more network service servers 1104. The schedule usually dictates all aspects of the communication, including the times when particular tape nodes should communicate, the mode of communication, and the contents of the communication. In one example, the one or more network service servers 1104 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the one or more network service servers 1104, either directly or indirectly through a gateway tape node (e.g., the long-range wireless communication unit 1016 adhered to the mobile gateway 1012 (which could be a vehicle, ship, plane, etc.) or the stationary gateway 1014 is a long-range tape node adhered to an infrastructure component of the environment 1000). In other examples, the master tape node processes the information contained in the received data packets and transmits the processed information to the one or more network service servers 1104/1004.

Figure 12:
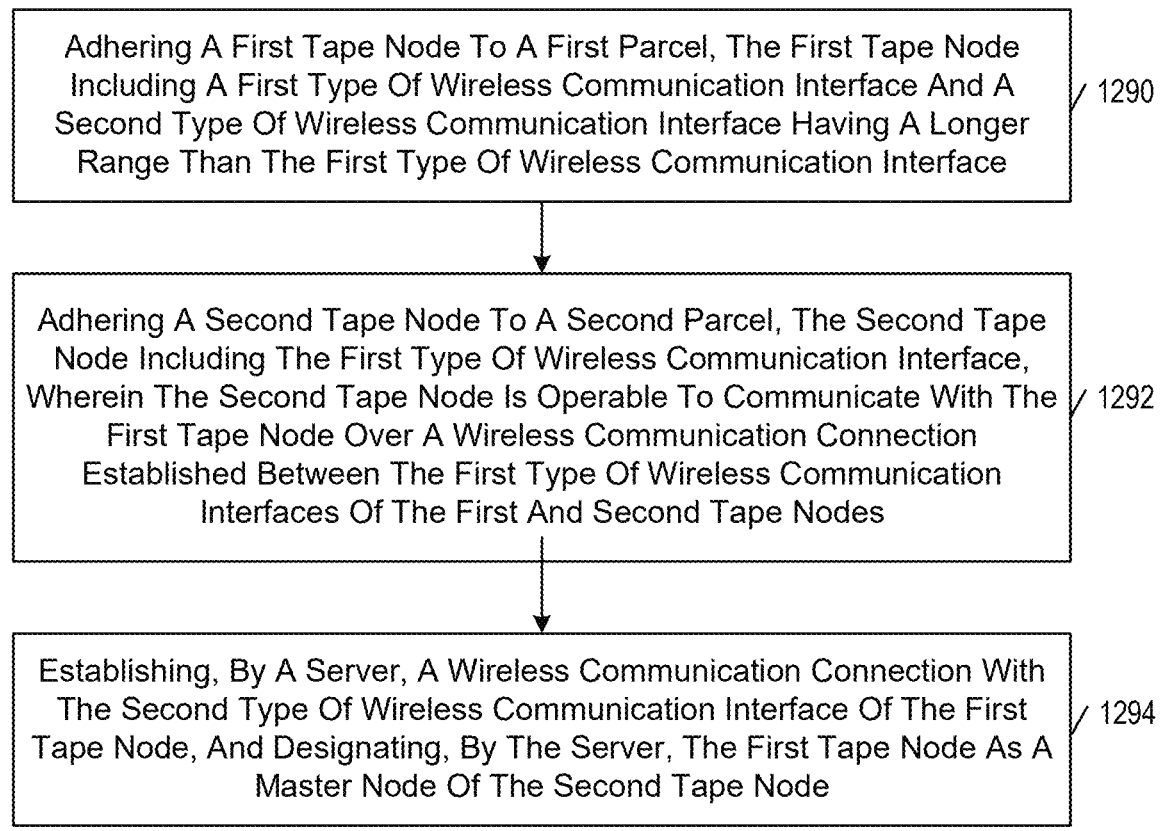
FIG. 12 is a flowchart illustrating one example method of creating a hierarchical communications network, in embodiments.

FIG. 12 is a flowchart illustrating one example method of creating a hierarchical communications network. In accordance with this method, a first tape node is adhered to a first parcel in a set of associated parcels, the first tape node including a first type of wireless communication interface and a second type of wireless communication interface having a longer range than the first type of wireless communication interface (FIG. 12, block 1290). A second tape node is adhered to a second parcel in the set, the second tape node including the first type of wireless communication interface, wherein the second tape node is operable to communicate with the first tape node over a wireless communication connection established between the first type of wireless communication interfaces of the first and second tape nodes (FIG. 12, block 1292). An application executing on a computer system (e.g., the one or more network service servers 1104 of a network service 1170) establishes a wireless communication connection with the second type of wireless communication interface of the first tape node, and the application transmits programmatic code executable by the first tape node to function as a master tape node with respect to the second tape node (FIG. 12, block 1294).

As used herein, the term "node" refers to both a tape node and a non-tape node unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node is assigned a respective unique identifier.

Embodiments of the present disclosure further describe a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to logistic items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node may be defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services may be defined by the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower-power level, temperature reading, send an alert to local hub, send location data, triangulate location, any boxes in same group that already completed group objectives.

Nodes can be associated with logistic items. Examples of a logistic item includes, for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the logistic items.

Communication paths between tape and/or non-tape nodes may be represented by a graph of edges between the corresponding logistic items (e.g., a storage unit, truck, or hub). In some embodiments, each node in the graph has a unique identifier. A set of connected edges between nodes is represented by a sequence of the node identifiers that defines a communication path between a set of nodes.

Figure 13A:
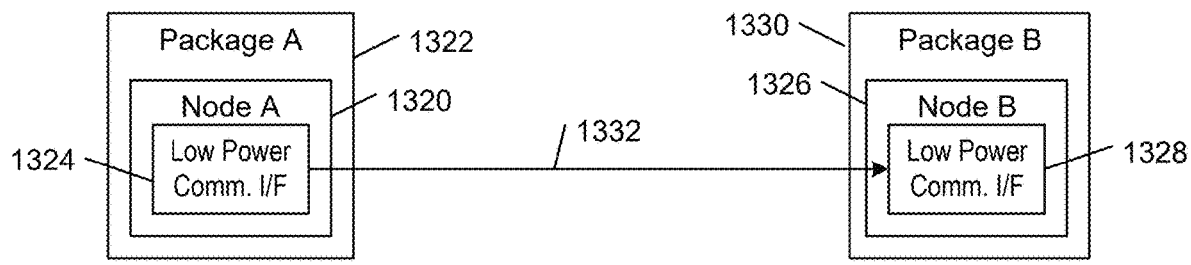
FIG. 13A shows a node (Node A) associated with a package (Package A), in embodiments.

Referring to FIG. 13A, a node 1320 (Node A) is associated with a package 1322 (Package A). In some embodiments, the node 1320 may be implemented as a tape node that is used to seal the package 1322 or it may be implemented as a label node that is used to label the package 1322; alternatively, the node 1320 may be implemented as a non-tape node that is inserted within the package 1322 or embedded in or otherwise attached to the interior or exterior of the package 1322. In the illustrated embodiment, the node 1320 includes a low power communications interface 1324 (e.g., a Bluetooth Low Energy communications interface). Another node 1326 (Node B), which is associated with another package 1330 (Package B), is similarly equipped with a compatible low power communications interface 1328 (e.g., a Bluetooth Low Energy communications interface).

In an example scenario, in accordance with the programmatic code stored in its memory, node 1326 (Node B) requires a connection to node 1320 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 1320 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 1332 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 13B:
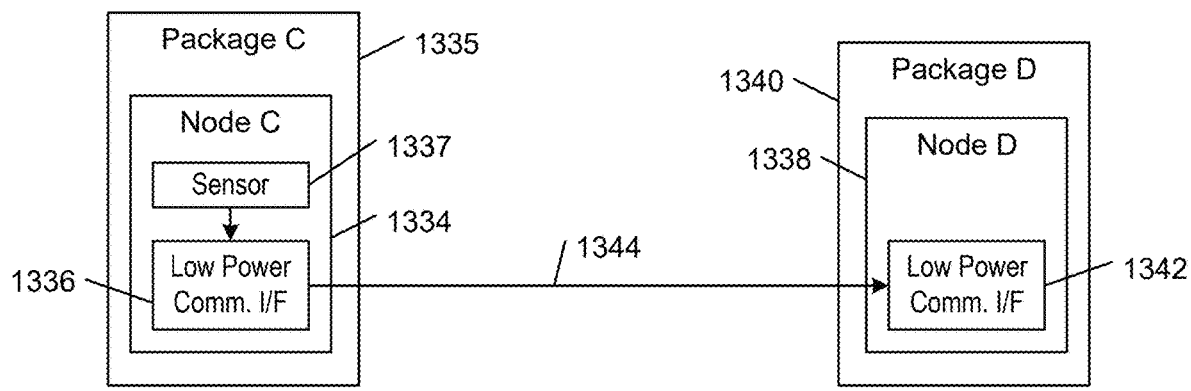
FIG. 13B shows a node (Node C) associated with a package (Package C), in embodiments.

Referring to FIG. 13B, a node 1334 (Node C) is associated with a package 1335 (Package C). In the illustrated embodiment, the Node C includes a low power communications interface 1336 (e.g., a Bluetooth Low Energy communications interface), and a sensor 1337 (e.g., a temperature sensor). Another node 1338 (Node D), which is associated with another package 1340 (Package D), is similarly equipped with a compatible low power communications interface 1342 (e.g., a Bluetooth Low-Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 1344 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 13C:
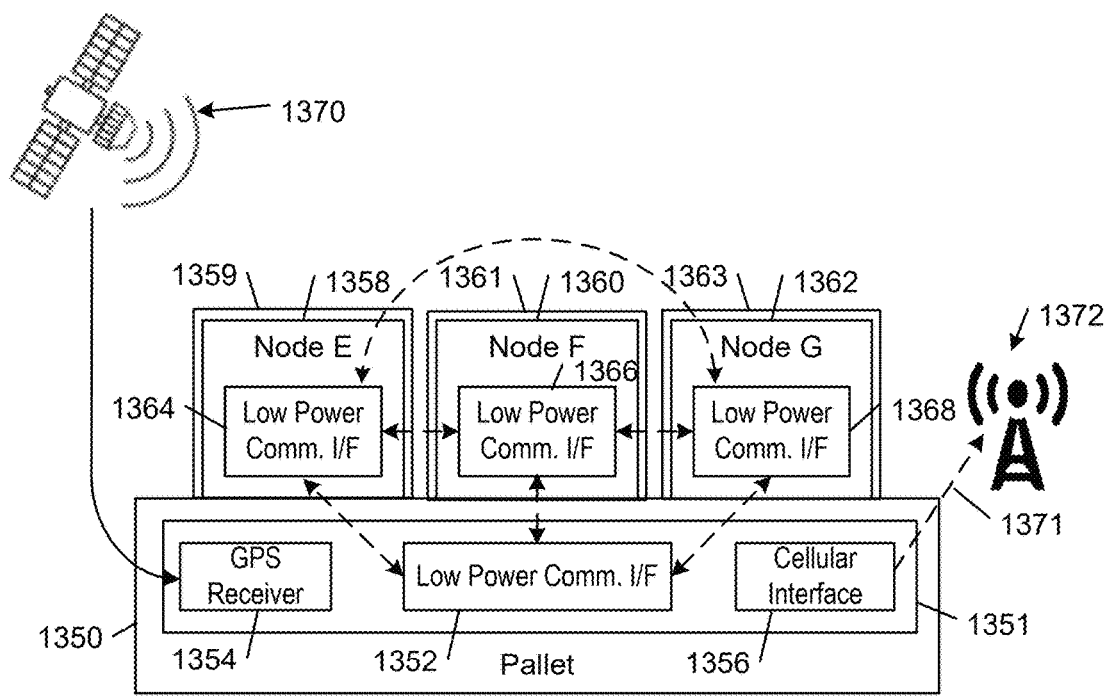
FIG. 13C shows a pallet associated with a master node that includes a low-power communications interface, a GPS receiver, and a cellular communications interface, in embodiments.

Referring to FIG. 13C, a pallet 1350 is associated with a master node 1351 that includes a low-power communications interface 1352, a GPS receiver 1354, and a cellular communications interface 1356. In some embodiments, the master node 1351 may be implemented as a tape node or a label node that is adhered to the pallet 1350. In other embodiments, the master node 1351 may be implemented as a non-tape node that is inserted within the body of the pallet 1350 or embedded in or otherwise attached to the interior or exterior of the pallet 1350.

The pallet 1350 provides a structure for grouping and containing packages 1359, 1361, 1363 each of which is associated with a respective peripheral node 1358, 1360, 1362 (Node E, Node F, and Node G). Each of the peripheral nodes 1358, 1360, 1362 includes a respective low power communications interface 1364, 1366, 1368 (e.g., Bluetooth Low Energy communications interface). In the illustrated embodiment, each of the nodes E, F, G, and the master node 1351 are connected to each of the other nodes over a respective low power communications path (shown by dashed lines).

In some embodiments, the packages 1359, 1361, 1363 are grouped together because they are related. For example, the packages 1359, 1361, 1363 may share the same shipping itinerary or a portion thereof. In an example scenario, the master pallet node 1351 scans for advertising packets that are broadcasted from the peripheral nodes 1358, 1360, 1362. In some examples, the peripheral nodes broadcast advertising packets during respective scheduled broadcast intervals. The master node 1351 can determine the presence of the packages 1359, 1361, 1363 in the vicinity of the pallet 1350 based on receipt of one or more advertising packets from each of the nodes E, F, and G. In some embodiments, in response to receipt of advertising packets broadcasted by the peripheral nodes 1358, 1360, 1362, the master node 1351 transmits respective requests to the server to associate the master node 1351 and the respective peripheral nodes 1358, 1360, 1362. In some examples, the master tape node requests authorization from the server to associate the master tape node and the peripheral tape nodes. If the corresponding packages 1359, 1361, 1363 are intended to be grouped together (e.g., they share the same itinerary or certain segments of the same itinerary), the server authorizes the master node 1351 to associate the peripheral nodes 1358, 1360, 1362 with one another as a grouped set of packages. In some embodiments, the server registers the master node and peripheral tape node identifiers with a group identifier. The server also may associate each node ID with a respective physical label ID that is affixed to the respective package.

In some embodiments, after an initial set of packages is assigned to a multi package group, the master node 1351 may identify another package arrives in the vicinity of the multi-package group. The master node may request authorization from the server to associate the other package with the existing multi-package group. If the server determines that the other package is intended to ship with the multi-package group, the server instructs the master node to merge one or more other packages with currently grouped set of packages. After all packages are grouped together, the server authorizes the multi-package group to ship. In some embodiments, this process may involve releasing the multi-package group from a containment area (e.g., customs holding area) in a shipment facility.

In some embodiments, the peripheral nodes 1358, 1360, 1362 include environmental sensors for obtaining information regarding environmental conditions in the vicinity of the associated packages 1359, 1361, 1363. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 1351 can determine its own location based on geolocation data transmitted by a satellite-based radio navigation system 1370 (e.g., GPS, GLONASS, and NAVSTAR) and received by the GPS receiver 1354 component of the master node 1351. In an alternative embodiment, the location of the master pallet node 1351 can be determined using cellular based navigation techniques that use mobile communication technologies (e.g., GSM, GPRS, CDMA, etc.) to implement one or more cell-based localization techniques. After the master node 1351 has ascertained its location, the distance of each of the packages 1359, 1361, 1363 from the master node 1351 can be estimated based on the average signal strength of the advertising packets that the master node 1351 receives from the respective peripheral node. The master node 1351 can then transmit its own location and the locations of the package nodes E, F, and G to a server over a cellular interface connection with a cellular network 1372. Other methods of determining the distance of each of the packages 1359, 1361, 1363 from the master node 1351, such as Received Signal-Strength Index (RSSI) based indoor localization techniques, also may be used.

In some embodiments, after determining its own location and the locations of the peripheral nodes, the master node 1351 reports the location data and the collected and optionally processed (e.g., either by the peripheral nodes peripheral nodes 1358, 1360, 1362 or the master node 1351) sensor data to a server over a cellular communication path 1371 on a cellular network 1372.

In some examples, nodes are able to autonomously detect logistics execution errors if packages that are supposed to travel together no longer travel together and raise an alert. For example, a node (e.g., the master node 1351 or one of the peripheral nodes 1358, 1360, 1362) alerts the server when the node determines that a particular package 1359 is being or has already been improperly separated from the group of packages. The node may determine that there has been an improper separation of the particular package 1359 in a variety of ways. For example, the associated peripheral node 1358 that is bound to the particular package 1359 may include an accelerometer that generates a signal in response to movement of the package from the pallet. In accordance with its intelligent agent program code, the associated peripheral node 1358 determines that the master node 1351 has not disassociated the particular package 1359 from the group and therefore broadcasts advertising packets to the master node, which causes the master node 1351 to monitor the average signal strength of the advertising packets and, if the master node 1351 determines that the signal strength is decreasing over time, the master node 1351 will issue an alert either locally (e.g., through a speaker component of the master node 1351) or to the server.

Figure 14:
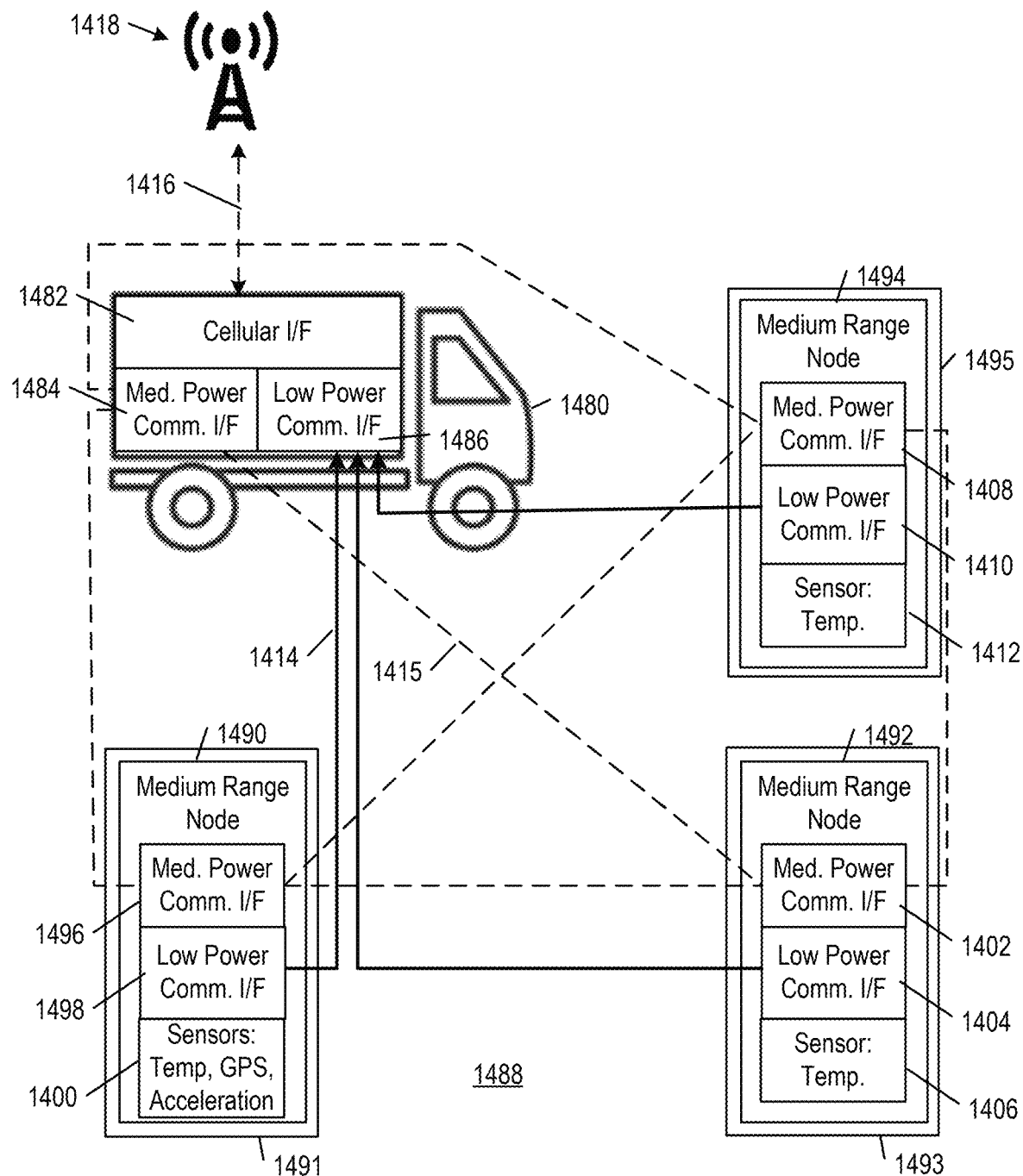
FIG. 14 is a schematic illustrating a truck configured as a mobile node, or mobile hub, with a cellular communications interface, a medium-power communications interface, and a low power communications interface, in embodiments.

FIG. 14 is a schematic illustrating a truck 1480 configured as a mobile node or mobile hub that includes a cellular communications interface 1482, a medium-power communications interface 1484, and a low power communications interface 1486. The communications interfaces 1480-1486 may be implemented on one or more tape and non-tape nodes. In an illustrative scenario, the truck 1480 visits a logistic storage facility, such as a warehouse 1488, to wirelessly obtain temperature data generated by temperature sensors in the medium range nodes 1490, 1492, 1494. The warehouse 1488 contains nodes 1490, 1492, and 1494 that are associated with respective logistic containers 1491, 1493, 1495. In the illustrated embodiment, each node 1490-1494 is a medium range node that includes a respective medium power communications interface 1496, 1402, 1408, a respective low power communications interface 1498, 1404, 1410 and one or more respective sensors 1400, 1406, 1412. In the illustrated embodiment, each of the package nodes 1490, 1492, 1494 and the truck 1480 is connected to each of the other ones of the package nodes through a respective medium power communications path (shown by dashed lines). In some embodiments, the medium power communications paths are LoRa formatted communication paths.

In some embodiments, the communications interfaces 1484 and 1486 (e.g., a LoRa communications interface and a Bluetooth Low Energy communications interface) on the node on the truck 1480 is programmed to broadcast advertisement packets to establish connections with other network nodes within range of the truck node. A warehouse 1488 includes medium range nodes 1490, 1492, 1494 that are associated with respective logistic containers 1491, 1493, 1495 (e.g., packages, boxes, pallets, and the like). When the truck node's low power interface 1486 is within range of any of the medium range nodes 1490, 1492, 1494 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 1490, 1492, 1494, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 1414 or a LoRa formatted communication path 1417), the truck node determines the identity information for the medium range node 1490 (e.g., a peripheral node), the medium range node's capabilities include retrieving temperature data, and the medium range node's services include transmitting temperature data to other nodes. Depending of the size of the warehouse 1488, the truck 1480 initially may communicate with the nodes 1490, 1492, 1494 using a low power communications interface (e.g., Bluetooth Low Energy interface). If any of the anticipated nodes fails to respond to repeated broadcasts of advertising packets by the truck 1480, the truck 1480 will try to communicate with the non-responsive nodes using a medium power communications interface (e.g., LoRa interface). In response to a request from the medium-power communication interface 1484, the medium range node 1490 transmits an indication of its measured temperature data to the truck node. The truck node repeats the process for each of the other medium range nodes 1492, 1494 that generate temperature measurement data in the warehouse 1488. The truck node reports the collected (and optionally processed, either by the medium range nodes 1490, 1492, 1494 or the truck node) temperature data to a server over a cellular communication path 1416 with a cellular network 1418.

Figure 15:
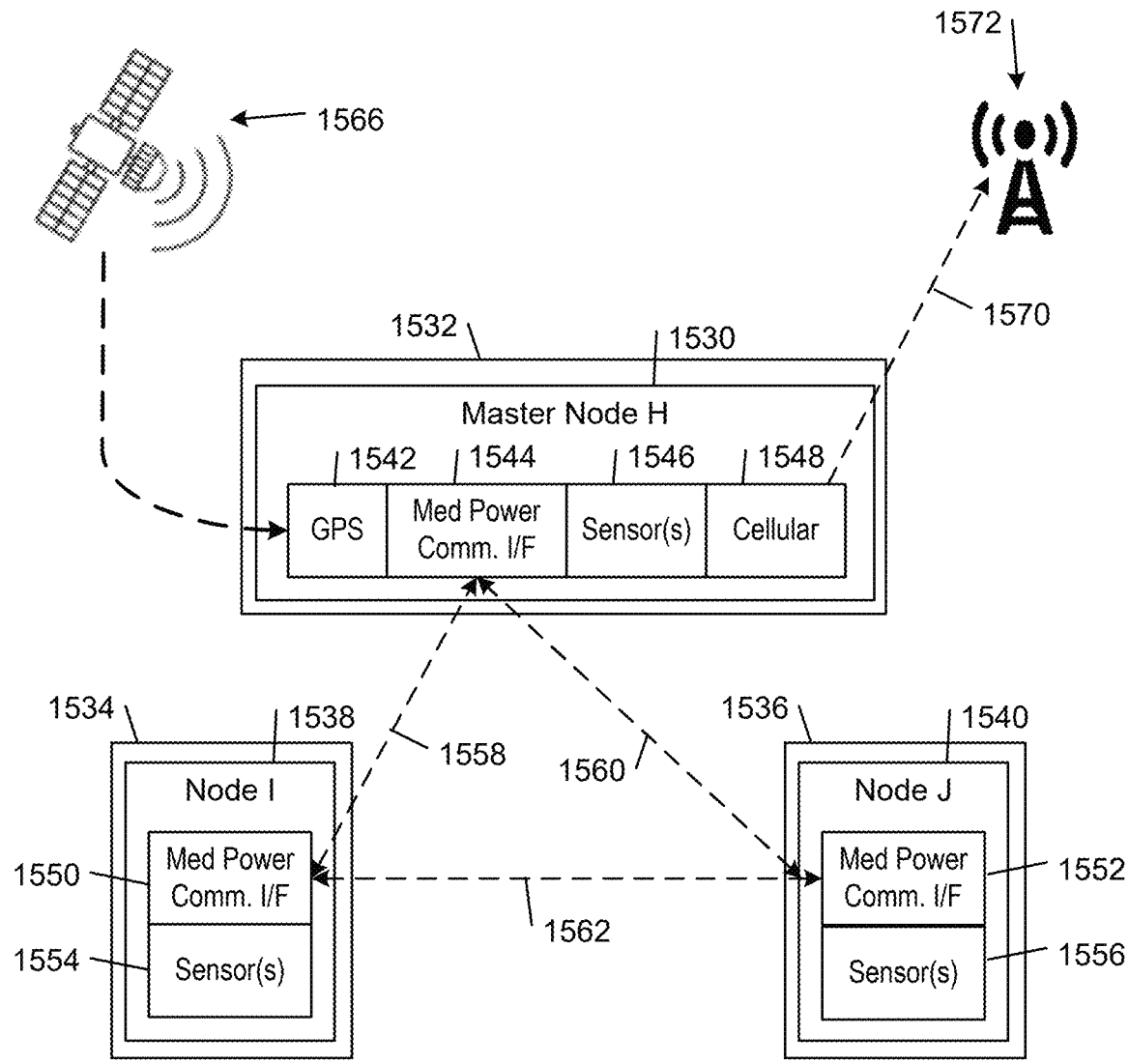
FIG. 15 is a schematic illustrating a master node associated with a logistic item that is grouped together with other logistic items associated with peripheral nodes, in embodiments.

FIG. 15 is a schematic illustrating a master node 1530 is associated with a logistic item 1532 (e.g., a package) and grouped together with other logistic items 1534, 1536 (e.g., packages) that are associated with respective peripheral nodes 1538, 1540. The master node 1530 includes a GPS receiver 1542, a medium power communications interface 1544, one or more sensors 1546, and a cellular communications interface 1548. Each of the peripheral nodes 1538, 1540 includes a respective medium power communications interface 1550, 1552 and one or more respective sensors 1554, 1556. In the illustrated embodiment, the peripheral and master nodes are connected to one another other over respective pairwise communications paths (shown by dashed lines). In some embodiments, the nodes 1530, 1538, 1540 communicate through respective LoRa communications interfaces over LoRa formatted communications paths 1558, 1560, 1562.

In the illustrated embodiment, the master and peripheral nodes 1530, 1538, 1540 include environmental sensors for obtaining information regarding environmental conditions in the vicinity of the associated logistic items 1532, 1534, 1536. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 1530 periodically broadcasts advertising packets in the surrounding area. When the peripheral nodes 1538, 1540 are within range of master node 1530, and are operating in a listening mode, the peripheral nodes 1538, 1540 will extract the address of master node 1530 and potentially other information (e.g., security information) from the advertising packets. If, according to their respective programmatic code, the peripheral nodes 1538, 1540 determine that they are authorized to connect to the master node 1530, the peripheral nodes 1538, 1540 will attempt to pair with the master node 1530. In this process, the peripheral nodes 1538, 1540 and the master node 1530 determine each other's identities, capabilities, and services. For example, after successfully establishing a respective communication path 1558, 1560 with each of the peripheral nodes 1538, 1540 (e.g., a LoRa formatted communication path), the master node 1530 determines certain information about the peripheral nodes 1538, 1540, such as their identity information (e.g., peripheral nodes), their capabilities (e.g., measuring temperature data), and their services include transmitting temperature data to other nodes.

After establishing LoRa formatted communications paths 1558, 1560 with the peripheral nodes 1538, 1540, the master node 1530 transmits requests for the peripheral nodes 1538, 1540 to transmit their measured and/or locally processed temperature data to the master node 1530.

In the illustrated embodiment, the master node 1530 can determine its own location based on geolocation data transmitted by a satellite-based radio navigation system 1566 (e.g., GPS, GLONASS, and NAVSTAR) and received by the GPS receiver 1542 component of the master node 1530. In an alternative embodiment, the location of the master node 1530 can be determined using cellular based navigation techniques that use mobile communication technologies (e.g., GSM, GPRS, CDMA, etc.) to implement one or more cell-based localization techniques. After the master node 1530 has ascertained its location, the distance of each of the logistic items 1534, 1536 from the master node 1530 can be estimated based on the average signal strength of the advertising packets that the master node 1530 receives from the respective peripheral node. The master node 1530 can then transmit its own location and the locations of the package nodes H, J, and I to a server over a cellular interface connection with a cellular network 1572. Other methods of determining the distance of each of the logistic items 1534, 1536 from the master node 1530, such as Received Signal-Strength Index (RSSI) based indoor localization techniques, also may be used.

In some embodiments, after determining its own location and the locations of the peripheral nodes, the master node 1530 reports the location data, the collected and optionally processed (e.g., either by the peripheral nodes peripheral nodes 1538, 1540 or the master node 1530) sensor data to a server over a cellular communication path 1570 on a cellular network 1572.

Renovating Components of Wireless Tags

Wireless tags may be renovated, refurbished, or recycled, depending on the embodiment. In one example, a battery or batteries of a wireless tag are recharged or replaced. In other example, other components of the wireless tag, such as electronic sensors, wireless communications systems, processors, and the like, are renovated, refurbished, recycled, or replaced instead of or in addition to a battery or batteries of the wireless tag.

Figure 16A:
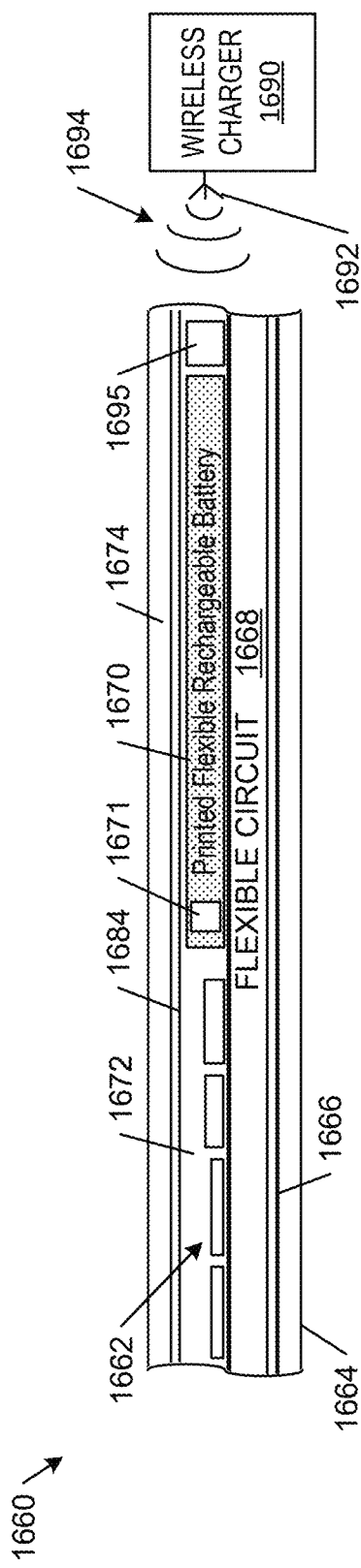
FIG. 16A is a schematic cross-sectional side view illustrating a portion of one example wireless tag that includes tracking components similar to components of the wireless transducing circuit of FIG. 6, in embodiments.

FIG. 16A is a schematic cross-sectional side view illustrating a portion of one example wireless tag 1660 that includes tracking components 1662 similar to components of wireless transducing circuit 610 of FIG. 6. Wireless tag 1660 is an embodiment of wireless tag 112 of FIGS. 1A-C and includes a flexible substrate 1664 with an adhesive layer on its top surface and an optional adhesive layer on its bottom surface. If the bottom adhesive layer is present, a release liner (not shown) may be (weakly) adhered to the bottom surface of the adhesive layer. Adhesive layer 1666 bonds flexible substrate 1664 to a bottom surface of a flexible circuit 1668 that includes one or more wiring layers (not shown) that interconnect a processor, a circuit (e.g., a wireless receiver circuit, wireless transmitter circuit, or wireless transceiver circuit), an antenna, one or more sensors, and a flexible battery 1670 with a unique ID 1671. Unique ID 1671 is electronically readable and is used to identify flexible battery 1670 independently of wireless tag 1660. A flexible polymer layer 1672 may encapsulate the components to reduce risk of damage resulting from intrusion of contaminants and/or liquids (e.g., water). The flexible polymer layer 1672 also planarizes the device, distributing forces generated in, on, or across the wireless tag 1660 to reduce potentially damaging asymmetric stresses that may be caused by bending, torqueing, pressing, or other forces acting on wireless tag 1660. A flexible cover 1674 is bonded to the flexible polymer layer 1672 by an adhesive layer 1684.

Flexible battery 1670 is a rechargeable battery. In certain embodiments, flexible battery 1670 is a printed flexible battery. In the embodiment of FIG. 16A, wireless tag 1660 is configured to be recharged by a wireless charger 1690 that includes an antenna 1692 for transmitting radio frequency waves 1694 that are captured by a receiver circuit 1695 that generates electrical power to charge flexible battery 1670. In certain embodiments, receiver circuit 1695 is part of a receiver circuit already included in wireless tag 1660 and that is adapted to charge flexible battery 1670. Use of wireless charger 1690 allows wireless tag 1660 to be recharged when power in flexible battery 1670 is low.

In other embodiments, wireless charger 1690 is an inductive charger and receiver circuit 1695 is an inductive charging circuit to allow recharge of flexible battery 1670 by inductive charging (e.g., using the Qi standard). Wireless tag 1660 may include single-cell or multiple-cell rechargeable battery instead of flexible battery 1670 without departing from the scope hereof.

Figure 16B:
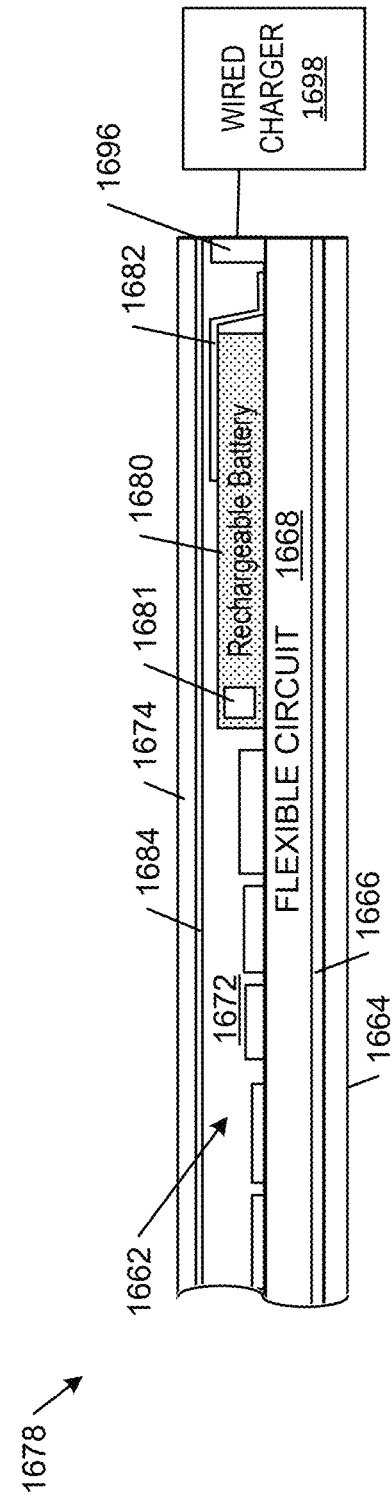
FIG. 16B is a schematic cross-sectional side view of one alternative example wireless tag that is similar to the wireless tag of FIG. 16A but includes a conventional single or multiple cell rechargeable battery instead of the printed flexible rechargeable battery and receiver circuit, in embodiments.

FIG. 16B is a schematic cross-sectional side view of one alternative example wireless tag 1678 that is similar to wireless tag 1660 of FIG. 16A but instead of printed flexible battery 1670 and receiver circuit 1695, wireless tag 1678 includes a conventional single or multiple cell rechargeable battery 1680 (e.g., a watch style disk or button cell battery) and associated electrical connection apparatus 1682 (e.g., a metal clip) that electrically connects the electrodes of the battery 1680 to contact pads of flexible circuit 1668. Rechargeable battery 1680 may have a unique ID 1681 that is electronically readable and is used to identify flexible battery 1680 independently of wireless tag 1678.

In the embodiment of FIG. 16B, wireless tag 1678 includes an electrical adapter 1696 that makes an electrical connection with a wired charger 1698. Wired charger 1698 removably connects to electrical adapter 1696 to provide electrical power to rechargeable battery 1680. Wired charger 1698 connects to a power source (e.g., an electrical line) or includes a power source integrated with wired charger 1698. For example, wired charger 1698 may represent a USB charger, but may represent other types of wired charger without departing from the scope hereof.

Figure 17A:
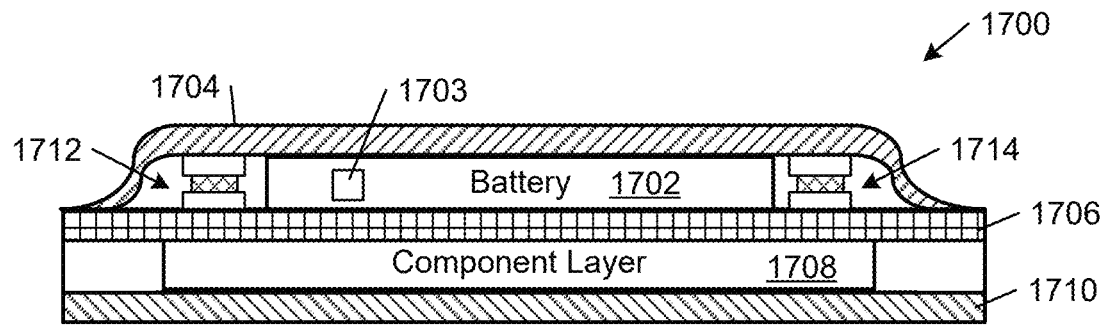
FIGS. 17A and 17B show one example wireless tag that includes an embedded battery with a unique ID, in embodiments.
Figure 17B:
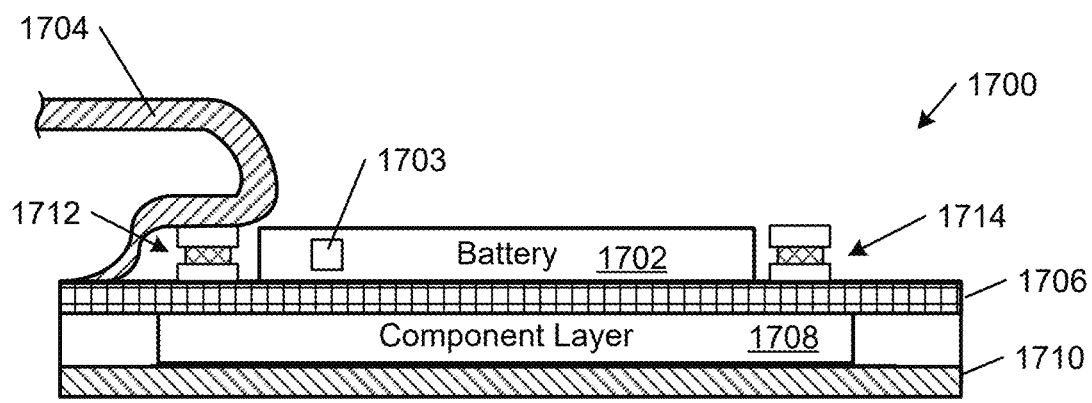

FIGS. 17A and 17B show one example wireless tag 1700 that includes an embedded battery 1702 with a unique ID 1703. Unique ID 1703 is electronically readable and is used to battery 1702 independently of wireless tag 1700. Wireless tag 1700 may represent wireless tag 112 of FIGS. 1A-C. FIG. 17A shows the wireless tag 1700 with a flexible cover layer 1704 covering a battery 1702. Battery 1702 may represent any type of battery, including but not limited to a rechargeable battery, a thin film printed battery, a conventional coin cell battery, an alkaline battery, and so on. Wireless tag 1700 is also shown with a circuit layer 1706, a component layer 1708, and a substrate layer 1710. In some examples, the removable cover 1704 includes a flexible material (e.g., plastic) that is attached to the top surface of the battery 1702 with an adhesive layer. In some embodiments, the adhesive layer is a pressure sensitive adhesive that holds the flexible cover layer 1704 to the battery 1702 and other underlying structures. The circuit layer 1706 includes circuits for interconnecting and delivering power from the battery 1702 through terminals 1712 and 1714 to the wireless tag component layer 1708.

FIG. 17B shows wireless tag 1700 of FIG. 17A with flexible cover layer 1704 partially removed to expose battery 1702 and terminals 1714. Flexible cover layer 1704 may be selectively removed to access any of battery 1702, and terminals 1712 and 1714. At least partial removal of flexible cover layer 1704 allows access to replace battery 1702, for wired charging, and optionally for wireless charging. For example, when wireless tag 1700 includes wireless charging capability, removing at least part of flexible cover layer 1704 may expose a wireless charging circuit (e.g., an RF receiver or an inductive charging circuit/loop) that allows a user to align the wireless charging circuit with a wireless charger (e.g., wireless charger 1690, FIG. 16A). Where wireless tag 1700 is configured for wired charging, removing flexible cover layer 1704 may expose an electrical adapter (e.g., electrical adapter 1696) to allow a user to connect a wired charger (e.g., wired charger 1698) to an electrical adapter (electrical adapter 1696) for recharging the wireless tag 1700. Partially or completely removing the flexible cover 1704 also enables the terminals and other components of the wireless tag to be inspected, cleaned or replaced for example. After one or more of components of wireless tag 1700 have been serviced (e.g., one or more of inspected, renovated, replaced, recycled, and/or modified), the same flexible cover layer 1704 may be reattached over battery 1702, terminals 1712, 1714, and circuit layer 1706. Alternatively, a new flexible cover layer may be used together with, or in place of, cover layer 1704 to protect battery 1702, terminals 1712, 1714, and circuit layer 1706.

Advantageously, removable flexible cover layer 1704 protects the components of wireless tag 1700 while it tracks an asset, wirelessly communicates with nodes of tracking system 1000 of FIG. 10, and/or performs other functions, but also allows battery 1702 and other components of wireless tag 1700 to be renovated, replaced, recharged, inspected, and/or modified by a user.

Figure 18A:
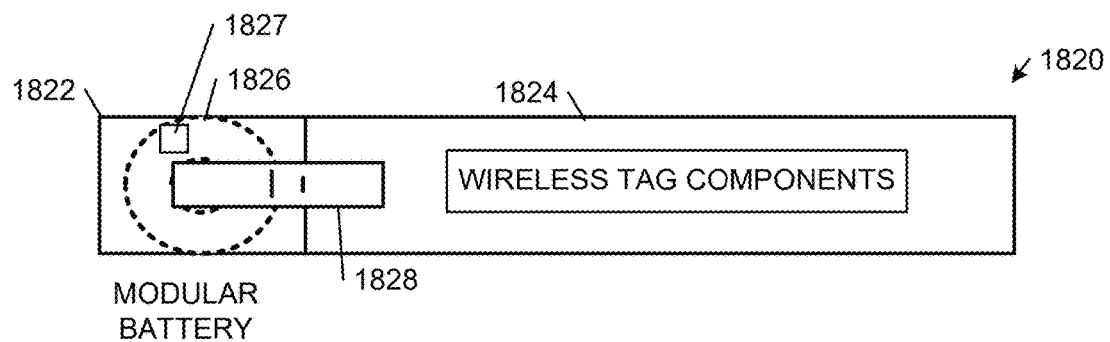
FIGS. 18A and 18B are diagrammatic side views of a modular wireless tag that includes a battery module that electrically connects to a wireless tag components module, in embodiments.
Figure 18B:
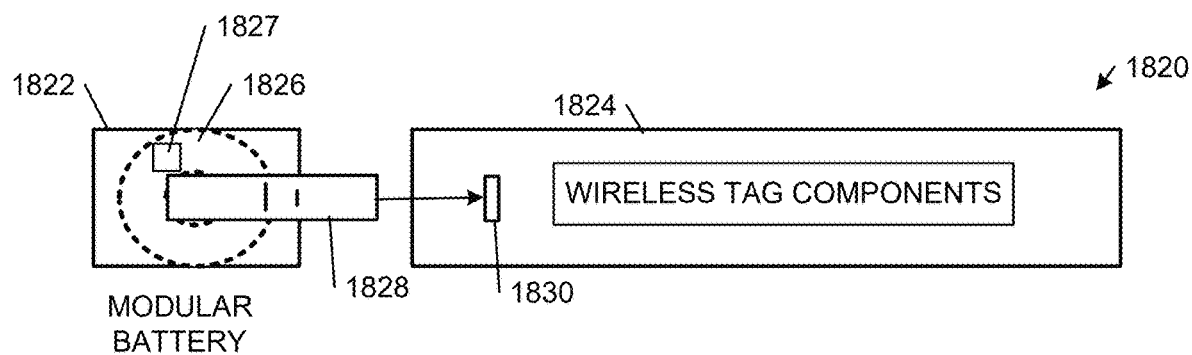
Figure 18C:
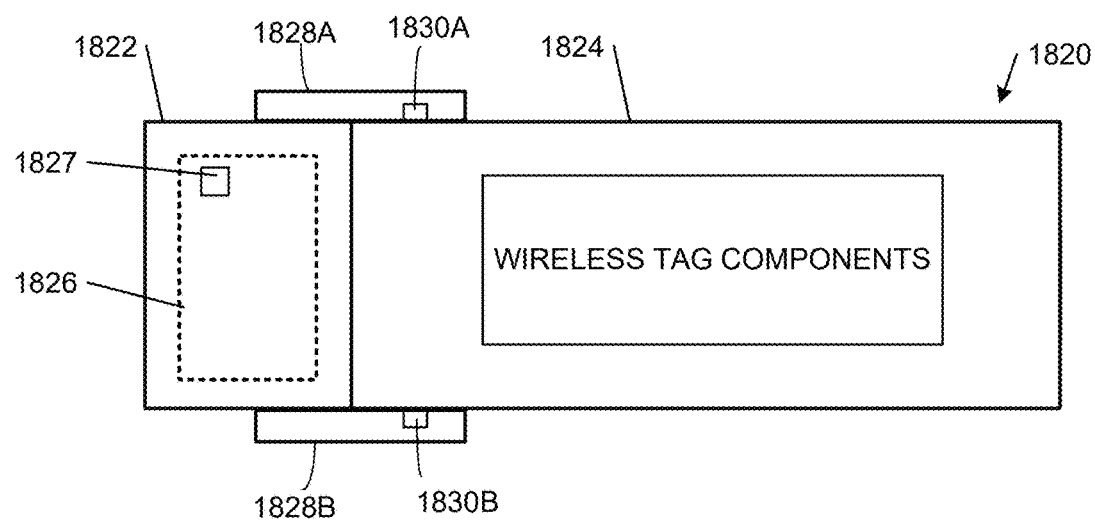
FIG. 18C is a top view of the modular wireless tag of FIGS. 18A and 18B, in embodiments.

FIGS. 18A and 18B are diagrammatic side views of a modular wireless tag 1820 that includes a battery module 1822 that electrically connects to a wireless tag components module 1824. FIG. 18A shows battery module 1822 coupled with wireless tag components module 1824, and FIG. 18B shows battery module 1822 decoupled from wireless tag components module 1824. FIG. 18C is a top view of modular wireless tag 1820 of FIGS. 18A and 18B illustrating battery module 1822 attached to wireless tag components module 1824 by two resilient latch mechanisms 1828A, 1828B that are attached to battery module 1822. FIGS. 18A-C are best viewed together with the following description.

Modular wireless tag 1820 may represent wireless tag 112 of FIGS. 1A-C. Battery module 1822 has a compartment for a battery 1826 and resilient latch mechanisms 1828, positioned on opposite exterior sides of battery module 1822, each snap over a respective ridge member 1830 positioned on opposite sides of wireless tag components module 1824. Battery 1826 may have a unique ID 1827 that is electronically readable and used to identify battery 1826 independently of wireless tag 1820. Battery module 1822 may include more or fewer than two resilient latch mechanisms 1828 and wireless tag components module 1824 may include a corresponding number of ridge members 1830 without departing from the scope hereof. In one embodiment, battery module 1822 and wireless tag components module 1824 include four resilient latch mechanisms 1828 and four corresponding ridge members 1830, respectively, one on each of a lateral side (e.g., the side shown in FIGS. 18A and 18B), an opposite lateral side, a top side, and a bottom side of the battery module 1822 and wireless tag components module 1824, respectively. Battery module 1822 includes an electrical interface that matches a corresponding electrical interface in the wireless tag components module 1824 to deliver electrical power from battery 1826 to components of wireless tag components module 1824 when battery module 1822 is snapped onto wireless tag components module 1824.

A user may detach battery module 1822 from wireless tag components module 1824 by pulling outwardly on one or both distal ends of each of the resilient latch mechanisms 1828 (e.g., on opposite exterior sides of modular battery module 1822).

Resilient latch mechanisms 1828A, 1828B snap over a respective ridge member 1830A, 1830B. Snapping the resilient latch mechanisms 1828A, 1828B over the respective ridge members 1830A, 1830B electrically couples power from battery 1826 to components within wireless tag component module 1824.

Other methods or mechanisms may be used instead of, or additionally to, resilient latch mechanisms 1828A, 1828B and ridge members 1830A, 1830B to removably couple battery module 1822 to wireless tag components module 1824. For example, modular wireless tag 1820 may have modules that allow access to one or more other components, such as sensors, processors, and circuitry, for example. In another example, wireless tags may be placed into a chemical bath to strip epoxy or other adhesives to separate layers of the wireless tag to access one or more components being renovated or recycled. In another example, wireless tags may be heated to weaken adhesives to separate layers of the wireless tag to access one or more components being renovated or recycled. In another example, wireless tags may have cut or tear lines that, when cut or torn as indicated, expose one or more components of the wireless tag for renovation or recycling. The cut or tear lines may be hidden using mechanical or design means such that they are not prematurely or accidentally cut or torn, such as by using flaps, folds, or colored portions of the wireless tag for example.

Figure 19:
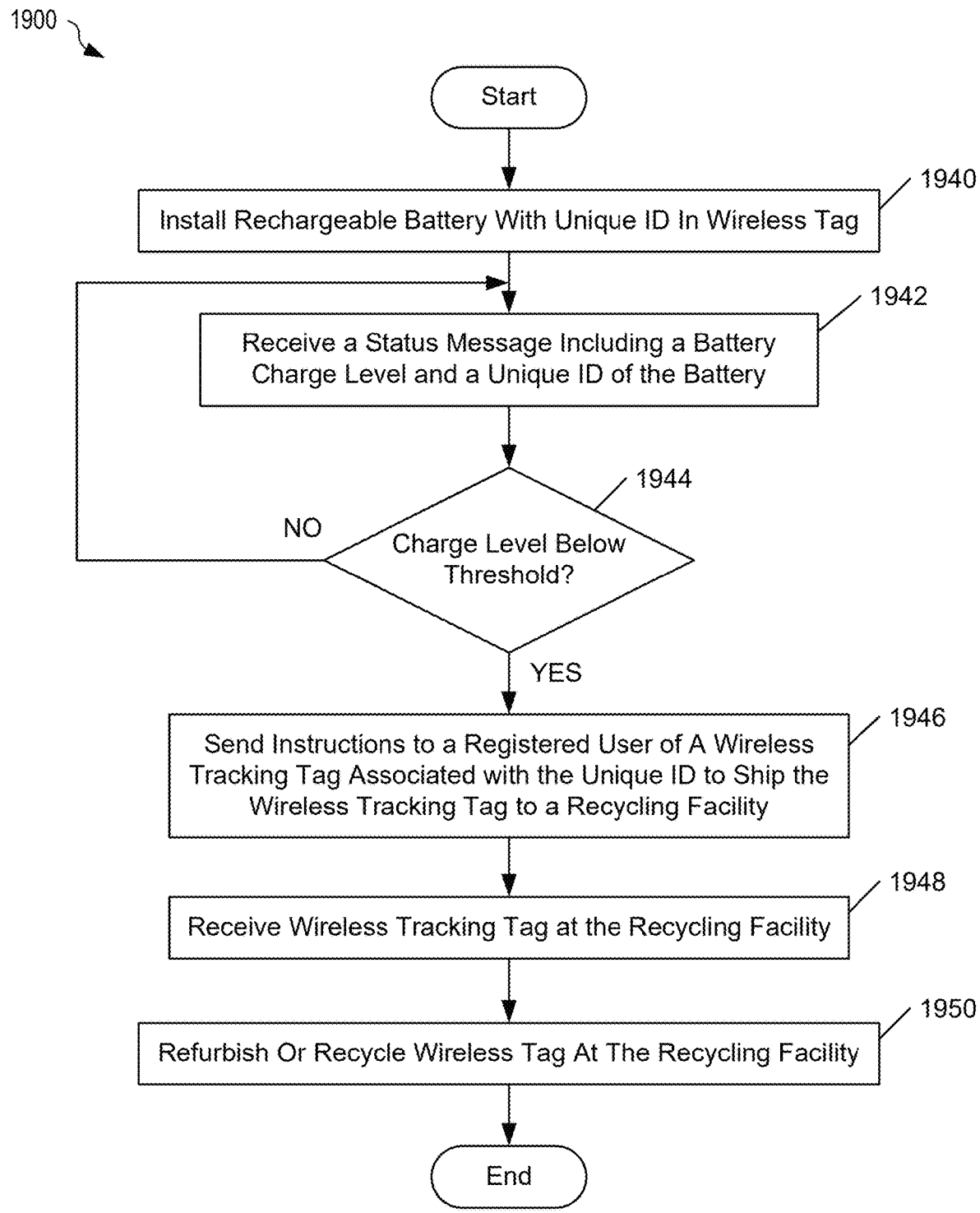
FIG. 19 is a flowchart illustrating one example method for remotely monitoring a charge level of a battery of a wireless tag and issuing an alert to ship the wireless tag for renovation or recycling when the monitored battery level is below a threshold, in embodiments.

FIG. 19 is a flowchart illustrating one example method 1900 for remotely monitoring a charge level of a battery of a wireless tag and issuing an alert to ship the wireless tag for renovation or recycling when the monitored battery level is below a threshold. In other embodiments, other metrics may additionally or instead be remotely monitored, and alerts may be issued to ship the wireless tag for renovation or recycling when the other metrics are below corresponding threshold values. For example, the metrics may include performance of a processor or sensor based on accuracy or frequency of data collection and/or processing operations. In the embodiments of FIGS. 18A-18C, the user may exchange battery module 1822 when exhausted (e.g., upon receiving a notification indicating the battery module 1822 should be recycled) to continue using wireless tag components module 1824 with a new or refurbished battery module, sending only battery module 1822 to the recycle facility. For example, battery module 1822 may display instructions for removing and sending battery module 1822 to the recycle facility. In embodiments where wireless tag components module 1824 includes a integrated smart label display (e.g., integrated smart label display 2610 of FIG. 26), wireless tag components module 1824 may display instructions for removing and sending battery module 1822 to the recycle facility.

The alert may be transmitted to a human operator or user of the wireless tag (e.g., a user of tracking system 1000, FIG. 10), to be displayed on a client device to the human operator or user, for example. Method 1900 is implemented, at least in part, by a server of a wireless tracking system (e.g., server(s) 1004 of tracking system 1000). In accordance with method 1900, in block 1940, a rechargeable battery with a unique ID is installed in a wireless tag (e.g., printed flexible battery 1670 is installed in wireless tag 1660 of FIG. 16A, or rechargeable battery 1680 is installed in wireless tag 1678 of FIG. 16B). The rechargeable battery may, for example, comprise terminals that connect to an external power source through a wired connection, may comprise an internal radio frequency energy receiver that converts received external radio frequency energy into electrical energy, or may be a separate modular component configured to attach to and detach from one or more electrical components of the wireless tag (e.g., the battery module 1822 shown in FIGS. 18A-18C).

The wireless tag is then deployed in the field and may perform various functions. In one example of operation, the wireless tag is used to track an asset within a facility. In another example of operation, the wireless tag tracks a location of an asset during shipment. In another example of operation, the wireless tag uses sensors that collect environmental information for an asset. As described above, the wireless tag communicates wirelessly with other nodes of wireless tracking system 1000. While performing the various functions, the wireless tag may use energy stored in its battery. The wireless tag wirelessly communicates the current battery level of its rechargeable battery and the unique ID of its rechargeable battery to other nodes of the wireless tracking system (e.g., the server(s) 1004). IN certain embodiments, wireless tag communicates the current battery level and the unique ID at a fixed time intervals (e.g., every 3 hours). In other embodiments, the wireless tag communicates the current battery level and the unique ID, when the wireless tag determines that the battery level is below a threshold value. In other embodiments, the wireless tag uses multiple threshold values for the battery level and communicates the current battery level and the unique ID when the battery level falls below one of the multiple threshold values. In other embodiments, the wireless tag communicates the current battery level and the unique ID, in response to receiving an inquiry or communication from another node of wireless tracking system 1000. For example, server(s) 1004 may transmit a request for an update on the battery level to the wireless tag.

In block 1942, the wireless tracking system 1000 receives a status message including a battery charge level and the unique ID of the battery. Block 1944 is a decision. If, in block 1944, the wireless tracking system 1000 determines that the charge level is above a threshold charge level, the wireless tracking system 1000 continues to remotely monitor the charge level of the rechargeable battery. For example, the wireless tracking system 1000 may request updates on the battery level of the wireless tag at a fixed frequency. In other embodiments, the wireless tracking system 1000 may instruct the wireless tag to transmit its current battery level and unique ID of its rechargeable battery to another node of the wireless tracking system at a fixed frequency. The other node of the wireless tracking system may relay the current battery level and unique ID to the server(s) 1004. In some embodiments, the other node is one of the servers 1004 and the wireless tag transmits it directly (e.g., via cellular communication). In block 1946, since the charge level is at or below the threshold charge level, the wireless tracking system 1000 sends instructions (e.g., a notification) to a user of the wireless tag to ship the wireless tag to a recycling facility. The notification may be transmitted to the user (e.g., via a user interface on a client device). For example, when its battery charge level falls below the threshold level while the wireless tag is performing some function (e.g., tracking an asset), the user is notified to replace the wireless tag with another wireless tag. The replacement wireless tag then continues performing the same function in place of the wireless tag that is shipped to the recycling facility.

In certain embodiments, the wireless tracking system 1000 also transmits a notification to the wireless tag. In some embodiments, the wireless tag detects an end of journey (e.g., a delivery address of an asset) and expects to be shipped to a recycling facility. For example, wireless tag may determine the end of journey based on identification of a geofence associated with a destination location, based on a current battery level, based on sensor data associated with receipt by an end customer. Responsive to receiving the notification from server 1004 or upon determining an end of journey, the wireless tag enters a hibernation or recycling mode to conserve available battery levels or functionality of electronics. For example, the hibernation or recycling mode may include one or more of: reducing a frequency of outgoing communications; reducing an amount of sensor data collected, processed, or transmitted; turning off one or more long-range communications capabilities; and the like. The hibernation or recycling mode may allow the wireless tag to conserve the remaining energy in its battery and perform functions in support of returning the wireless tag to a recycling facility. For example, in the hibernation or recycling mode, the wireless tag may track its own location and transmit its current location at a lower frequency than when in use for tracking an asset.

The user then ships the wireless tag to the recycling facility. In block 1948, the wireless tag is received at the recycling facility, and in block 1950, the wireless tag is renovated or recycled. In certain embodiments, at the recycling facility, the rechargeable battery is recharged (e.g., through a wired connection, electromagnetically, and/or by converting received external radio frequency energy into electrical energy). In other embodiments, the battery is removed from the wireless tag for renovation and the renovated battery is connected to electronic components of the same, a new, or a refurbished wireless tag using spot-welding or other means. In other embodiments, other types of rechargeable batteries and methods of recharging or renovation may be used, as described above, with respect to FIGS. 16A and 16B. In other embodiments, the wireless tag is an embodiment of the wireless tag 1820 shown in FIGS. 18A-18C, and the battery module 1822 is replaced at the recycling facility during the renovating or recycling step of block 1950. In other embodiments, one or more other electronic components of the wireless tag, such as sensors, processors, and the like, are renovated or recycled at the recycling facility. For example, a wireless antenna may be replaced at the recycling facility, if it is determined that the wireless antenna is malfunctioning or the wireless antenna's performance is below a threshold level (e.g., signal strength or accuracy).

In other embodiments, the method 1900 may comprise additional, fewer, or different blocks, and the blocks may be performed in a different order. In some embodiments, one or more of the blocks may be executed by other entities of the wireless tracking system 1000.

Figure 20:
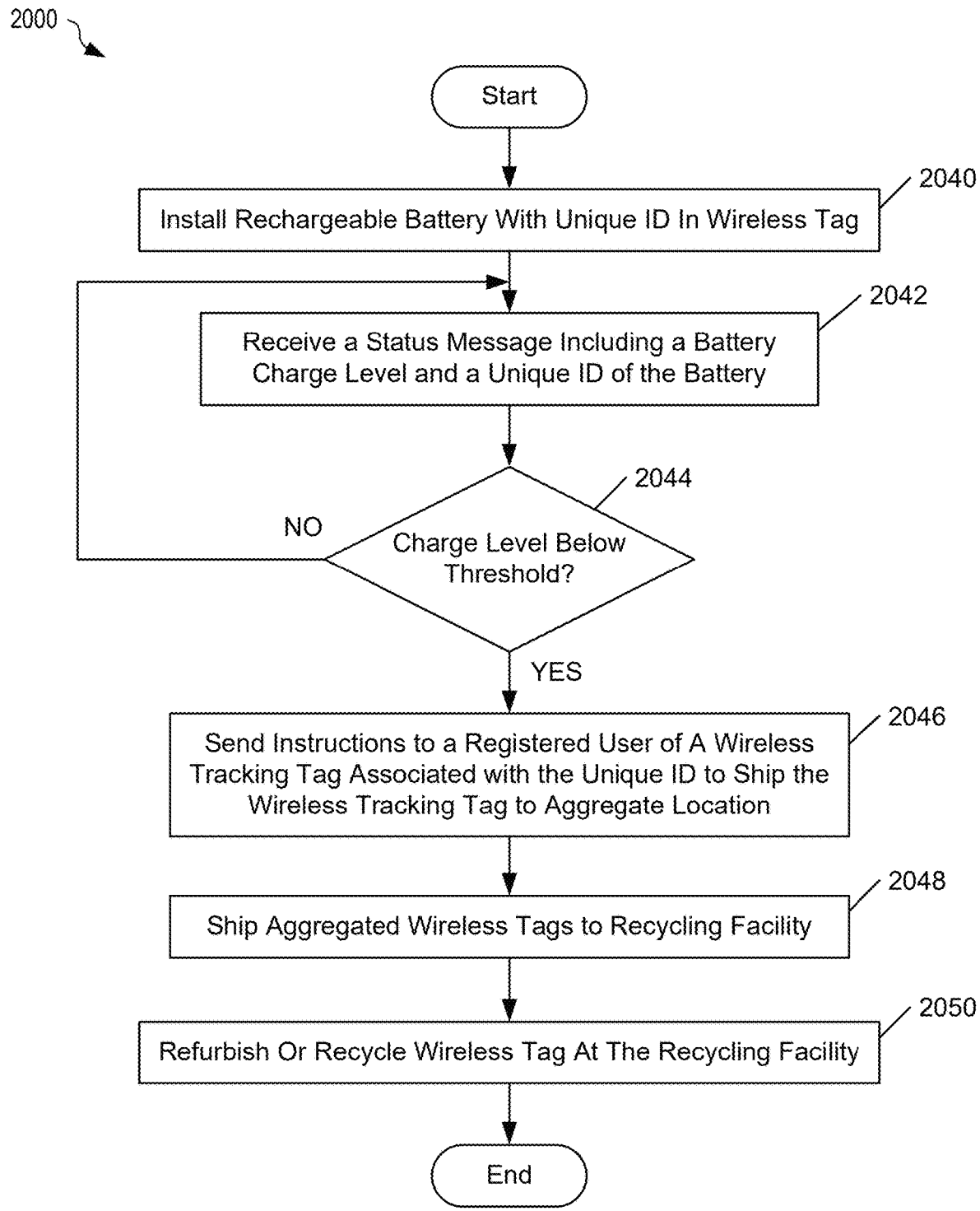
FIG. 20 is a flowchart illustrating one example method for remotely monitoring a charge level of a battery in a wireless tag and issuing an alert to ship the wireless tag for renovation or recycling when the charge level is below a threshold, in embodiments.

FIG. 20 is a flowchart illustrating one example method 2000 for remotely monitoring a charge level of a battery in a wireless tag and issuing an alert to ship the wireless tag for renovation or recycling when the charge level is below a threshold. The method 2000 is an alternate embodiment of the method 1900 of FIG. 19. In other embodiments, other metrics may additionally or instead be remotely monitored and alerts may be issued to ship the wireless tag for renovation or recycling when the other metrics are below a threshold. For example, the metrics may include performance of a processor or sensor, e.g., based on accuracy or frequency of data collection or processing operations. In block 2040, a rechargeable battery with a unique ID is installed in a wireless tag. The wireless tag is then deployed in the field and may perform various functions as described above for method 1900. In block 2042, the charge level of the rechargeable battery is remotely monitored by the wireless tracking system 1000 of FIG. 10 by receiving a status message including a battery charge level and the unique battery ID from the wireless tag, similar to block 1942 of method 1900. Block 2044 is a decision. If, in block 2044, the wireless tracking system 1000 determines that the charge level is above a threshold charge level, the wireless tracking system 1000 continues to remotely monitor the charge level of the rechargeable battery. In block 2046, since the charge level is at or below the threshold charge level, the wireless tracking system 1000 sends instructions (e.g., a notification) to a user of the wireless tag to ship the wireless tag to an aggregate location. The notification may be transmitted to a user (e.g., via a user interface on a client device). In some embodiments, the wireless tag includes the address of the aggregate location printed or otherwise displayed on the wireless tag, such as with the wireless tag 112 of FIGS. 1A-1C. Blocks 2040, 2042, 2044, and 2046 are similar to the block 1940, 1942, 1944, and 1946 of FIG. 19, with the exception that the instructions indicate that the wireless tag is to be shipped to an aggregate location, instead of a recycling facility.

At the aggregate location, wireless tags that have a charge level below the threshold are aggregated in preparation for shipment to the recycling facility. In block 2048, multiple wireless tags with low charge level are collected and shipped together to the recycling facility from the aggregate location, instead of being individually shipped directly to the recycling facility by users. This may improve efficiency of tracking, collecting, and shipping the wireless tags to the recycling facility for recycling and/or renovation. In further embodiments, diagnostics or other processing of the wireless tags is performed at the aggregate location. For example, the charge level of each wireless tag may be checked to validate the charge level detected during remote monitoring of block 2042.

In block 2050, at the recycling facility, the aggregated tags are renovated or recycled as discussed above with respect to block 1950 of FIG. 19.

Figure 21:
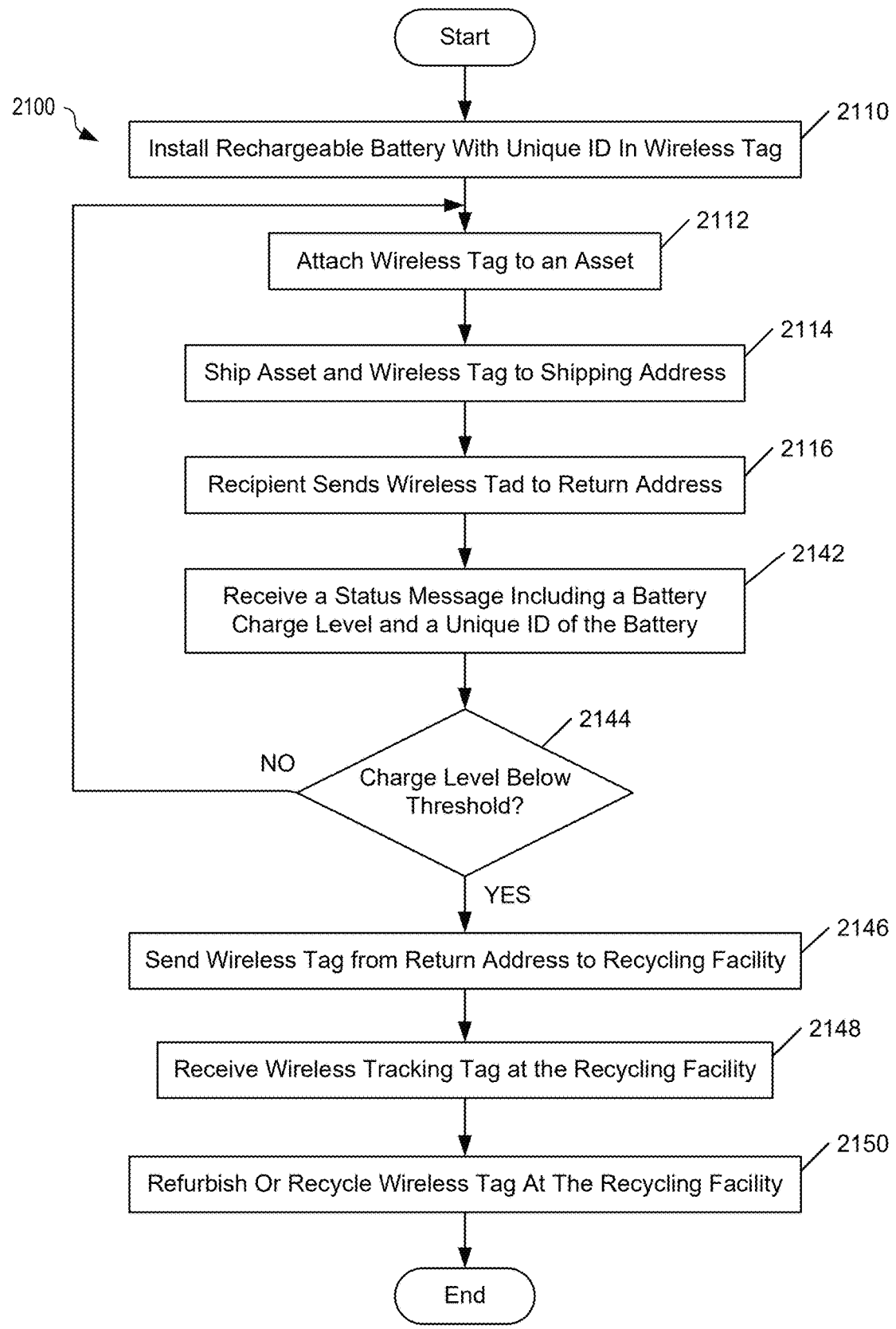
FIG. 21 is a flowchart illustrating one example method for remotely monitoring the charge level of a wireless tag battery and issuing an alert to ship the wireless tag for renovation or recycling when the monitored battery level is below a threshold, in embodiments.

FIG. 21 is a flowchart illustrating one example method 2100 for remotely monitoring the charge level of a wireless tag battery and issuing an alert to ship the wireless tag for renovation or recycling when the monitored battery level is below a threshold. Method 2100 is an alternate embodiment of method 1900 of FIG. 19. In other embodiments, other metrics may additionally or instead be remotely monitored and alerts may be issued to ship the wireless tag for renovation or recycling when the other metrics are below a threshold. For example, the metrics may include performance of a processor or sensor, e.g., based on accuracy or frequency of data collection or processing operations. In block 2110, similar to block 1940, a rechargeable battery with a unique ID is installed in a wireless tag. The wireless tag is then deployed in the field and may perform various functions. In the example of FIG. 21, the wireless tag is used to track delivery of an asset. In block 2112, the wireless tag is attached to the asset. For example, the wireless tag may be attached using a transparent sleeve 114 as shown in FIGS. 1A-1C.

In block 2114, the assets with the wireless tag are shipped to a shipping address (e.g., to a customer). As shown in FIGS. 1A-1C, the wireless tag may include instructions for the customer, such as to ship the wireless tag to a return address after the asset has been delivered to the shipping address. In block 2116, the recipient sends the wireless tag to the return address. In some embodiments, the wireless tag includes the return address printed or otherwise displayed on the wireless tag, as shown for wireless tag 112.

After the wireless tag has been delivered to the return address, the charge level of the rechargeable battery is remotely monitored by wireless tracking system 1000 of FIG. 10. In block 2142, wireless tracking system 1000 receives a message with the battery charge level and the unique battery ID from the wireless tag, as described above for block 1942 of FIG. 19. In other embodiments, the charge level and unique battery identifier are determined at the return address by a node of the wireless tracking system 1000 (e.g., a mobile gateway 1010 and/or a stationary gateway 1014 located at the return address).

Block 2144 is a decision. If, in block 2144, the status message indicates that the charge level is above a threshold charge level, the method 2100 continues with block 2112 where the wireless tag is attached to a new asset and used to track the new asset, repeating blocks 2112, 2114, 2116, 2142, and 2144. Where the wireless tag displays the shipping address for the asset previously tracked, the wireless tag may be modified before the new asset is shipped. For example, the shipping address may be on a sticker or label that is on the wireless tag. The sticker or label may be replaced or covered with a new sticker or label that has the new shipping address for the new asset. Other modifications may be made to the wireless tag before it is reused for the new asset, according to some embodiments.

In block 2146, since the charge level is at or below the threshold charge level, the wireless tag is shipped to a recycling facility. For example, the wireless tracking system 1000 may send a notification to personnel (e.g., via the mobile gateway 1010 and/or stationary gateway 1014 located at the return address). Wireless tag may be aggregates and shipped, as described above with respect to FIG. 20. In block 2148, the wireless tag is received at the recycling facility. In block 2150, the wireless tag is refurbished or recycled at the recycling facility.

Figure 22A:
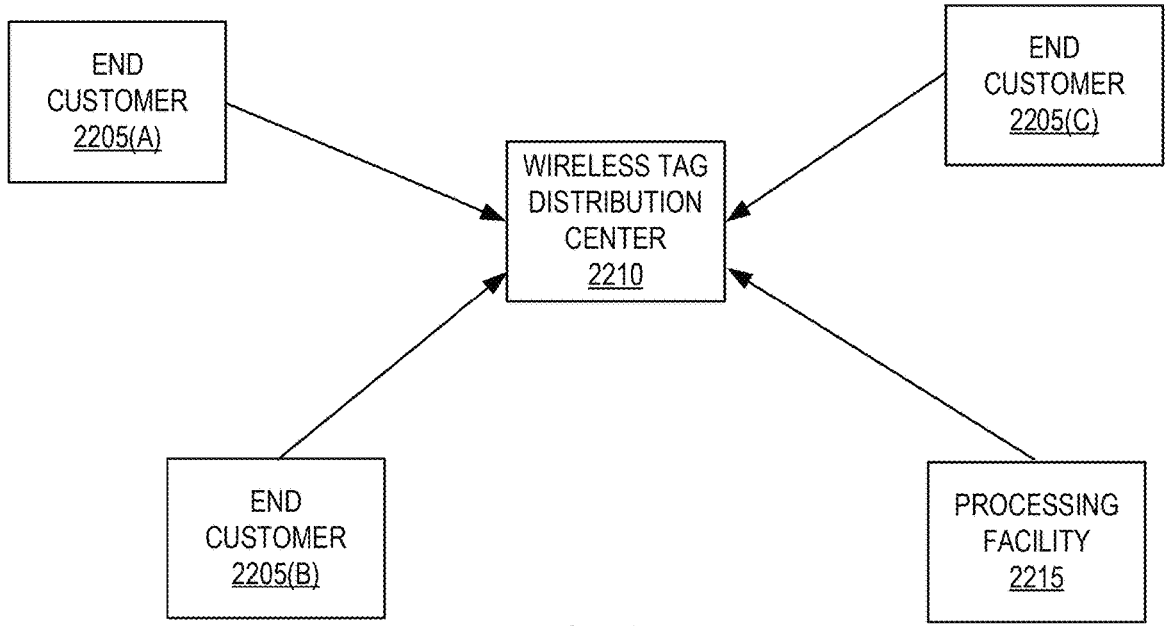
FIGS. 22A-22C are block diagrams illustrating example aggregation points for refurbishing or recycling wireless tags, in embodiments.
Figure 22B:
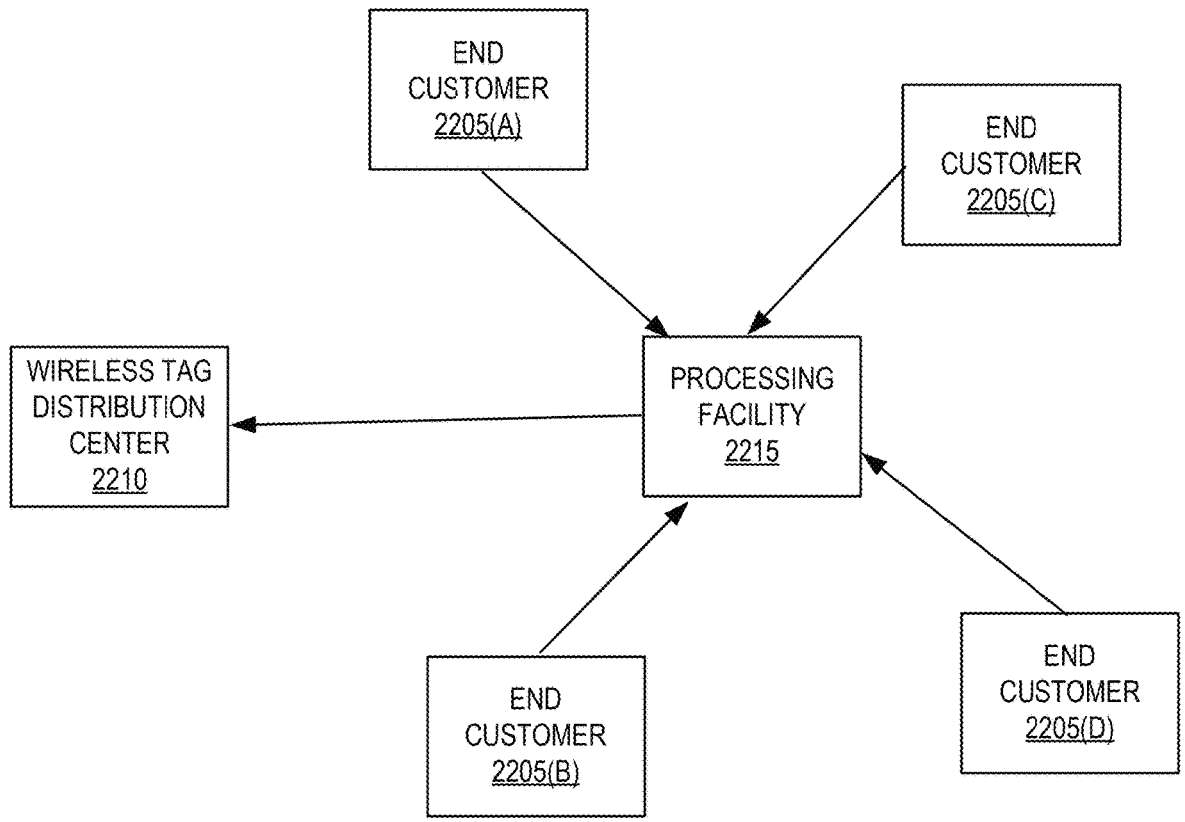
Figure 22C:
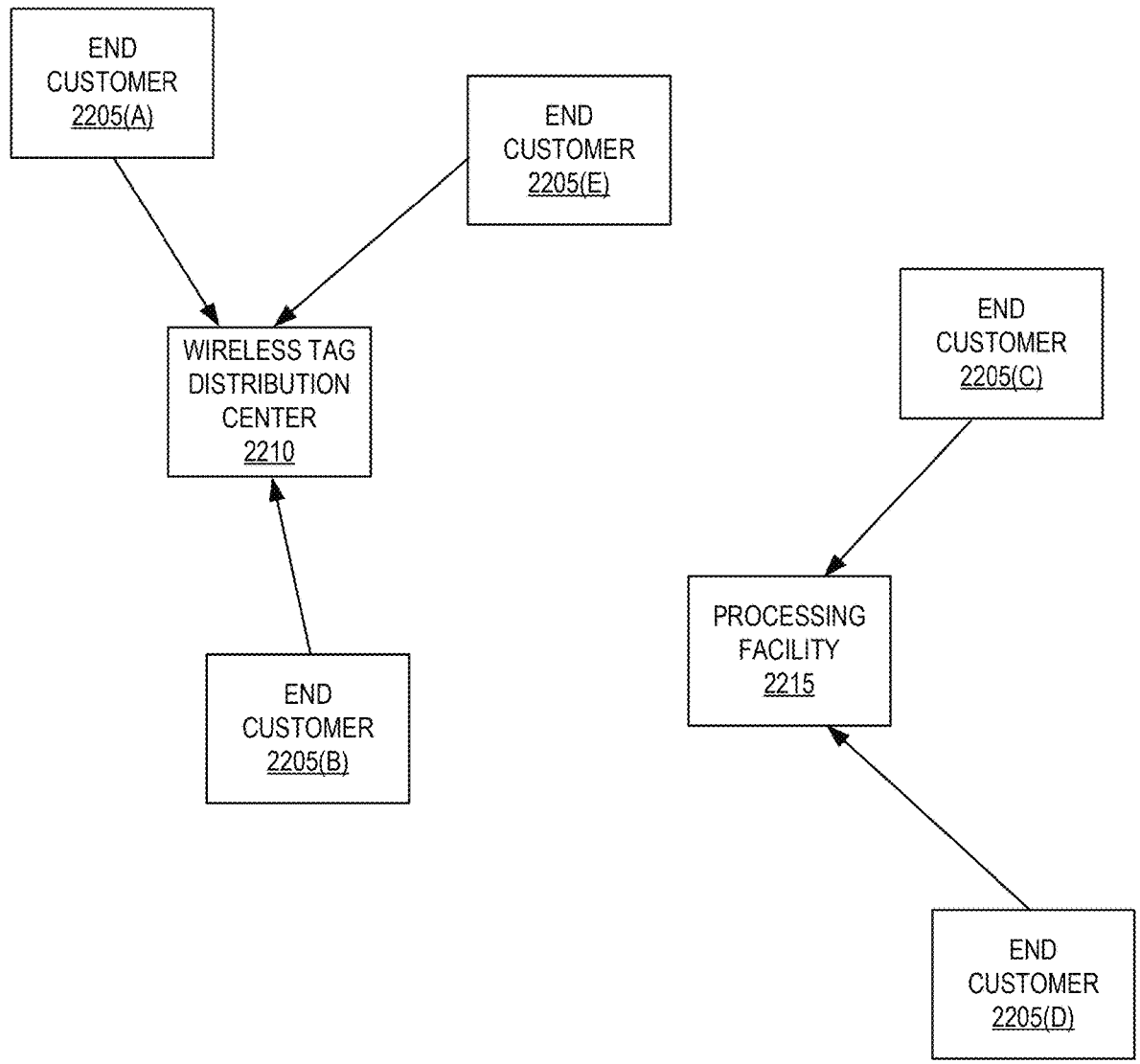

FIGS. 22A-22C are block diagrams illustrating example aggregation points for refurbishing or recycling wireless tags. End customers 2205(A)-(C), processing facilities 2215, and wireless tag distribution centers 2210 are locations associated with one or more stages or phases of asset movement. For example, the wireless tag distribution center 2210 is an origin location for a plurality of wireless tags and/or for a plurality of assets, e.g., a manufacturing plant or storage facility. Processing facilities 2215 may be, for example, an intermediate transport or delivery service, e.g., UPS or USPS, and end customers 2205(A)-(C) are one or more destination locations (e.g., shipping addresses) of assets. In some embodiments, wireless tag distribution centers 2210 or processing facilities 2215 may have means for renovating or recycling wireless tags. In other environments, there may be more, different, or fewer end customers 2205, processing facilities 2215, and wireless tag distribution centers 2210 than shown in FIGS. 22A-22C.

In the embodiment of FIG. 22A, one or more end customers 2205(A)-(C) and a processing facility 2215 release wireless tags to the wireless tag distribution center 2210 for use in shipping. In one example of operation, one or more end customers 2205 receive an asset including a wireless tag, remove the wireless tag from the asset, and release the wireless tag to the wireless tag distribution center 2210 to be refurbished or recycled. In another example of operation, the processing facility 2215 removes one or more wireless tags from one or more assets and releases the one or more wireless tags to the wireless tag distribution center 2210 for refurbishing or recycling. That is, the processing facility 2215 may remove wireless tags from respective assets immediately prior to loading the assets for delivery to end customers 2205, enabling the processing facility to aggregate and release large numbers of wireless tags to the wireless tag distribution center 2210.

In the embodiment of FIG. 22B, one or more end customers 2205(A)-(D) release wireless tags to processing facility 2215, where they are aggregated. In certain embodiments, the processing facility 2215 may also aggregate one or more wireless tags associated with other assets (e.g., removed from assets by the processing facility prior to shipping the assets to end customers 2205). The processing facility 2215 then releases the aggregated wireless tags to be shipped to the wireless tag distribution center 2210 to be refurbished or recycled.

In the embodiment of FIG. 22C, processing facility 2215 has a means for renovating or recycling wireless tags. A first set of end customers 2205(A), 2205(B), and 2205(E) remove wireless tags from assets and release the wireless tags to wireless tag distribution center 2210 to be renovated or recycled. A second set of end customers 2205(C) and 2205(D) remove wireless tags from assets and release the wireless tags to the processing facility 2215 to be renovated or recycled. The first and second sets of end customers 2205 are determined based at least in part on one or more of. Relative locations of end customers to the wireless tag distribution center 2210 and processing facility 2215; throughput of renovation or recycling of the wireless tag distribution center 2210 and processing facility 2215; shipping costs of wireless tags to the wireless tag distribution center 2210 and the processing facility 2215; aggregation of sets of wireless tags at the wireless tag distribution center 2210 and the processing facility 2215; methods for renovation or recycling available at the wireless tag distribution center 2210 and the processing facility 2215; and a number or type of asset in need of wireless tags or wireless tag components at the wireless tag distribution center 2210 and the processing facility 2215. In other embodiments, other factors may be used to determine the sets of end customers 2205.

Dynamic Mailing Address for Recycling Wireless Device

Figure 23A:
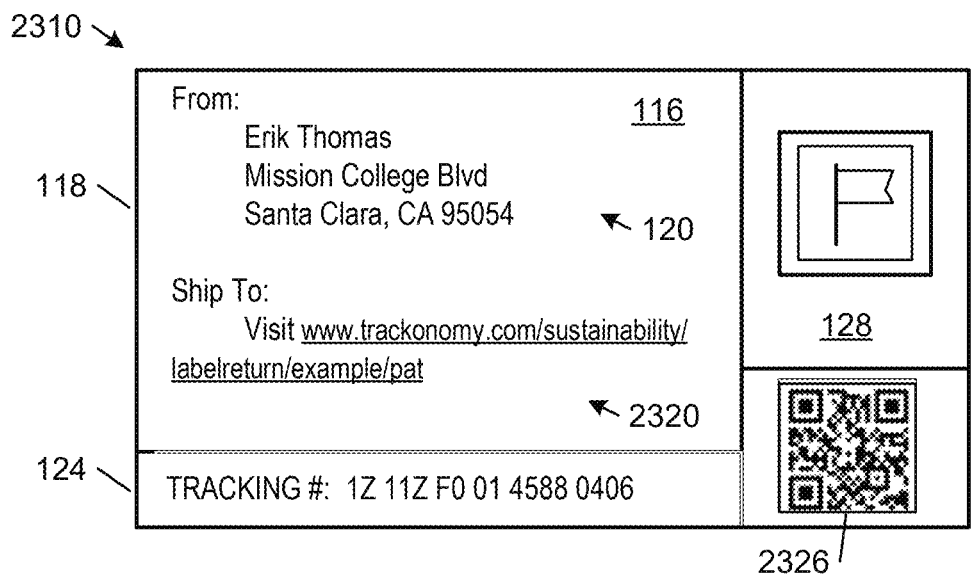
FIGS. 23A-23B are schematic diagrams illustrating example wireless tags, in embodiments.
Figure 23B:
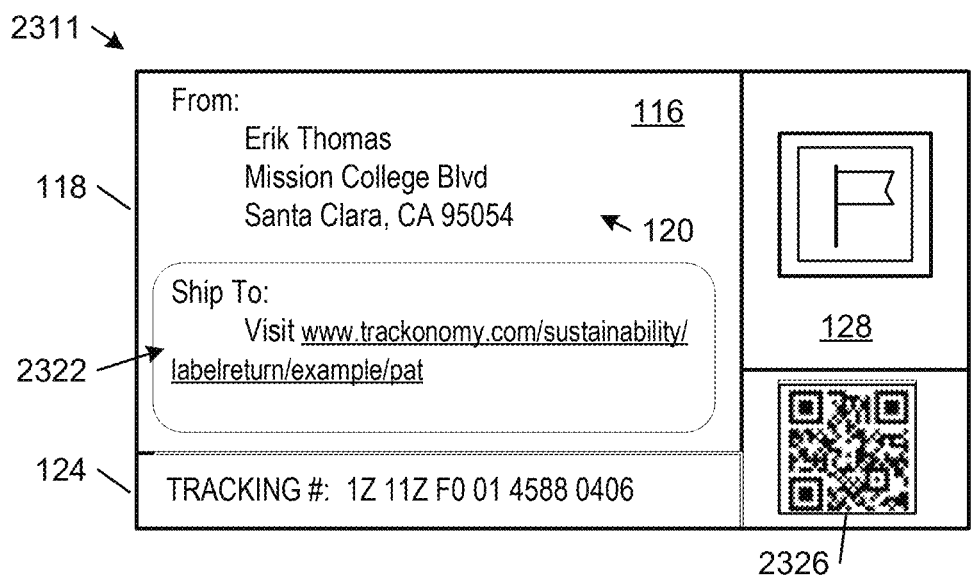

FIGS. 23A-23B are schematic diagrams illustrating example wireless tags 2310 and 2311, respectively. In FIG. 23A, a recycling instruction URL 2320 is printed on wireless tag 2310. In FIG. 23B, the recycling instruction URL 2320 is printed on a label 2322 that is attached to wireless tag 2311. A two-dimensional bar code 2326, e.g., a QR code, encoding the recycling instruction URL 2320 may also be printed on each wireless tag 2310 and 2311. In some embodiments, the two-dimensional bar code 2326 is printed on the label 2322, in addition to or instead of the URL 2320.

Figure 23C:
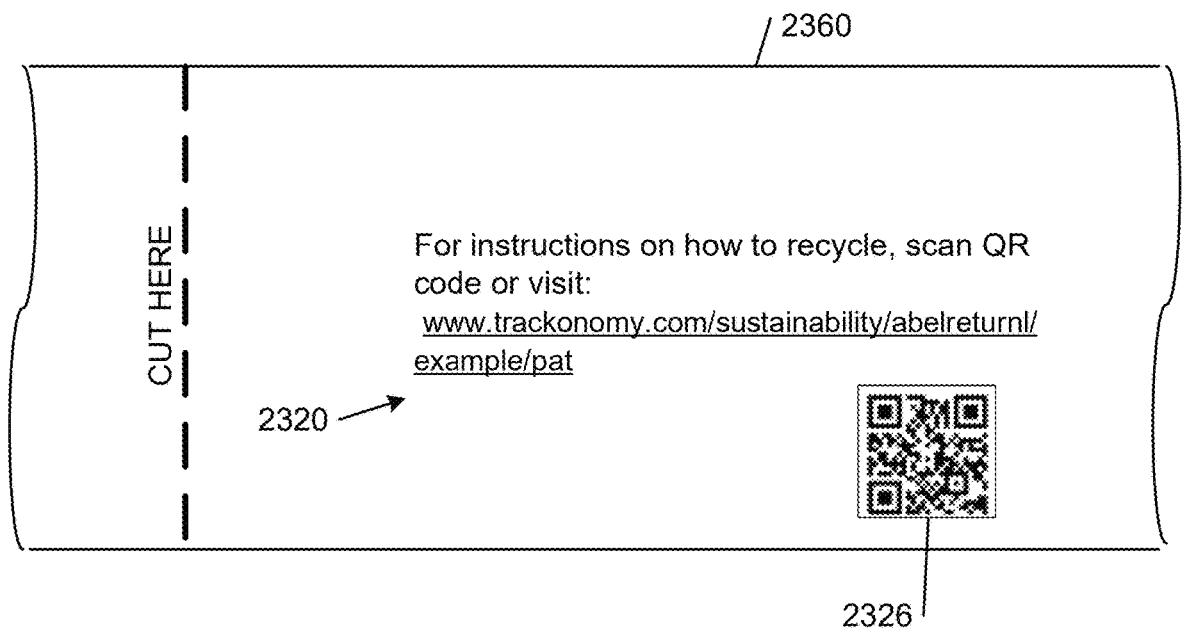
FIGS. 23C-23D are schematic diagrams illustrating examples of adhesive tape platforms, in embodiments.
Figure 23D:
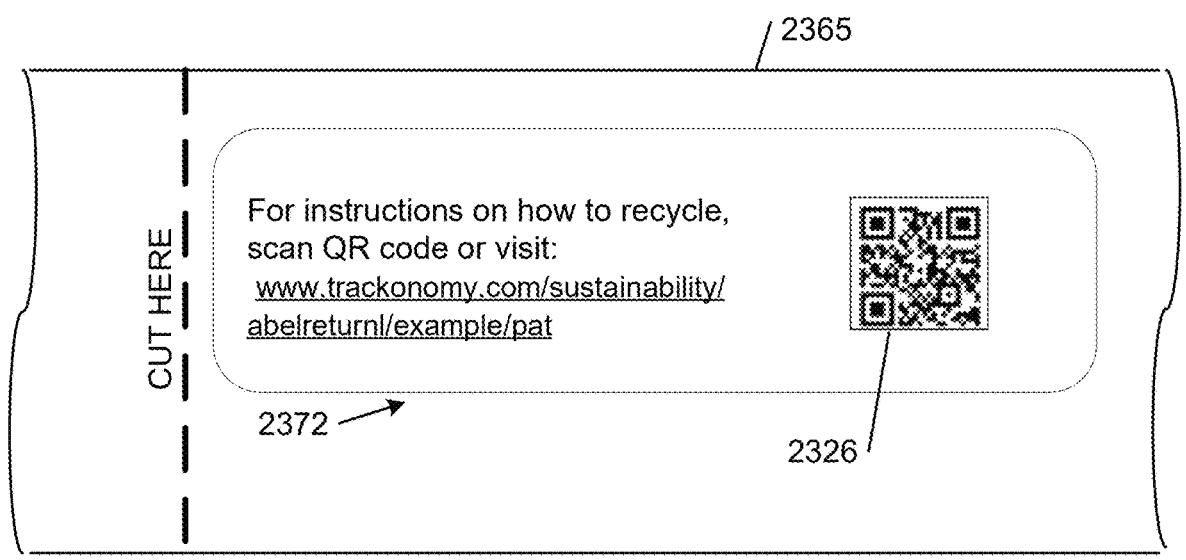

FIGS. 23C-23D are schematic diagrams illustrating examples of adhesive tape platform 2360 and 2365, respectively. In FIG. 23C, the adhesive tape platform 2360 includes the recycling instructions 2320 printed on a surface of the adhesive tape platform 2360. In FIG. 23D, a label 2372 with printed recycling instructions is attached to a surface of adhesive tape platform 2365. The adhesive tape platforms 2360, 2365 may each represent the adhesive tape platform segment 313 of FIG. 3.

In some embodiments, the recycling instruction URL 2320 may be printed on any wireless device that is configured to be returned to a mailing address for collection and/or recycling. In some embodiments, the label 2322 may be attached to any wireless device that is configured to be returned to a mailing address for collection and/or recycling.

In certain embodiments, recycling instruction URL 2320 may indicate a reward is available when the user sends the wireless device to a recycling facility. For example, the user may be able to enter details at a web page identified by recycling instruction URL 2320 such that a gift card, or other such reward, may be sent upon receipt of the returned wireless device. In another example, the reward may be triggered when the wireless device detects, by tracking its location, that it has been shipped back to the return address. In another example, wireless device may trigger the reward when it determines (e.g., by communication with a gateway node) that it has been deposited at a return aggregation point (e.g., dropped into a dedicated wireless device recycling bin near the gateway node). Tracking system 1000 may include a reward module (e.g., reward module 2406, FIG. 24B), running on server 1004 for example, that, in response to receiving confirmation of the successful return or recycling of a wireless device, automatically issues and sends a reward (e.g., reward 2407) to a user associated with the wireless tracking device. The wireless tracking device may also display an indication of a reward, in certain embodiments. For example, the wireless tracking device may display text reading "Recycle this label for a reward—Scan QR code for details", such as on one or more of label 2372, the exterior of adhesive tape platform 2360, on label 2322, and/or the exterior of wireless tag 2310.

Figure 24A:
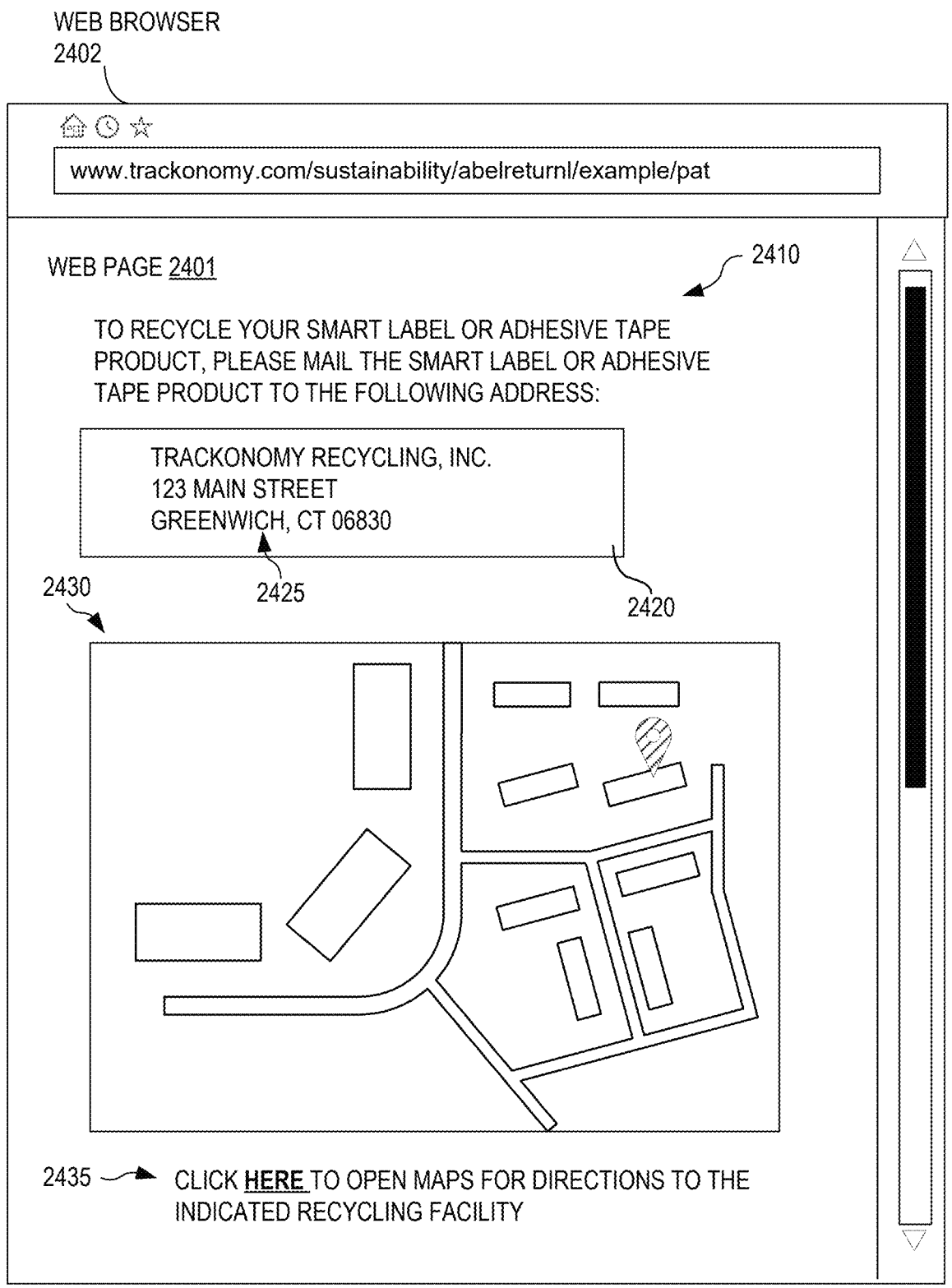
FIG. 24A is diagrammatic view of a browser displaying one example web page with instructions on how to recycle a wireless device, in embodiments.

FIG. 24A is diagrammatic view of a browser 2402 displaying one example web page 2401 with instructions on how to recycle a wireless device. Browser 2402 may run on user's a client device. Web page 2401 may include textual instructions and graphics 2410 for recycling the wireless device (e.g., a wireless tag or an adhesive tape platform). Web page 2401 also includes a dynamic mailing address field 2420. A dynamically loaded address 2425 is served by a server and displayed in the dynamic mailing address field 2420, based on a determined location of the user. The location of the user may be determined based on an IP address of the client device used to view the web page 2401. The location of the user may be determined based on other information received from the client device, according to some embodiments. For example, the user may opt to share the client device location with the web page 2401, and the client device may share location data with the web page.

The dynamically loaded address 2425 may be a return address for a recycling or collection facility that is closes to the determined user location, according to some embodiments. The server hosting the web page 2401 retrieves the dynamically loaded address 2425 from a database and serves the dynamically loaded address 2425 to the dynamic mailing address field 2420. In other embodiments, the return address may be a different address retrieved from a database, based on the determined location of the user. In certain embodiments, web page 2401 may display a map 2430 showing the location of the nearest recycling facility to the user. In other embodiments, web page 2401 may display a hyperlink 2435 that when selected opens a mapping tool to display a map with navigation instructions from the user's location to the recycling facility.

Figure 24B:
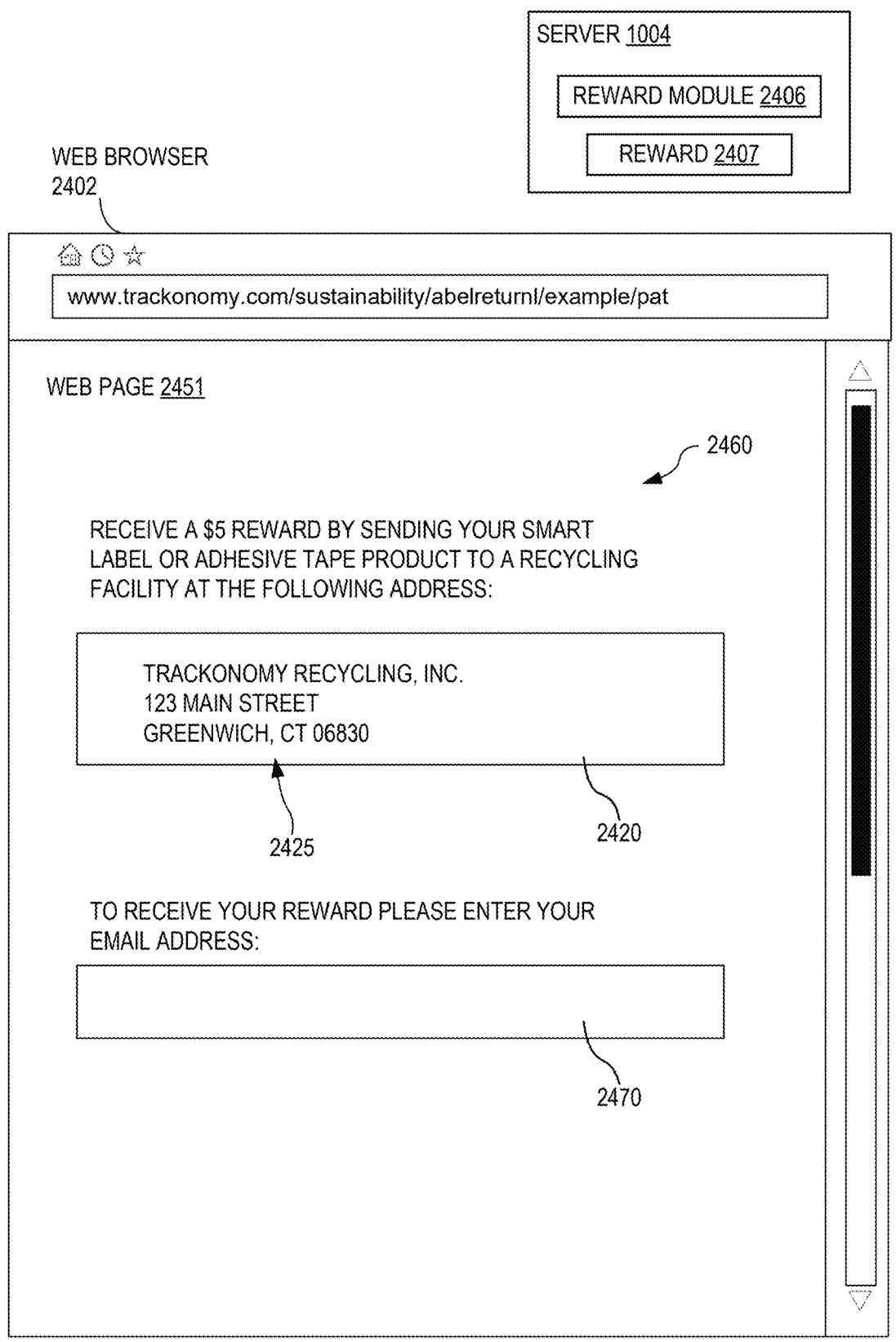
FIG. 24B is diagrammatic view of a browser displaying one example web page with reward information on recycling a wireless device, in embodiments.

FIG. 24B is diagrammatic view of web browser 2402 of FIG. 24A displaying one example web page 2451 showing reward information 2460 for recycling a wireless device at a selected recycling facility. In the example of FIG. 24B, web page 2451 indicates that reward 2407 is five dollars; however, other amounts and types of reward may be displayed without departing from the scope hereof. For example, reward 2407 may be a discount coupon for a new wireless device, a voucher for an alternative product, a gift card, and so on. Web page 2451 may display the dynamically loaded address 2425 from the database served to the dynamic mailing address field 2420, similar to web page 2401. Although not shown, web page 2451 may also include a map (e.g., map 2430) and/or a hyperlink (e.g., hyperlink 2435) that when selected opens a mapping tool to display a map with navigation instructions from the user's location to the nearest recycling facility. In some embodiments, the web page 2451 includes a field 2470 for entering a user's contact information (e.g., email address), that may be used for redeeming reward 2407. In one example of operation, when the user completes the return/recycling of the wireless device successfully, reward module 2406 of wireless tracking system 1000 automatically issues and sends reward 2407 to the user based on the contact information entered into field 2470 by the user. For example, the user may enter their e-mail address, and wireless tracking system 1000 sends reward 2407 in the form of a digital gift card to the e-mail address. In other embodiments, the web page 2451 may allow the user to log in to an account for a service associated with reward 2407 and thereby allow the user to redeem reward 2407 through the associated service.

Figure 25A:
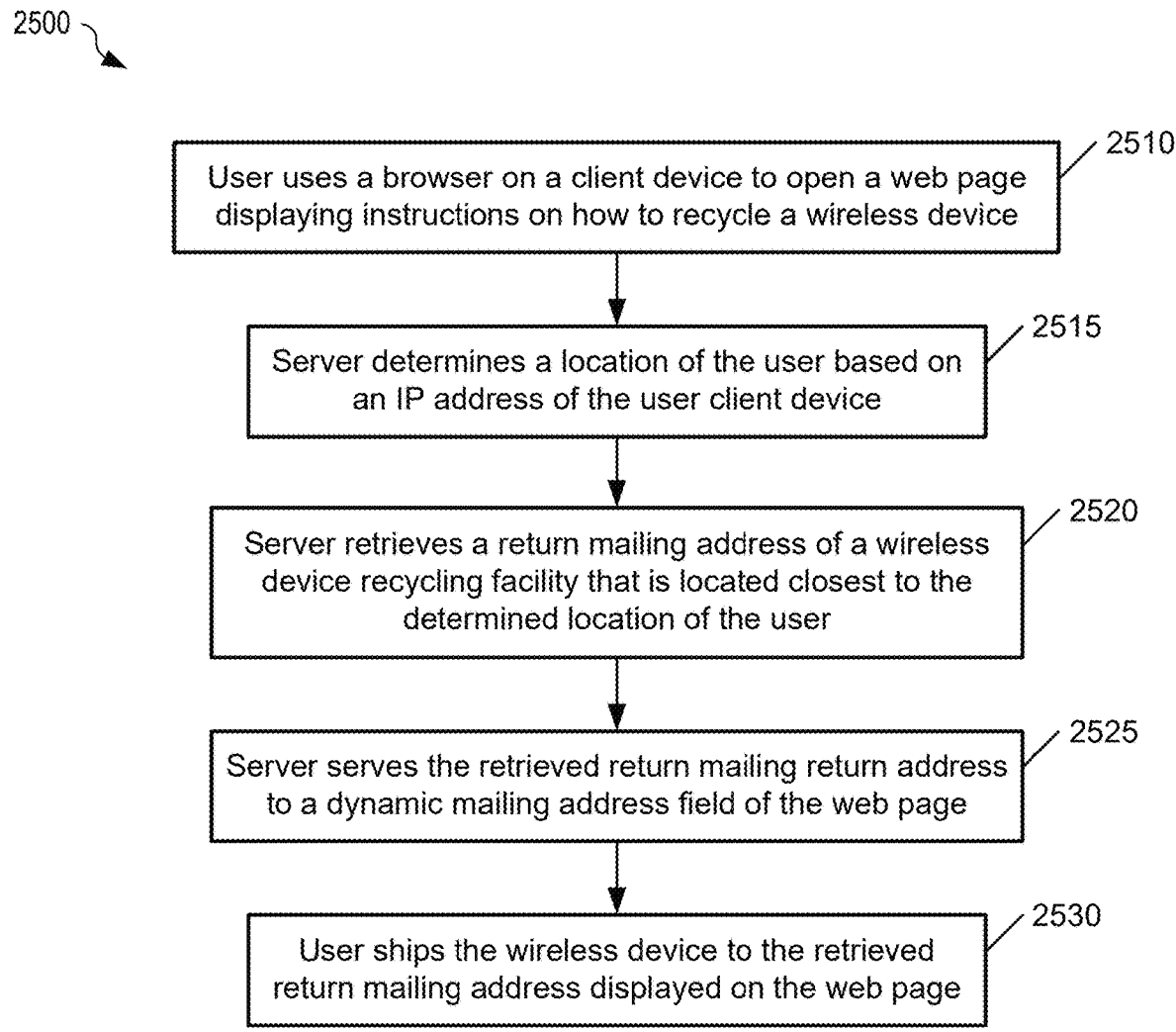
FIG. 25A is a flowchart illustrating one example method for recycling a wireless device, in embodiments.

FIG. 25A is a flowchart illustrating one example method 2500 for recycling a wireless device. Method 2500 is implemented, at least in part, within servers 1004 of wireless tracking system 1000 of FIG. 10.

In block 2510, a user uses a browser running on a client device to open a web page displaying instructions on how to recycle a wireless device. For example, a user uses a smartphone to scan bar code 2326 of wireless tag 2310, causing the smartphone to open browser 2402 to display web page 2401 with textual instructions and graphics 2410 for recycling a wireless device. In block 2515, the server determines a location of the user based on an IP address of the user client device. For example, server 1004 determines an approximate geographic location of the user based on the IP address of the client device accessing web page 2401.

In block 2520, the server retrieves a return mailing address of a wireless device recycling facility that is located closes to the determined location of the user. For example, when the IP address of user viewing web page 2401 is associated with a location on the North American west coast, server 1004 retrieves dynamically loaded address 2425 of a recycling facility located on the North American west coast; when the IP address of user viewing web page 2401 is associated with a location on the North American east coast, server 1004 retrieves a dynamically loaded address 2425 of a recycling facility located on the North American east coast; and when the IP address of user viewing web page 2401 is associated with a location in Europe, server 1004 retrieves a return mailing address of a recycling facility located in Europe.

In block 2525, the server serves the retrieved return address to a dynamic mailing address field of the web page. For example, server 1004 causes web page 2401 to display dynamically loaded address 2425 in dynamic mailing address field 2420. In block 2530, the user ships the wireless device to the retrieved return mailing address displayed on the web page. For example, the user may print out the address from web page 2401 and take the wireless device and the address to a mailing location. In another example, web page 2401 may integrate with one or more shipper APIs and thereby generate a shipment label from web page 2401, which the user may print and use to ship the wireless device to the appropriate recycling facility. Alternatively, web page 2401 may allow the user to request a shipping label be mailed to them. In another example, a delivery person may print a return label when the asset is delivered. Accordingly, the return of the wireless device for recycling is as automated as possible.

Figure 25B:
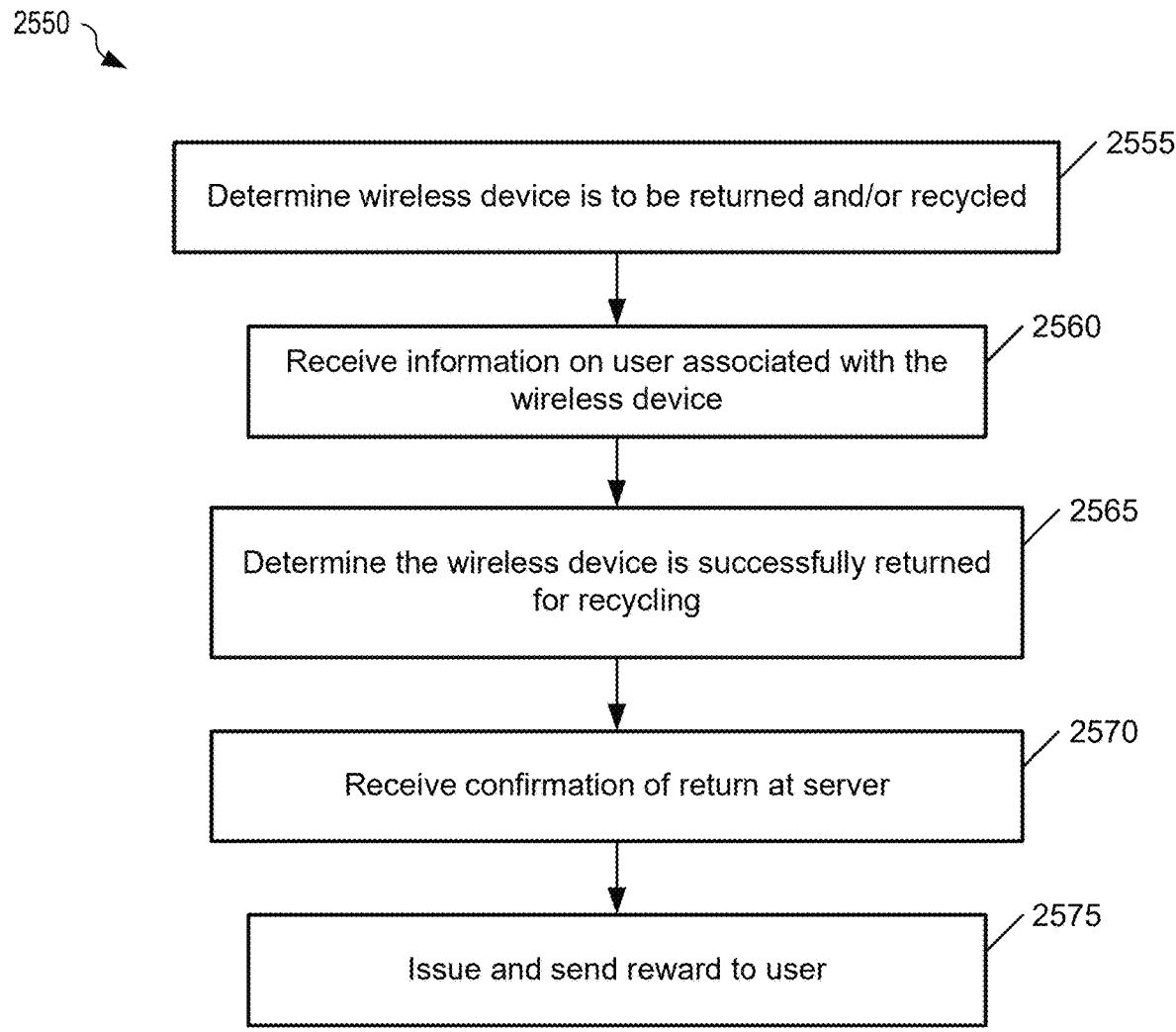
FIG. 25B is a flowchart illustrating one example method for providing a reward for recycling a wireless device, in embodiments.

FIG. 25B is a flowchart illustrating one example method 2550 for providing a reward for recycling a wireless device. Method 2550 is implemented, at least in part, by server 1004 of wireless tracking system 1000 of FIG. 10, for example. This example uses the recycling facility but may equally apply to a refurbishment or collection locations.

In block 2555, the wireless tracking system determines that the wireless device is to be returned and/or recycled. For example, adhesive tape platform 2360, FIG. 23C, may determine that its battery level is low and therefore adhesive tape platform 2360 needs refurbishing or recycling. In another example, wireless tag 2310, FIG. 23A, determines that it has a hardware fault and therefore needs refurbishing or recycling. In another example, wireless tag 112 determines that it has reached destination address 122 and has therefor completed its purpose and may be refurbished or recycled.

In block 2560, the server receives information on the user associated with the wireless device. For example, the user of adhesive tape platform 2360 views web page 2451 of FIG. 24B and enters an email address to field 2470. In another example, web site 2401 captures an email address of the user when the user accesses the web page. In block 2565, the wireless tracking system determines that the wireless device has been successfully returned for recycling. For example, a mobile gateway 1010 or a stationary gateway 1014 (or other tape node) at the recycling facility connects with adhesive tape platform 2360 when it arrives at the recycling facility, identifying adhesive tape platform 2360 from the communication. In block 2570, the server receives confirmation of the return of the wireless device. For example, server 1004 receives confirmation that adhesive tape platform 2360 has arrived at the recycling facility when it communicates with stationary gateway 1014. In block 2575, the server issues and sends a reward to the user. For example, reward module 2406 issues reward 2407 and sends reward 2407 to the email address entered into field 2470.

Integrated Smart Label Display

One aspect of the present embodiments includes the realization that it would be useful to update a shipping label during shipping of an asset when circumstances of the asset, the deliver process, and/or the destination change during the shipping. The present embodiments solve this problem by including an integrated smart label display with a wireless tacking device (e.g., tape node). Advantageously, the wireless tracking device, as part of a wireless tracking system (e.g., wireless tracking system 1000, FIG. 10) to report tracking information, may also receive updated route information from the server (e.g., servers 1004) and update information shown on the integrated smart label display at any time while on route to its destination.

Figure 26:
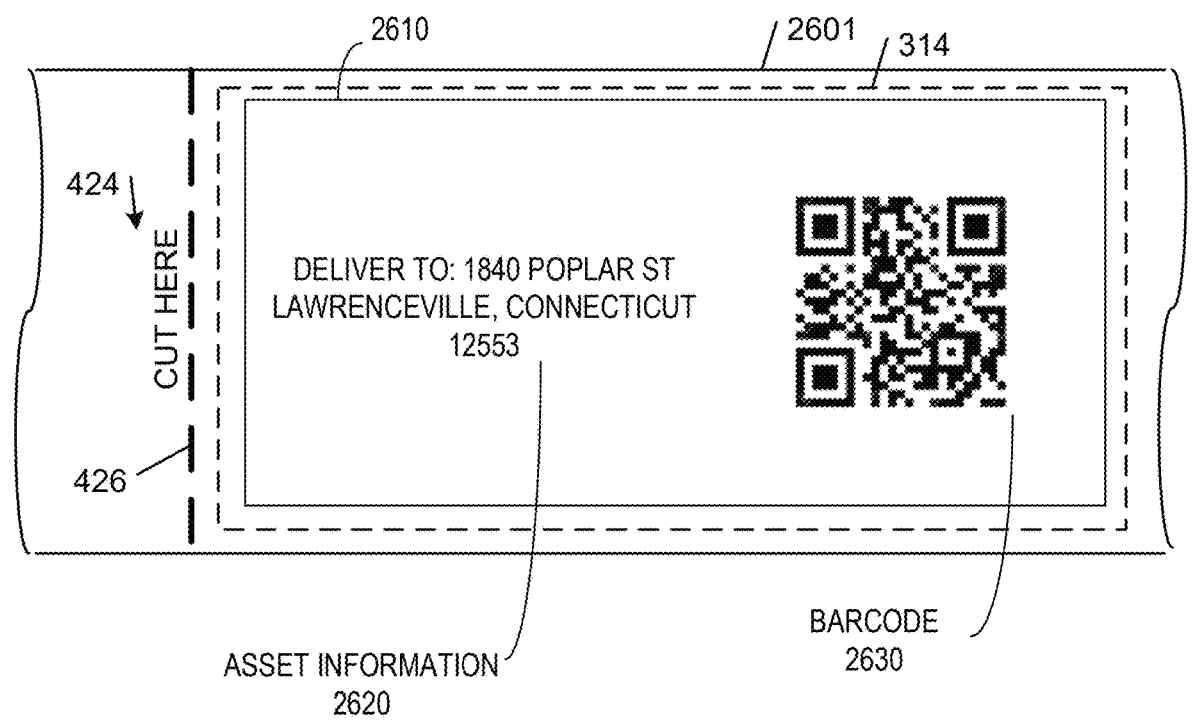
FIG. 26 is a diagrammatic top view of an example tape node that includes an integrated smart label display, in embodiments.

FIG. 26 is a diagrammatic top view of an example tape node 2601 that includes an integrated smart label display 2610. Tape node 2601 is similar to segment 313 of adhesive tape platform 312 of FIG. 3, and further includes integrated smart label display 2610 on at least one surface. In certain embodiments, integrated smart label display 2610 is one of an electronic paper, an e-ink display, an electrophoretic display, an electrowetting display, an electrofluiding display, an Interferometric modulator display, a plasmonic electronic display, or another type of electronic paper display. Integrated smart label display 2610 may be any type of display that consumes little or no electrical energy to display information, using more power only when integrated smart label display updated or refreshed. Integrated smart label display 2610 is shown displaying (a) asset information 2620 of an asset associated with tape node 2601 and (b) a barcode 2630, both of which may by dynamically refreshed or updated at any time by tape node 2601. Integrated smart label display 2610 may show other information or graphical elements without departing from the scope hereof. In one example, integrated smart label display 2610 shows handling instructions for the asset and/or a status of the asset. In another example, integrated smart label display 2610 shows delivery instructions. In another example, integrated smart label display 2610 shows acceptable environmental conditions for the associate asset. In another example, integrated smart label display 2610 shows rules for delivery. In another example, integrated smart label display 2610 shows shipping information. In another example, barcode 2630 displayed by integrated smart label display 2610 is used by the delivery operator (e.g., scanned to identify and track the asset within a different computer system).

Tape node 2601 does not need to be associated with a particular barcode at a provisioning or initiation step, since no barcode is permanently printed on tape node 2601, as in other embodiments where an operator scans a bar code printed on the tape node while communicating (e.g., using Bluetooth and a client device running an app) with the tape node to associate the barcode with a hardware identifier of the tape node. For example, tape node 2601 may generate a barcode that is automatically (or already) associated with its hardware identifier, or it may receive the barcode from the wireless tracking network 1000 of FIG. 10 (e.g., from server(s) 1004) and display the barcode on integrated smart label display 2610. In another example, tape node 2601 may receive a shipping bar code supplied by a shipper of the asset. Advantageously, a human operator is not required to perform the association in the app since the association between the barcode and the hardware identifier is already known by wireless tracking system 1000. In certain circumstances, the association of the barcode and the hardware identifier is performed prior to initiation of tape node 2601 and the association is already stored by server 1004 prior to affixing the tape node to an asset.

Figure 27:
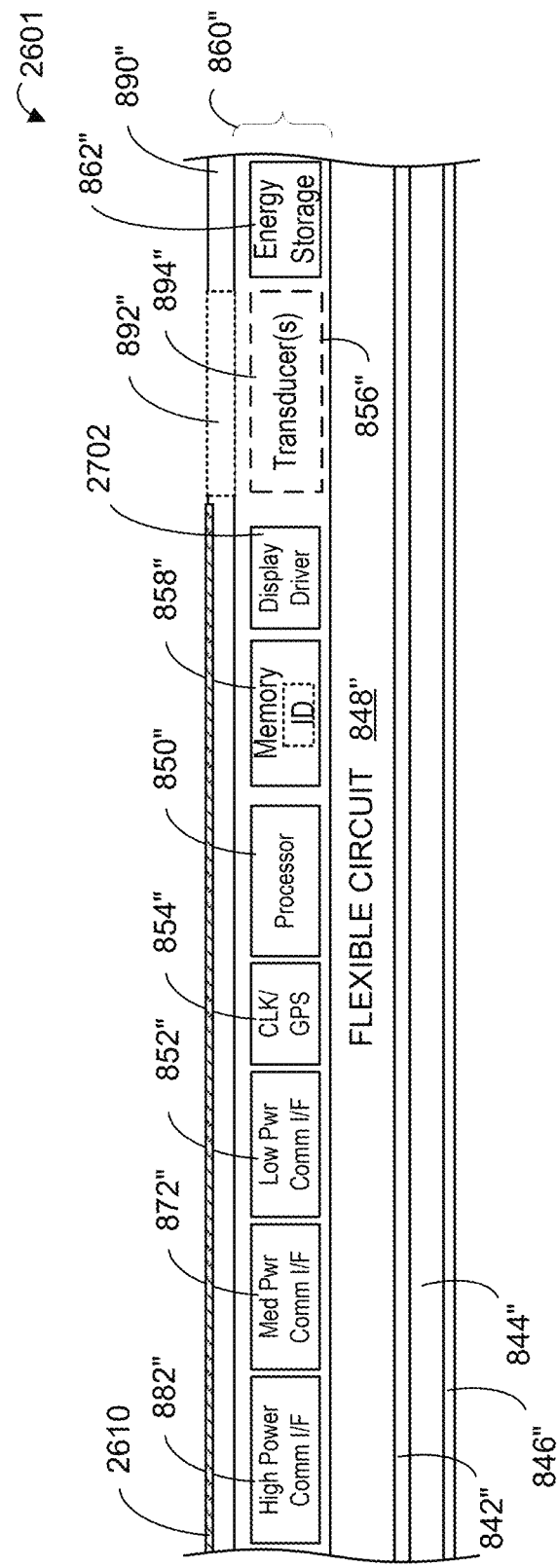
FIG. 27 shows a cross-sectional side view of a portion of the tape node of FIG. 26, in embodiments.

FIG. 27 shows a cross-sectional side view of a portion of tape node 2601 of FIG. 26 that is similar to segment 880 of FIG. 8C, including a respective set of the components of the wireless transducing circuit 610, FIG. 6, corresponding to the third tape-node type (e.g., black), but further including integrated smart label display 2610 positioned at an outer surface of flexible cover 890" and a corresponding display driver 2702. Although segment 880 is used in this example, one or more of high-power communications-interface 882", medium-power communications-interface 872", low-power communications-interface 852", and any other components may be omitted, and other components may be added, without departing from the scope hereof. That is, integrated smart label display 2610 and display driver 2702 may be included in any of the above-described tape nodes, tape agents, and adhesive tape platforms.

Figure 28A:
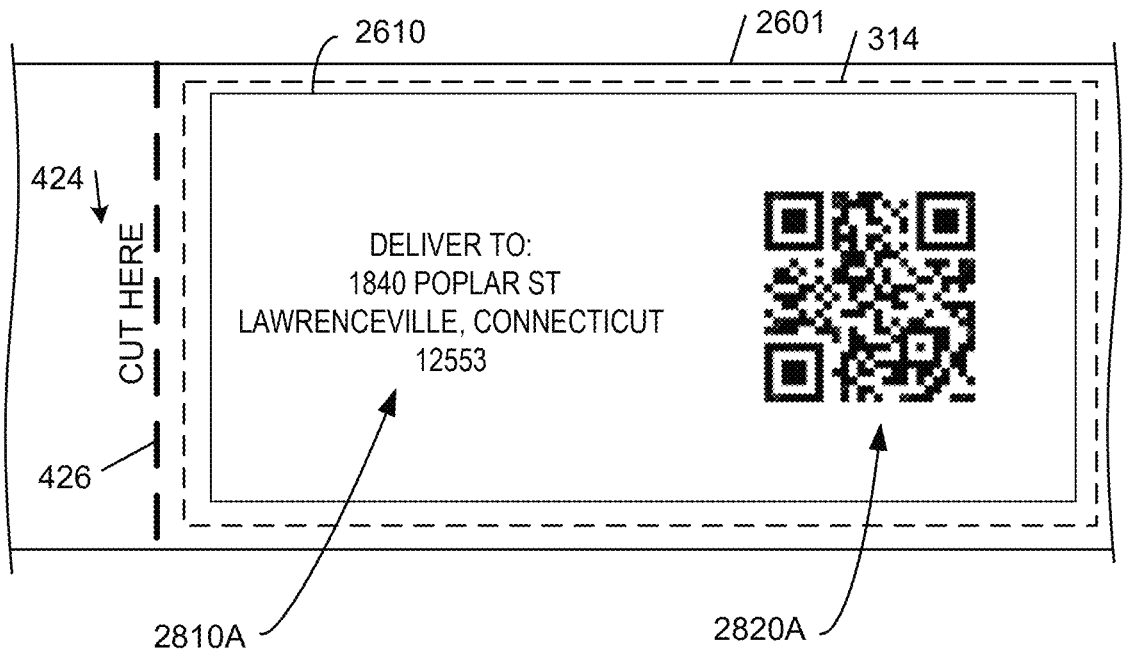
FIGS. 28A, 28B, and 28C are diagrammatic top views of the tape node of FIGS. 26 and 27 illustrating information displayed by the integrated smart label display before and after an update to the asset information, in embodiments.
Figure 28B:
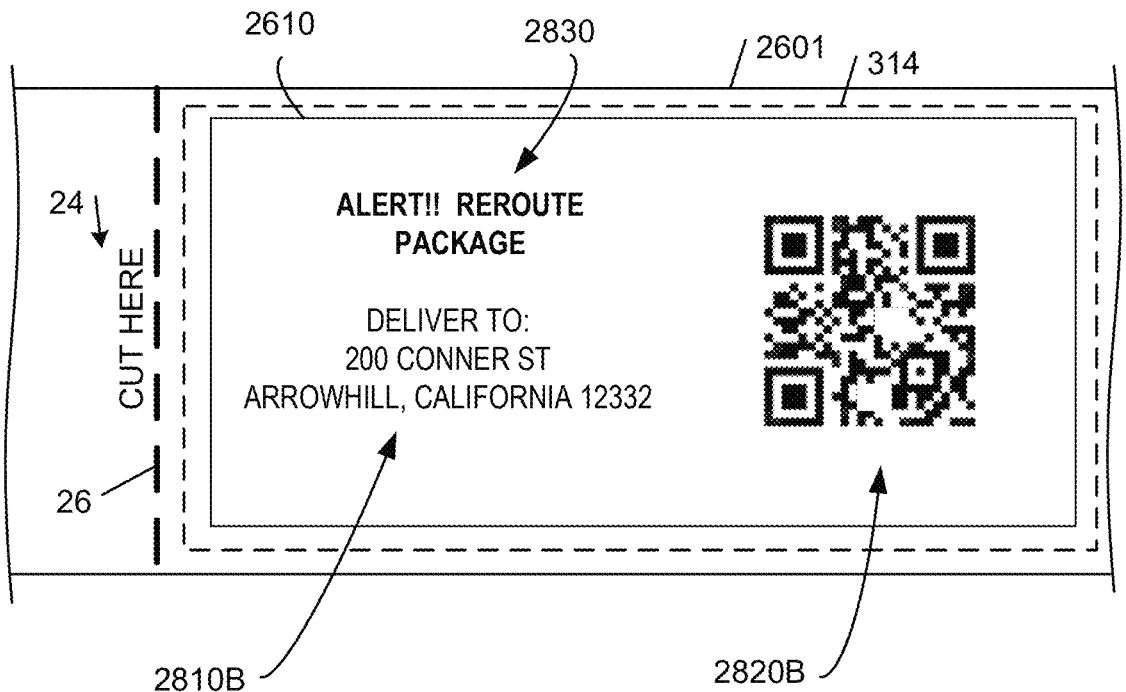
Figure 28C:
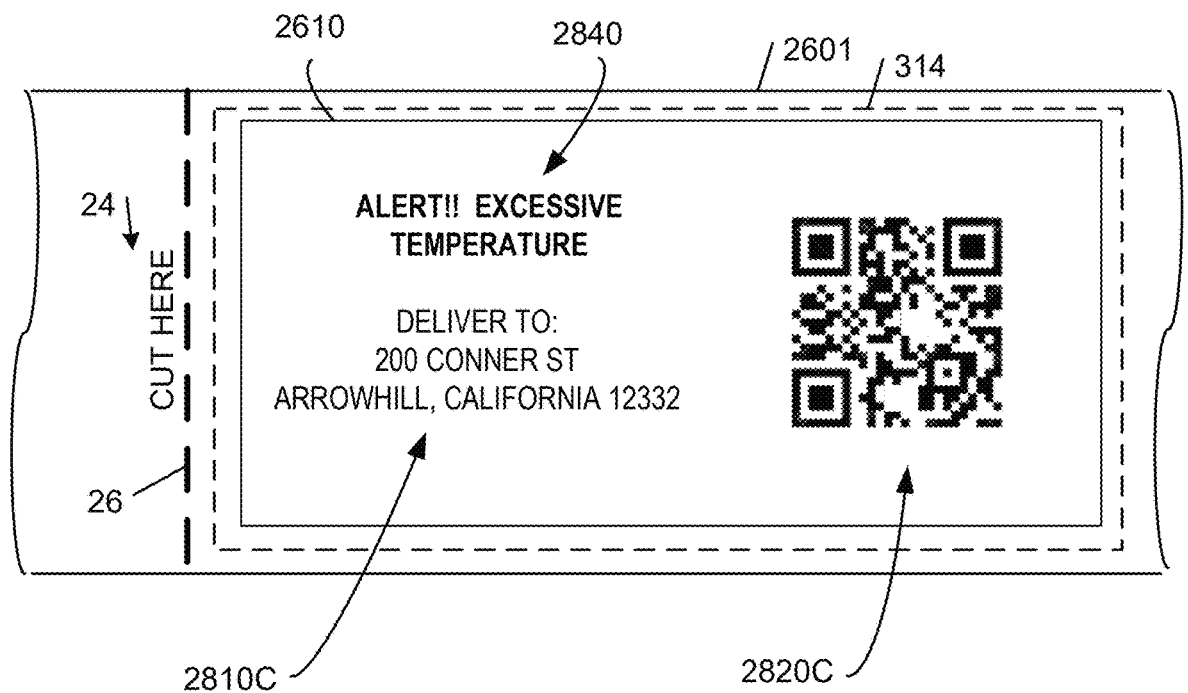

FIGS. 28A, 28B, and 28C are diagrammatic top views of tape node 2601 of FIGS. 26 and 27 illustrating information displayed by integrated smart label display 2610 before and after an update to the asset information. In FIG. 28A, integrated smart label display 2610 is displaying asset information 2810A and a barcode 2820A. Asset information 2810A includes a destination address for the asset associated with tape node 2601. When barcode 2820A is scanned (e.g., using a client device), an app on the client device may display information similar to asset information 2810A on the client device. Scanning barcode 2820A may also cause the client device to update a status of the asset in a database, such as to indicate that the asset has been picked up or handled by a human operator.

In FIG. 28B, integrated smart label display 2610 is displaying updated asset information 2810B and an updated barcode 2820B after tape node 2601 has received the updated information at a later time than shown in FIG. 28A. For example, the asset may be part way through a shipping route, when the updated information and updated barcode is received by tape node 2601. Tape node 2601 updates integrated smart label display 2610 to show updated asset information 2810B, updated barcode 2820B, and may also display a notification 2830. As described above, tape node 2601 may receive the updated information and barcode from another wireless node of the wireless tracking system 1000, FIG. 10. Alternatively, tape node 2601 may detect an event that causes tape node 2601 to update integrated smart label display 2610 to show updated asset information 2810B, updated barcode 2820B, and optionally display notification 2830.

In FIG. 28C, integrated smart label display 2610 is displaying updated asset information 2810C and an updated barcode 2820C after tape node 2610 has detected an event corresponding to the associated asset and determines that tape node 2601 updates integrated smart label display 2610 to show updated asset information 2810C, updated barcode 2820C, and a notification 2840 indicative of the detected event.

Tape node 2601 is not used for tracking a delivery of a parcel or an asset in transit, but is used to track a location or monitor a condition of an asset or piece of equipment that is not in transit. For example, tape node 2601 may include one or more sensors and is attached to a piece of equipment to measure the ambient and operating conditions of the piece of equipment. Using its sensors, tape node 2601 may capture the ambient and operating conditions and control integrated smart label display 2610 to display relevant data of the conditions, such as, but not limited to, a temperature detected by a temperature sensor of tape node 2601. Tape node 2601 may update integrated smart label display 2610 at periodic intervals (e.g., every 4 hours) or may update integrated smart label display 2610 when the measured ambient and operating conditions change, such as when a detected temperature transitions between being within a range and being outside the range. In one example, tape node 2601 is configured with one or more rules for the ambient and operating conditions, whereby tape node 2601 controls integrated smart label display 2610 to display a warning when the measured ambient and operating conditions violate at least one of the rules. In certain embodiments, based on the measured ambient and operating conditions and the rules, tape node 2601 controls integrated smart label display 2610 to include instructions on how to correct the ambient and operating conditions in the warning. Further, tape node 2601 may control integrated smart label display 2610 to include instructions for contacting someone in the warning. When at least one rule is violated, tape node 2601 may also send a message to wireless tracking system 1000, such that server 1004 may take appropriate action as needed.

In some embodiments, tape node 2601 controls integrated smart label display 2610 to display information regarding recycling or return of the tape node 2601, as described above with respect to FIGS. 1A-1C and 23A-23D. For example, tape node 2601 may control integrated smart label display 2610 to display one or more of return URL 2320, barcode 2326, and/or a 2D barcode encoding the return URL 2320. In certain embodiments, tape node 2601 controls integrated smart label display 2610 to display the return information when detecting that a task assigned to the tape node 2601 has been completed. For example, when tape node 2601 is assigned a task of tracking the location of an asset until an associated asset has been delivered to a destination, upon determining that the asset has reached a location corresponding to the destination, tape node 2601 controls integrated smart label display 2610 to display URL 2320. Similarly, tape node 2601 may control integrated smart label display 2610 to display information relevant to reward 2407 to encourage return and/or recycling of tape node 2601.

Figure 29:
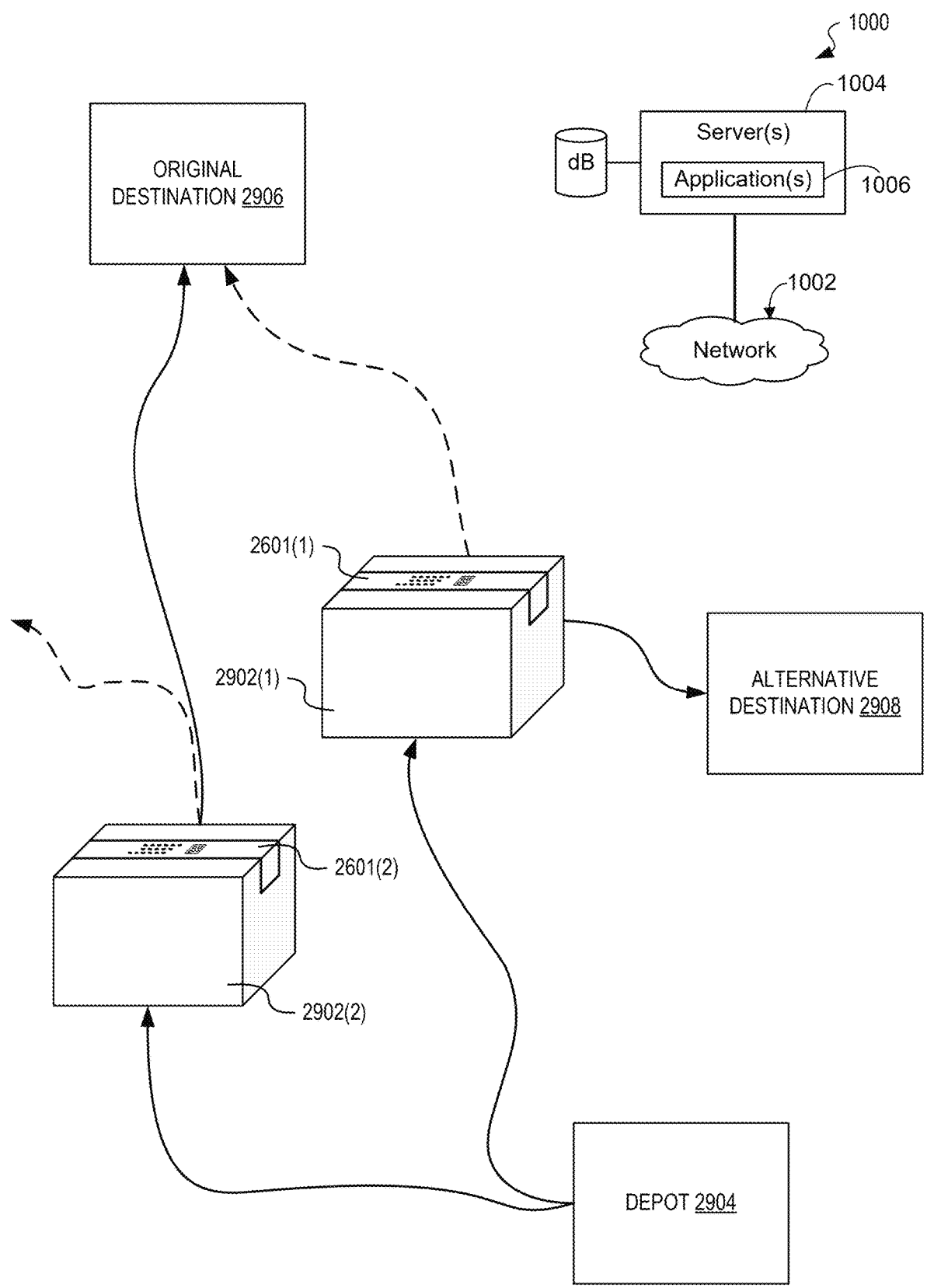
FIG. 29 shows one example scenario where the displayed asset information and/or barcode is updated by the tape node of FIG. 26, in embodiments.

FIG. 29 shows one example scenario where the displayed asset information and/or barcode is updated by tape node 2601 of FIG. 26. A first asset 2902(1) is being transported from a depot 2904 (e.g., a supplier or shipper warehouse) to an original destination 2906 (e.g., a location of a customer waiting to receive asset 2902) and is tracked by a first tape node 2601(1). Accordingly, first tape node 2601(1) displays a shipping address and associated barcode (e.g., asset information 2810A and barcode 2820A of FIG. 28A) corresponding to original destination 2906. During transportation of asset 2902(1), tape node 2601(1) detects an event based on one or more sensors integrated into the transducing circuit 314 of tape node 2601. The event may also be detected based on communications between wireless nodes of the tracking system 1000 or data received by the tape node 2601(1) from other wireless nodes of the tracking system 1000.

In one example, tape node 2601(1), monitoring an environment of asset 2902(1), detects environmental characteristics outside prescribed limits (e.g., a temperature range, shock/acceleration limit, a location, etc.) of asset 2902(1). Software running in tape node 2601 then determines, based on one or more rules for example, that the asset has been damaged and should not be delivered to original destination 2906, but instead should be sent to an alternative destination 2908. For example, where asset 2902(1) is temperature sensitive, such as for assets like medical supplies and food, when tape node 2601(1) senses temperatures outside the temperature range, tape node 2601 determines, based on a rule defining the temperature range for example, that asset 2902 is damaged. In another example, where asset 2902(1) is sensitive to shock (e.g., a fragile product that includes glass), when tape node 2601(1) senses accelerations outside a defined range in a rule, such as when asset 2902(1) is dropped, tape node 2601 determines that asset 2902 is damaged. In another example, tape node 2601 may use a current location to detect when a geofence, defined in a rule for example, is crossed, such as when moving into another country (e.g., updating integrated smart label display 2610 to display information in a different language) or domain (e.g., displaying additional directions when entering a geofenced area), or when reaching a waypoint or being handled/scanned by shipping personnel. In another example, tape node 2601 may determine that transport of asset 2902 to original destination 2906 is delayed and that an updated delivery time for asset 2902 to be delivered to original destination 2906 is later than a permissible delivery time, defined in a rule for example, and therefore should not be delivered to the original destination 2906, but instead should be sent to an alternative destination 2908. This may occur when asset 2902 is perishable (e.g., a food or a vaccine delivery), or when asset 2902 is not required after a certain date/time. Tape node 2601 may include one or more rules that define acceptable parameters of the associated asset and may define actions that are implemented when the rule is violated. While temperature and acceleration are used for the above examples, other characteristics may be detected by sensors of tape node 2601 to determine when asset 2902 is in need of redirection, such as, but not limited to, humidity, presence of a chemical or gas, and other characteristics that affect asset 2902.

In certain embodiments, tape node 2601(1) displays a notification (e.g., notification 2840, FIG. 28C) indicating the event and optionally providing instructions to correct the environmental error, such as "move to cooler location" when an upper temperature range of asset 2902(1) has been exceeded. In another example, tape node 2601 may update integrated smart label display 2610 after a certain amount of time since starting the shipment journey. In another example, tape node 2601 may update integrated smart label display 2610 to display a notification (e.g., notification 2830) when it detects that asset 2902(1) has deviated from a planned route. Such notification may help when tampering is suspected. For example, when tape node 2601 determines that tampering has occurred, tape node 2601 controls integrated smart label display 2610 to display a graphic or a message indicating that tampering has occurred, such as causing integrated smart label display 2610 to display text that reads "Warning: This item has been tampered with. Please contact an authorized operator." In another example, when tape node 2601 determines that the associated asset has been moved to an unauthorized location, tape node 2601 controls integrated smart label display 2610 to display a warning text that reads "This item has been illegally moved and has been reported as lost or stolen.".

Alternative destination 2908 may represent a manufacturer or supplier of asset 2902(1), and in certain circumstances, alternative destination 2908 may be depot 2904.

In certain embodiments, tape node 2601 sends captured environmental data to servers 1004 and application 1006 processes the environmental data to determine that asset 2902(1) is damaged and should not be delivered to original destination 2906. Application 1006 then sends a message instructing tape node 2601 to update integrated smart label display 2610 to show updated asset information 2810B and updated barcode 2820B of alternative destination 2908.

Accordingly, asset 2902(1) is redirected to alternative destination 2908 mid-route and without human intervention, since the displayed destination address, and/or corresponding instructions, are updated automatically. In certain embodiments, tape node 2601(1) is preconfigured (e.g., at initialization or at point of shipping) with information of both original destination 2906 and at least one alternative destination 2908. In certain embodiments, tape node 2601(1) is configured to select one of a plurality of alternative destinations 2908 based on the detected event. For example, when tape node 2601(1) determines that asset 2902(1) is not on the planned route, tape node 2601(1) may select alternative destination 2908 based on a current location of asset 2902(1). In another example, when tape node 2601(1) determines that an environment of asset 2902(1) has exceeded a defined temperature range, tape node 2601(1) redirects asset 2902(1) to a first alternative destination, whereas when tape node 2601(1) determines that asset 2902(1) has exceeded an acceleration limit (e.g., been dropped), tape node 2601(1) redirects asset 2902(1) to a second alternative destination.

Server 1004 may prioritize delivery of assets 2902 after they have shipped. Continuing with the example of FIG. 29, asset 2902(1) is rerouted to alternative destination 2908 (e.g., because of damage). Where original destination 2906 is a high priority destination (e.g., a hospital), server 1004 may divert a second asset 2902(2) that is similar to asset 2902(1) and already shipped to a lower priority destination (not shown) to original destination 2906. For example, server 1004 may send a message with updated asset information 2810B and updated barcode 2820B corresponding to original destination 2906, thereby rerouting asset 2902(2) for delivery to original destination 2906. Such rerouting of assets already shipped may be significantly faster that initiating a new shipment of another asset.

Figure 30:
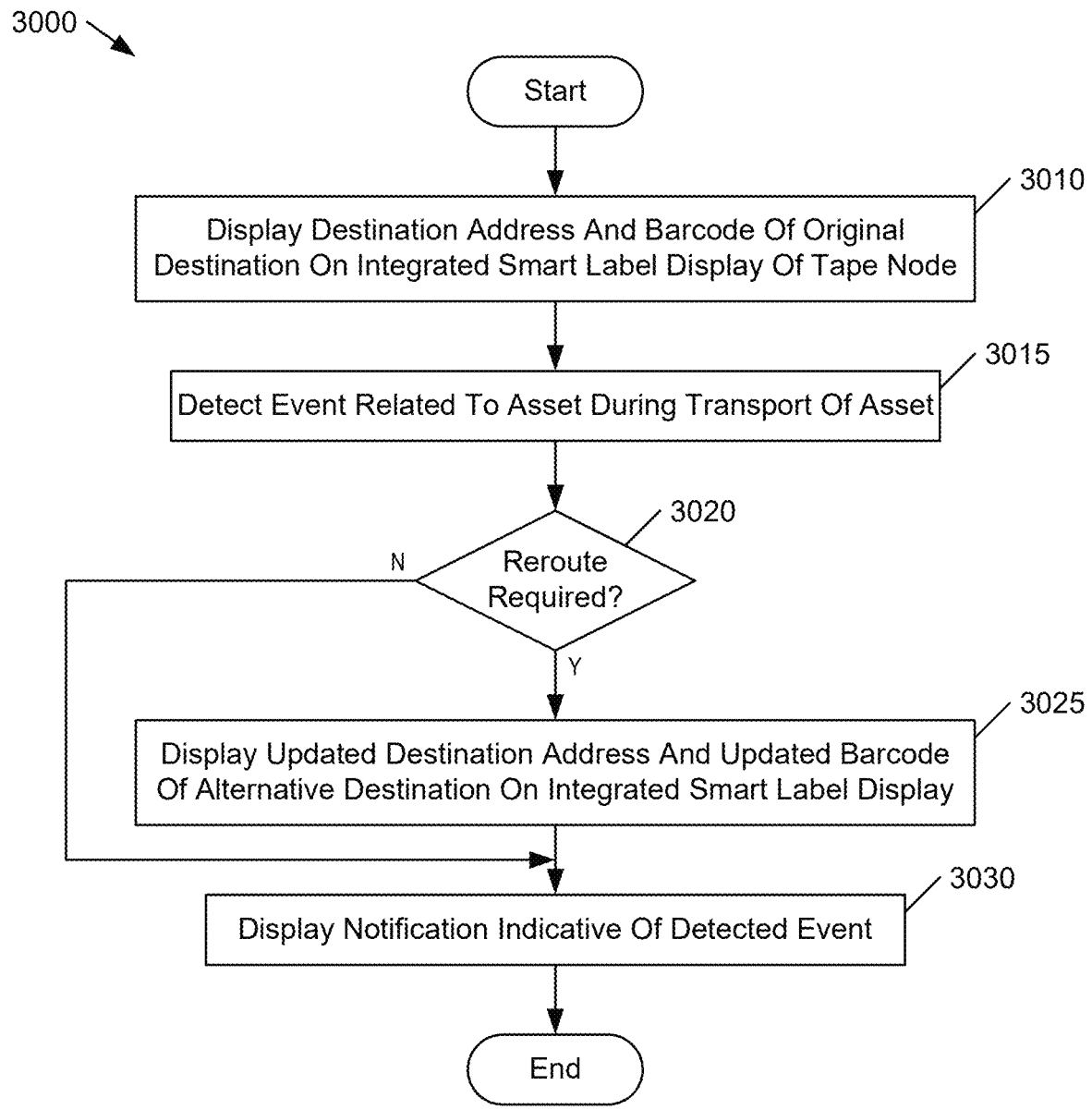
FIG. 30 is a flowchart illustrating one example method for redirecting an asset mid-route, in embodiments.

FIG. 30 is a flowchart illustrating one example method 3000 for redirecting an asset mid-route. Method 3000 is implemented in tape node 2601 of FIG. 26, for example. In block 3010, tape node 2601 displays a destination address and barcode of a first destination on an integrated smart label display of the tape node. In one example of block 3010, tape node 2601 displays asset information 2810A and barcode 2820A on integrated smart label display 2610, where asset information 2810A includes the destination address for the asset associated with tape node 2601. In block 3015, tape node 2601 detects an event related to the asset during transport of the asset. In one example of block 3015, tape node 2601(1) detects a temperature range excursion for asset 2902(1) using one or more sensors integrated into the transducing circuit 314 of tape node 2601(1). In another example of block 3015, tape node 2601(1) detects excessive acceleration (indicative of asset 2902(1) being dropped) for asset 2902(1) using one or more sensors integrated into its transducing circuit 314. In another example of block 3015, tape node 2601(2) receives a message from server 1004 (e.g., a remotely detected event) indicating that asset 2902(2) is to be delivered to original destination 2906.

Block 3020 is a decision. If, in block 3020, tape node 2601 determines that asset should be rerouted, tape node 2601 continues with block 3025; otherwise, tape node 2601 continues with block 3030. In block 3025, tape node 2601 displays updated destination address and updated barcode of alternative destination on the integrated smart label display. In one example of block 3025, tape node 2601(1) updates integrated smart label display 2610 to show updated asset information 2810B and an updated barcode 2820B.

Block 3030 is optional. In block 3030, if included, tape node 2601 displays a notification indicative of the detected event. In one example of block 3030, tape node 2601(1) displays notification 2840 on integrated smart label display 2610 indicating Excessive Temperature has been experienced by asset 2902(1). Method 3000 then terminates until invoked again.

In other embodiments, method 3000 may comprise additional, fewer, or different blocks, and the blocks may be performed in a different order. In some embodiments, one or more of the blocks may be executed by other entities of the wireless tracking system 1000.

Figure 31:
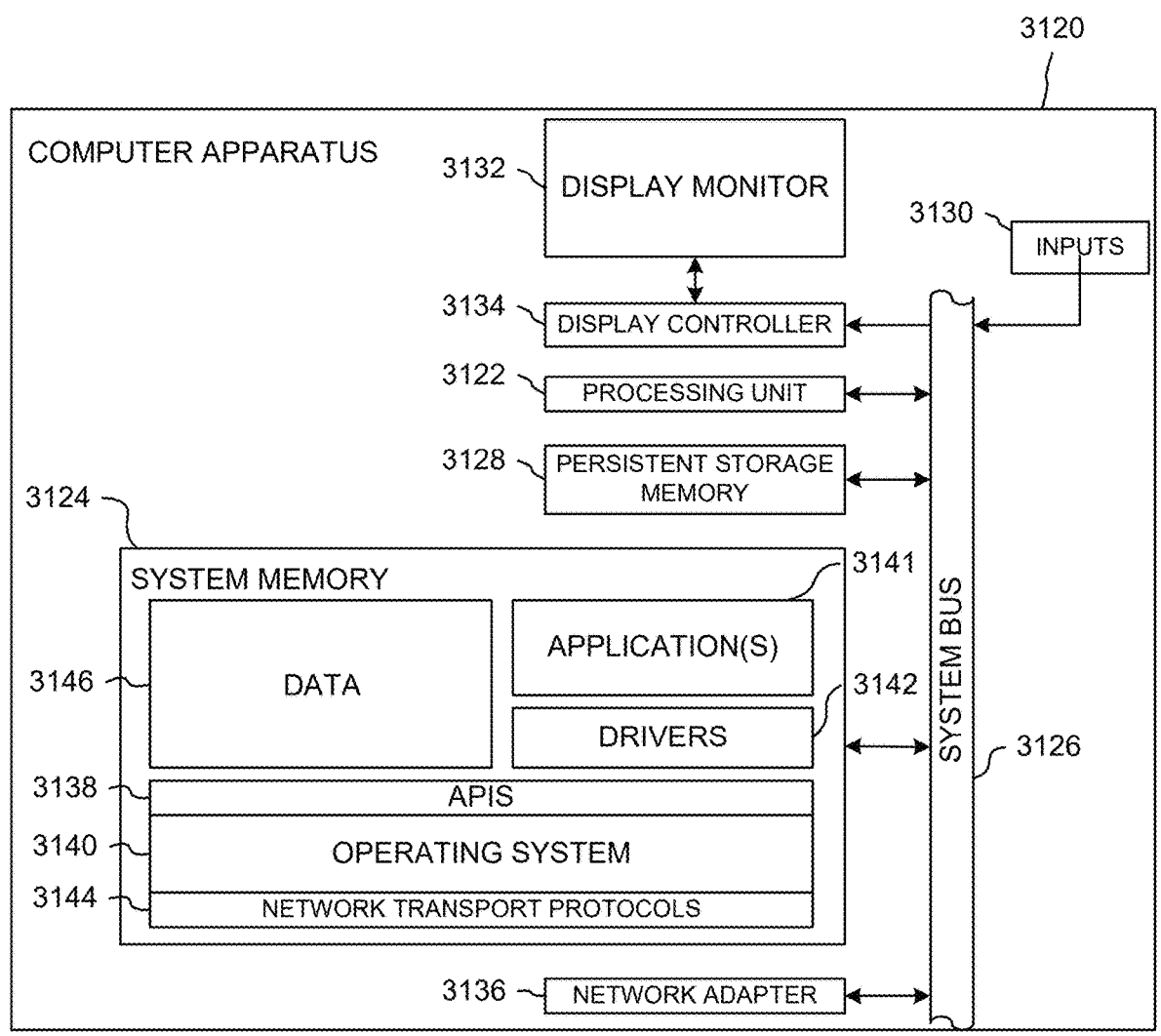
FIG. 31 shows one example computer apparatus that, either alone or in combination with one or more other computing apparatus, is operable to implement one or more of the computer systems described in this specification, in embodiments.

FIG. 31 shows an example embodiment of computer apparatus 3120 that, either alone or in combination with one or more other computing apparatus, is operable to implement one or more of the computer systems described in this specification. For example, computer apparatus 3120 may represent any of wireless tag 112 of FIGS. 1A-C, segment 313 of FIG. 3, segments 840, 870, and 880 of FIGS. 8A-C, servers 1004, mobile gateways 1010 and 1012, stationary gateway 1014, tape nodes 1018-1060 of FIG. 10, servers 1104, long range tape node 1182, medium range tape node 1176 and short range tape node 1172 of FIG. 11, nodes A-G of FIGS. 13A-C, wireless tags 1660 and 1678 of FIGS. 16A-B, wireless tag 1700 of FIGS. 17A-B, modular wireless tag 1820 of FIGS. 18A-B, wireless tags 2310, 2311, 2360, and 2365 of FIGS. 23A-D, and tape node 2601 of FIGS. 26-29. The computer apparatus 3120 includes a processing unit 3122, a system memory 3124, and a system bus 3126 that couples the processing unit 3122 to the various components of the computer apparatus 3120. The processing unit 3122 may include one or more data processors, each of which may be in the form of any one of various commercially available computer processors. The system memory 3124 includes one or more computer-readable media that typically are associated with a software application addressing space that defines the addresses that are available to software applications. The system memory 3124 may include a read only memory (ROM) that stores a basic input/output system (BIOS) that contains start-up routines for the computer apparatus 3120, and a random-access memory (RAM). The system bus 3126 may be a memory bus, a peripheral bus, or a local bus, and may be compatible with any of a variety of bus protocols, including PCI, VESA, Microchannel, ISA, and EISA. The computer apparatus 3120 also includes a persistent storage memory 3128 (e.g., a hard drive, a floppy drive, a CD ROM drive, magnetic tape drives, flash memory devices, and digital video disks) that is connected to the system bus 3126 and contains one or more computer-readable media disks that provide non-volatile or persistent storage for data, data structures and computer-executable instructions.

A user may interact (e.g., input commands or data) with the computer apparatus 3120 using one or more input devices 3130 (e.g. one or more keyboards, computer mice, microphones, cameras, joysticks, physical motion sensors, and touch pads). Information may be presented through a graphical user interface (GUI) that is presented to the user on a display monitor 3132, which is controlled by a display controller 3134. The computer apparatus 3120 also may include other input/output hardware (e.g., peripheral output devices, such as speakers and a printer). The computer apparatus 3120 connects to other network nodes through a network adapter 3136 (also referred to as a "network interface card" or NIC).

A number of program modules may be stored in the system memory 3124, including application programming interfaces 3138 (APIs), an operating system (OS) 3140 (e.g., the Windows® operating system available from Microsoft Corporation of Redmond, Wash. U.S.A.), software applications 3141 including one or more software applications programming the computer apparatus 3120 to perform one or more of the steps, tasks, operations, or processes of the positioning and/or tracking systems described herein, drivers 3142 (e.g., a GUI driver), network transport protocols 3144, and data 3146 (e.g., input data, output data, program data, a registry, and configuration settings).

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

Combination of Features

Features described above as well as those claimed below may be combined in various ways without departing from the scope hereof. The following enumerated examples illustrate some possible, non-limiting combinations:

(A1) A method for updating an integrated smart label display of a tape node to redirect delivery of an associated asset, includes: displaying information of the associated asset on the integrated smart label display of the tape node, the information including an original destination address and a barcode; determining the associated asset is to be redirected to an alternative destination; and displaying updated information and an updated barcode of the associated asset on the integrated smart label display, the updated information including an address of the alternative destination.

(A2) In embodiments of (A1), determining the associated asset is to be redirected includes receiving a message from a server the alternative destination.

(A3) In embodiments of either (A1) or (A2), determining the associated asset is to be redirected includes detecting an event related to the associated asset that indicates that the associated asset is to be redirected to the alternative destination.

(A4) In embodiments of (A3), detecting the event includes detecting, using at least one sensor of a transducing circuit of the tape node, at least one parameter of an environmental of the associated asset is outside requirements of the associated asset.

(A5) In embodiments of (A4), the requirements including a temperature range, wherein the parameter is a temperature outside the temperature range.

(A6) In embodiments of either of (A4) and (A5), the requirements including an acceleration limit, wherein the parameter is an acceleration above the acceleration limit.

(A7) In embodiments of (A6), the acceleration being indicative of the associated asset being dropped.

(A8) In embodiments of (A3), detecting the event includes determining that delivery of the associated asset is delayed and that an expected delivery time is later than a permissible delivery time.

(A9) In embodiments of any of (A1)-(A8), wherein the tape node is attached or adhered to the associated asset.

(B1) A wireless tracking device includes: a rechargeable battery; at least one sensor; a flexible circuit; integrated smart label display; a wireless transceiver; a processor; and memory storing machine readable instructions that when executed by the processor cause the processor to display information of an asset associated with the wireless tracking device on the integrated smart label display.

(B2) In embodiments of (B1), the integrated smart label display is one of an electronic paper, an e-ink display, an electrophoretic display, an electrowetting display, an electrofluiding display, an interferometric modulator display, and a plasmonic electronic display.

(B3) Embodiments of either (B1) or (B2), further include an adhesive surface for attaching the wireless tracking device to an asset.

(B4) In embodiments of any of (B1)-(B3), the flexible circuit and the integrated smart label display are flexible.

(B5) In embodiments of any of (B1)-(B4), the information including an address and a barcode of an original destination.

(B6) In embodiments of any of (B1)-(B5), the memory further including machine readable instructions that when executed by the processor cause the processor to: determine, during transportation of the asset, that the asset is to be redirected to an alternative destination; and display updated information and an updated barcode of the associated asset on the integrated smart label display, the updated information including an address of the alternative destination.

(B7) In embodiments of any of (B1)-(B6), the memory further including machine readable instructions that when executed by the processor cause the processor to: read the at least one sensor to determine ambient and operating conditions of equipment; and display information of the ambient and operating conditions on the integrated smart label display.

(B8) In embodiments of (B7), the ambient and operating conditions including one or more of location, temperature, vibration, pressure, and humidity.

(B9) In embodiments of (B8), the memory further including machine readable instructions that when executed by the processor cause the processor to control the integrated smart label display to display a warning message when the ambient and operating conditions violate at least one rule.

(B10) In embodiments of (B9), the memory further including machine readable instructions that when executed by the processor cause the processor to control the integrated smart label display to display instructions for correcting the ambient and operating conditions.

(B11) In embodiments of either (B9) or (B10), the memory further including machine readable instructions that when executed by the processor cause the processor to control the integrated smart label display to display instructions to contact someone.

(B12) In embodiments of any of (B9)-(B11), the memory further including machine readable instructions that when executed by the processor cause the processor to send a message to a wireless tracking system to report the rule violation.

(C1) A method for redirecting an asset being transported to an original destination, includes: determining that the asset is to be redirected; and sending, to a tape node associated with the asset, a message including an address of an alternative destination, wherein the tape node updates an integrated smart label display to display the address of the alternative destination.

(C2) In embodiments of (C1), the step of determining includes: receiving a message indicating that a second asset being transported to the alternative destination is redirected to another destination; determining the asset is similar to the second asset; and determining that the alternative destination has a higher priority than the original destination.

(C3) In embodiments of either (C1) or (C2), the step of determining includes detecting an event at the associated asset, the event requiring the associated asset be redirected to the alternate address.

(C4) In embodiments of (C3), the tape node includes a rule defining conditions of the event and including an action to redirect the associated asset to the alternate address when the event is detected.

(D1) A method for recycling a wireless tag, includes: determining that a power level of a battery of the wireless tag is below a threshold; and displaying, on the wireless tag, instructions to ship the wireless tracking tag to a recycling facility.

(D2) In embodiments of (D1), the instructions include a URL addressing a web page, wherein the web page provides instructions for returning the wireless tag for recycling.

(D3) In embodiments of (D2), the web page indicating a reward for returning the wireless tag for recycling.

(D4) Embodiments of either (D2) or (D3) further include: detecting arrival of the wireless tag at the recycling facility; and sending the reward to a user of the wireless tag.

(D5) Embodiments of any of (D2)-(D4) further include: detecting movement of the wireless tag indicative of the wireless tag being sent to the recycling facility; and sending the reward to a user of the wireless tag.

What is claimed is:

1. A method for updating an integrated smart label display of a tape node to redirect delivery of an associated asset, comprising:
   updating, by the tape node, the integrated smart label display to show information of the associated asset, the information including an original destination address and a barcode;
   detecting, by the tape node, that a level of stored energy on a battery of the tape node is below a threshold level;
   in response, determining, by the tape node, that the associated asset is to be redirected to an alternative destination; and
   updating, by the tape node, the integrated smart label display to show updated information and an updated barcode of the associated asset, the updated information including an address of the alternative destination, wherein the updated barcode is associated with a hardware identifier of the tape node, and
   sending, by the tape node, a request for a replacement asset to be transported to the original destination to a wireless node of a network of wireless nodes associated with the tape node.

2. The method of claim 1, further comprising: detecting, by the tape node and using one or more rules stored within memory of the tape node, an event related to the associated asset;
   the detecting the event comprising detecting, using at least one sensor of a transducing circuit of the tape node, at least one parameter of an environment of the associated asset is outside requirements of the associated asset.

3. The method of claim 2, the requirements including a temperature range, wherein the parameter is a temperature outside the temperature range.

4. The method of claim 2, the requirements including an acceleration limit, wherein the parameter is an acceleration above the acceleration limit.

5. The method of claim 4, the acceleration being indicative of the associated asset being dropped.

6. The method of claim 2, the detecting the event comprising determining, by the tape node, that delivery of the associated asset is delayed and that an expected delivery time is later than a permissible delivery time.

7. The method of claim 1, wherein the tape node is attached or adhered to the associated asset.

8. The method of claim 1, further comprising:
   receiving, by the tape node, the updated barcode from a node of a wireless network associated with the tape node prior to updating the integrated smart label display.

9. The method of claim 8, wherein the updated barcode is received from a server of the wireless network, and the association between the updated barcode and the hardware identifier of the tape node is stored by the server on a database of the server prior to sending the updated barcode to the tape node.

10. The method of claim 1, further comprising generating, by the tape node, the updated barcode prior to updating the integrated smart label display.

11. A computer implemented method for redirecting an asset being transported to an original destination, comprising:
   detecting, by a tape node attached to the asset and associated with the asset, that a level of stored energy on a battery of the tape node is below a threshold level;
   in response, determining, by the tape node, that the asset is to be redirected to an alternative destination; and
   updating, by the tape node, an integrated smart label display of the tape node to show updated information of the asset; and
   sending, by the tape node, a request for a replacement asset to be transported to the original destination to a wireless node of a network of wireless nodes associated with the tape node.

12. The method of claim 11, further comprising receiving, at the tape node, a message including an address of the alternative destination, wherein the tape node updates the integrated smart label display to display the address of the alternative destination.

13. The method of claim 11, wherein
   a second tape node associated with a second asset receives the request for a replacement asset, the second tape node determines that the asset is similar to the second asset; and
   the second tape node determines the alternative destination has a higher priority than a current destination of the second asset; and
   the second tape node updates an integrated smart label display of the second tape node to show an address of the original destination.

14. The method of claim 11, wherein the alternative destination corresponds to a location for refurbishment, recycling, or recharging of the battery of the tape node.

15. The method of claim 11, wherein the updated information of the asset comprises an address of the alternative destination.

16. The method of claim 11, wherein the updated information of the asset comprises instructions to ship the tape node to a recycling facility.

17. The method of claim 11, wherein the updated information comprises a URL.

18. A non-transitory computer readable medium storing instructions that, when executed by a processor, cause the processor to perform steps comprising:
   detecting that a level of stored energy on a battery of a tape node is below a threshold level, the tape node associated with an asset being transported to an original destination;
   in response, determining that the asset is to be redirected to an alternative destination; and
   updating an integrated smart label display of the tape node to show updated information of the asset; and
   sending, from the tape node, a request for a replacement asset to be transported to the original destination to a wireless node of a network of wireless nodes associated with the tape node.

19. The non-transitory computer readable medium of claim 18, wherein a second tape node associated with a second asset receives the request for a replacement asset, the second tape node determines that the asset is similar to the second asset; and
   the second tape node determines the alternative destination has a higher priority than a current destination of the second asset; and
   the second tape node updates an integrated smart label display of the second tape node to show an address of the original destination.

20. The non-transitory computer readable medium of claim 18, the steps further comprising:
   receiving, by the tape node, an updated barcode from a server of the network of wireless nodes associated with the tape node prior to updating the integrated smart label display, wherein the updated information shown on the integrated smart label display comprises the updated barcode;
   wherein the association between the updated barcode and the hardware identifier of the tape node is stored by the server on a database of the server prior to sending the updated barcode to the tape node.

* * * * *